(12) United States Patent
Takahashi

(10) Patent No.: US 11,671,044 B2
(45) Date of Patent: Jun. 6, 2023

(54) ROTATING ELECTRICAL MACHINE

(71) Applicant: DENSO CORPORATION, Kariya (JP)

(72) Inventor: Yuki Takahashi, Kariya (JP)

(73) Assignee: DENSO CORPORATION, Kariya (JP)

(*) Notice: Subject to any disclaimer, the term of this patent is extended or adjusted under 35 U.S.C. 154(b) by 0 days.

(21) Appl. No.: 16/914,532

(22) Filed: Jun. 29, 2020

(65) Prior Publication Data

US 2020/0395878 A1 Dec. 17, 2020

Related U.S. Application Data

(63) Continuation of application No. PCT/JP2018/048254, filed on Dec. 27, 2018.

(30) Foreign Application Priority Data

Dec. 28, 2017 (JP) ............................. JP2017-255069
Oct. 29, 2018 (JP) ............................. JP2018-203301

(51) Int. Cl.
 *H02P 21/22* (2016.01)
 *H02P 21/16* (2016.01)
 (Continued)

(52) U.S. Cl.
 CPC .............. *H02P 21/22* (2016.02); *B60L 15/20* (2013.01); *B64D 27/24* (2013.01); *B64D 31/00* (2013.01);
 (Continued)

(58) Field of Classification Search
 CPC .......... H02P 21/22; H02P 21/16; H02P 27/12; B60L 15/20; B64D 31/00; B64D 27/24
 (Continued)

(56) References Cited

U.S. PATENT DOCUMENTS 4,463,276 A 7/1984 Nakamura
5,128,574 A 7/1992 Koizumi et al.
(Continued)

FOREIGN PATENT DOCUMENTS

CA 2659088 A1 * 1/2008 ............ H02K 1/276
CN 85103498 A 11/1986
(Continued)

OTHER PUBLICATIONS

Apr. 2, 2019 International Search Report issued in International Patent Application No. PCT/JP2018/048254.
(Continued)

*Primary Examiner* — Jorge L Carrasquillo
(74) *Attorney, Agent, or Firm* — Oliff PLC

(57) ABSTRACT

A stator of a rotating electrical machine has a slot-less structure. The rotating electrical machine includes a controller. The controller determines a value of a q-axis command current in accordance with requirement information and an input command value for a controlled variable of the rotating electrical machine. The requirement information includes a relationship between values of the q-axis command current and corresponding command values for the controlled variable. The controller performs a task of correcting the value of the q-axis command current to thereby restrict temperature change in a magnet unit from having an influence on the relationship between the command values for the controlled variable and the corresponding values of the q-axis command current. The controller controls an inverter to thereby adjust a value of the q-axis current flowing through an armature winding member to the corrected value of the q-axis command current.

16 Claims, 33 Drawing Sheets

(51) Int. Cl.
*H02P 27/12* (2006.01)
*B60L 15/20* (2006.01)
*B64D 27/24* (2006.01)
*B64D 31/00* (2006.01)
*B64C 39/02* (2023.01)

(52) U.S. Cl.
CPC .............. *H02P 21/16* (2016.02); *H02P 27/12* (2013.01); *B64C 39/024* (2013.01)

(58) Field of Classification Search
USPC ................................................... 318/400.02
See application file for complete search history.

(56) References Cited

U.S. PATENT DOCUMENTS

| | | |
|---|---|---|
| 5,478,222 A | 12/1995 | Heidelberg et al. |
| 5,637,048 A | 6/1997 | Maeda et al. |
| 5,723,933 A | 3/1998 | Grundl et al. |
| 5,759,128 A | 6/1998 | Mizutani et al. |
| 5,787,567 A | 8/1998 | Miyazaki |
| 5,821,653 A | 10/1998 | Kinto et al. |
| 5,880,544 A | 3/1999 | Ikeda et al. |
| 6,501,205 B1 | 12/2002 | Asao et al. |
| 6,700,236 B2 | 3/2004 | Umeda et al. |
| 6,717,315 B1 | 4/2004 | Tajima et al. |
| 6,770,999 B2 | 8/2004 | Sakurai |
| 6,812,615 B1 | 11/2004 | Ettridge |
| 6,882,077 B2 | 4/2005 | Neet |
| 6,914,356 B2 | 7/2005 | Yamamura et al. |
| 7,402,934 B1 | 7/2008 | Gabrys |
| 7,902,707 B2 | 3/2011 | Kawamura et al. |
| 8,446,060 B1 | 5/2013 | Lugg |
| 8,552,678 B2 | 10/2013 | Yuuki et al. |
| 8,766,468 B1 | 7/2014 | Rilla et al. |
| 8,823,238 B2 | 9/2014 | Greaves et al. |
| 9,172,280 B2 | 10/2015 | Koga |
| 9,255,633 B2 | 2/2016 | Markl |
| 9,595,851 B2 | 3/2017 | Hazeyama et al. |
| 10,404,120 B2 | 9/2019 | Ishizuka et al. |
| 11,110,793 B2 | 9/2021 | Takahashi et al. |
| 2002/0050395 A1 | 5/2002 | Kusumoto et al. |
| 2002/0180294 A1 | 12/2002 | Kaneda et al. |
| 2004/0090130 A1 | 5/2004 | Kaneko et al. |
| 2004/0119362 A1 | 6/2004 | Neet |
| 2004/0128331 A1 | 7/2004 | Hinds et al. |
| 2004/0263016 A1 | 12/2004 | Neet |
| 2005/0134134 A1 | 6/2005 | Mori et al. |
| 2006/0017345 A1 | 1/2006 | Uchida et al. |
| 2006/0113857 A1 | 6/2006 | Honkura et al. |
| 2006/0138879 A1 | 6/2006 | Kusase et al. |
| 2006/0197397 A1 | 9/2006 | Stiesdal |
| 2008/0073992 A1 | 3/2008 | Kusama |
| 2008/0093944 A1 | 4/2008 | Takahashi et al. |
| 2008/0218007 A1 | 9/2008 | Masuzawa et al. |
| 2009/0079277 A1 | 3/2009 | Nakamura et al. |
| 2009/0230353 A1 | 9/2009 | Shimazu et al. |
| 2009/0251023 A1 | 10/2009 | Nakano et al. |
| 2009/0267441 A1 | 10/2009 | Hiramatsu et al. |
| 2010/0007230 A1 | 1/2010 | Suzuki et al. |
| 2010/0117481 A1 | 5/2010 | Greaves et al. |
| 2010/0123426 A1* | 5/2010 | Nashiki .................. H02K 1/146 310/46 |
| 2010/0181858 A1 | 7/2010 | Hibbs et al. |
| 2010/0194231 A1 | 8/2010 | Rippel et al. |
| 2011/0012440 A1 | 1/2011 | Toyota et al. |
| 2011/0057533 A1 | 3/2011 | Murakami et al. |
| 2011/0210558 A1 | 9/2011 | Stiesdal |
| 2011/0285243 A1 | 11/2011 | Taniguchi |
| 2011/0304236 A1 | 12/2011 | Nishiyama et al. |
| 2012/0001521 A1 | 1/2012 | Shiraki et al. |
| 2012/0038168 A1 | 2/2012 | Morishita et al. |
| 2012/0181891 A1 | 7/2012 | Yamada et al. |
| 2012/0293035 A1 | 11/2012 | Nakamura et al. |
| 2012/0306310 A1 | 12/2012 | Takeuchi et al. |
| 2012/0319507 A1 | 12/2012 | Ueno et al. |
| 2013/0082560 A1 | 4/2013 | Takeuchi et al. |
| 2013/0106238 A1 | 5/2013 | Saiki et al. |
| 2013/0127289 A1 | 5/2013 | Koga |
| 2013/0249339 A1 | 9/2013 | Makino et al. |
| 2013/0300241 A1 | 11/2013 | Wedman et al. |
| 2013/0334991 A1* | 12/2013 | Yuuki ................... H02K 1/276 318/718 |
| 2014/0084731 A1 | 3/2014 | Iwami et al. |
| 2014/0125182 A1 | 5/2014 | Takahashi |
| 2014/0174856 A1 | 6/2014 | Takagi et al. |
| 2014/0197709 A1 | 7/2014 | Hasegawa |
| 2014/0312718 A1 | 10/2014 | Li et al. |
| 2015/0028708 A1 | 1/2015 | Matsuoka et al. |
| 2015/0089794 A1 | 4/2015 | Dokonal et al. |
| 2015/0097453 A1 | 4/2015 | Nishikawa et al. |
| 2015/0129711 A1 | 5/2015 | Caubel |
| 2015/0171682 A1 | 6/2015 | Fujisawa et al. |
| 2015/0171683 A1 | 6/2015 | Kim et al. |
| 2015/0236556 A1 | 8/2015 | Suwazono et al. |
| 2015/0340915 A1 | 11/2015 | Kato et al. |
| 2016/0049835 A1 | 2/2016 | Fukumoto et al. |
| 2016/0102705 A1 | 4/2016 | Mei et al. |
| 2016/0126871 A1 | 5/2016 | Uematsu |
| 2016/0149454 A1 | 5/2016 | Haga et al. |
| 2016/0204728 A1 | 7/2016 | Notohara et al. |
| 2016/0211707 A1 | 7/2016 | Yamada et al. |
| 2016/0277397 A1 | 9/2016 | Watanabe |
| 2016/0315508 A1 | 10/2016 | Li et al. |
| 2017/0085143 A1 | 3/2017 | Tanaka et al. |
| 2017/0093257 A1 | 3/2017 | Hirata et al. |
| 2017/0098969 A1 | 4/2017 | Fukumoto et al. |
| 2017/0162311 A1 | 6/2017 | Shimbo et al. |
| 2017/0187258 A1 | 6/2017 | Fujikawa et al. |
| 2017/0222583 A1 | 8/2017 | Akimatsu et al. |
| 2017/0237310 A1 | 8/2017 | Nakamura et al. |
| 2017/0271941 A1 | 9/2017 | Kaneko et al. |
| 2017/0271945 A1 | 9/2017 | Germann et al. |
| 2017/0288489 A1 | 10/2017 | Shiraki et al. |
| 2017/0353071 A1 | 12/2017 | Saito et al. |
| 2017/0353131 A1 | 12/2017 | Usagawa et al. |
| 2018/0056329 A1 | 3/2018 | Akanuma et al. |
| 2018/0062471 A1 | 3/2018 | Shiraki et al. |
| 2018/0108464 A1 | 4/2018 | Fujikawa et al. |
| 2018/0262091 A1 | 9/2018 | Gieras et al. |
| 2018/0269733 A1 | 9/2018 | Mikami et al. |
| 2018/0287445 A1 | 10/2018 | Ishizuka et al. |
| 2018/0323673 A1 | 11/2018 | Shiraki et al. |
| 2018/0336981 A1 | 11/2018 | Fujihara et al. |
| 2018/0358846 A1 | 12/2018 | Baba et al. |
| 2019/0097509 A1 | 3/2019 | Oguchi et al. |
| 2019/0157954 A1 | 5/2019 | Takahashi et al. |
| 2019/0341828 A1 | 11/2019 | Calverley et al. |
| 2019/0379252 A1* | 12/2019 | Taniguchi ................ H02K 1/16 |
| 2020/0021222 A1 | 1/2020 | Nigo |
| 2020/0161939 A1 | 5/2020 | Takahashi et al. |
| 2020/0162003 A1 | 5/2020 | Takahashi et al. |
| 2020/0244119 A1 | 7/2020 | Morishita |

FOREIGN PATENT DOCUMENTS

| | | | |
|---|---|---|---|
| CN | 1761130 A | 4/2006 | |
| CN | 102684326 A | 9/2012 | |
| CN | 105305756 A | 2/2016 | |
| CN | 104578462 B | 7/2017 | |
| CN | 107104623 A | 8/2017 | |
| EP | 0668651 A1 | 8/1995 | |
| EP | 2136467 A1 * | 12/2009 | ........... H02K 1/2766 |
| FR | 2036866 A1 | 12/1970 | |
| FR | 2933544 A1 | 1/2010 | |
| JP | S55-173264 U | 12/1980 | |
| JP | S61-14865 U | 1/1986 | |
| JP | S61-180567 U | 11/1986 | |
| JP | S61-258643 A | 11/1986 | |
| JP | S62-095954 A | 5/1987 | |
| JP | S62-196053 A | 8/1987 | |
| JP | H02-303348 A | 12/1990 | |
| JP | H03-048373 U | 5/1991 | |
| JP | H06-070522 A | 3/1994 | |

(56) References Cited

FOREIGN PATENT DOCUMENTS

| | | |
|---|---|---|
| JP | 3001939 U | 9/1994 |
| JP | H07-212915 A | 8/1995 |
| JP | H08-242564 A | 9/1996 |
| JP | H08-265995 A | 10/1996 |
| JP | H08-275419 A | 10/1996 |
| JP | H09-308145 A | 11/1997 |
| JP | H11-018496 A | 1/1999 |
| JP | H11-206091 A | 7/1999 |
| JP | H11-215749 A | 8/1999 |
| JP | H11-308793 A | 11/1999 |
| JP | 2000-41367 A | 2/2000 |
| JP | 2000-245089 A | 9/2000 |
| JP | 2001-112197 A | 4/2001 |
| JP | 2001-333555 A | 11/2001 |
| JP | 2002-010602 A | 1/2002 |
| JP | 2002-171735 A | 6/2002 |
| JP | 2002-272066 A | 9/2002 |
| JP | 2003-070197 A | 3/2003 |
| JP | 2003-104076 A | 4/2003 |
| JP | 2003-324866 A | 11/2003 |
| JP | 2004-15906 A | 1/2004 |
| JP | 2004-092715 A | 3/2004 |
| JP | 2004-120892 A | 4/2004 |
| JP | 2004-147451 A | 5/2004 |
| JP | 2004-159453 A | 6/2004 |
| JP | 2004-187344 A | 7/2004 |
| JP | 2005-065385 A | 3/2005 |
| JP | 2005-117751 A | 4/2005 |
| JP | 2005-151667 A | 6/2005 |
| JP | 2005-253146 A | 9/2005 |
| JP | 2005-304292 A | 10/2005 |
| JP | 2005-312214 A | 11/2005 |
| JP | 2006-288187 A | 10/2006 |
| JP | 2006-320109 A | 11/2006 |
| JP | 2006-325338 A | 11/2006 |
| JP | 2007-202324 A | 8/2007 |
| JP | 2007-267565 A | 10/2007 |
| JP | 2007-274869 A | 10/2007 |
| JP | 2007-295716 A | 11/2007 |
| JP | 2008-148375 A | 6/2008 |
| JP | 2008-237021 A | 10/2008 |
| JP | 2008-245475 A | 10/2008 |
| JP | 2008-278648 A | 11/2008 |
| JP | 2009-17712 A | 1/2009 |
| JP | 2009-071939 A | 4/2009 |
| JP | 2009-291040 A | 12/2009 |
| JP | 2010-022192 A | 1/2010 |
| JP | 2010-041753 A | 2/2010 |
| JP | 2010-130819 A | 6/2010 |
| JP | 2010-130871 A | 6/2010 |
| JP | 2011-024324 A | 2/2011 |
| JP | 2011-244627 A | 12/2011 |
| JP | 2012-005232 A | 1/2012 |
| JP | 2012-010565 A | 1/2012 |
| JP | 2012-125088 A | 6/2012 |
| JP | 2012-165614 A | 8/2012 |
| JP | 2012-175755 A | 9/2012 |
| JP | 2012-228072 A | 11/2012 |
| JP | 2013-051765 A | 3/2013 |
| JP | 2013-108986 A | 6/2013 |
| JP | 2013-122849 A | 6/2013 |
| JP | 2013-162668 A | 8/2013 |
| JP | 2013-201853 A | 10/2013 |
| JP | 2013-207858 A | 10/2013 |
| JP | 2014-068443 A | 4/2014 |
| JP | 2014-068479 A | 4/2014 |
| JP | 2014-213622 A | 11/2014 |
| JP | 2014-239586 A | 12/2014 |
| JP | 2015-015906 A | 1/2015 |
| JP | 2015-018633 A | 1/2015 |
| JP | 2015-033173 A | 2/2015 |
| JP | 2015-092792 A | 5/2015 |
| JP | 2015-122834 A | 7/2015 |
| JP | 2015-142484 A | 8/2015 |
| JP | 2015-177725 A | 10/2015 |
| JP | 2015-211492 A | 11/2015 |
| JP | 5805336 B1 | 11/2015 |
| JP | 2015-216714 A | 12/2015 |
| JP | 2016-026465 A | 2/2016 |
| JP | 2016-052210 A | 4/2016 |
| JP | 2016-072457 A | 5/2016 |
| JP | 2016-092995 A | 5/2016 |
| JP | 2016-126992 A | 7/2016 |
| JP | 2016-129439 A | 7/2016 |
| JP | 2016-129483 A | 7/2016 |
| JP | 2016-178814 A | 10/2016 |
| JP | 2016-226226 A | 12/2016 |
| JP | 2017-022914 A | 1/2017 |
| JP | 2017-060321 A | 3/2017 |
| JP | 2017-070140 A | 4/2017 |
| JP | 2017-071235 A | 4/2017 |
| JP | 2017-132378 A | 8/2017 |
| JP | 2017-169316 A | 9/2017 |
| JP | 2018-074767 A | 5/2018 |
| JP | 2018-201018 A | 12/2018 |
| JP | 2019-140368 A | 8/2019 |
| JP | 2014-093835 A | 5/2020 |
| WO | 2002/015229 A1 | 2/2002 |
| WO | 2013/179476 A1 | 12/2013 |
| WO | 2015/097767 A1 | 7/2015 |
| WO | 2016/058870 A1 | 4/2016 |
| WO | 2016/072481 A1 | 5/2016 |
| WO | 2016/084204 A1 | 6/2016 |
| WO | 2017/163383 A1 | 9/2017 |

OTHER PUBLICATIONS

Apr. 9, 2019 International Search Report issued in International Patent Application No. PCT/JP2018/048248.
May 2, 2022 Office Action issued in U.S. Appl. No. 16/915,238.
Mar. 21, 2022 Office Action Issued In U.S. Appl. No. 16/915,027.
Feb. 28, 2022 Notice Of Allowance issued in U.S. Appl. No. 16/914,605.
Feb. 28, 2022 Notice Of Allowance issued in U.S. Appl. No. 16/748,195.
Jan. 7, 2021 Office Action Issued in U.S. Appl. No. 16/915,348.
Apr. 9, 2019 International Search Report issued in International Patent Application No. PCT/JP2018/048246.
Apr. 16, 2019 Search Report issued in International Patent Application No. PCT/JP2018/048247.
Oct. 23, 2018 International Search Report issued in Application No. PCT/JP2018/027409.
Oct. 16, 2018 International Search Report issued in Application No. PCT/JP2018/027408.
U.S. Appl. No. 16/914,605, filed Jun. 29, 2020 in the name of Takahashi.
U.S. Appl. No. 16/914,570, filed Jun. 29, 2020 in the name of Takahashi.
U.S. Appl. No. 16/915,027, filed Jun. 29, 2020 in the name of Takahashi.
U.S. Appl. No. 16/915,238, filed Jun. 29, 2020 in the name of Takahashi.
U.S. Appl. No. 16/915,566, filed Jun. 29, 2020 in the name of Takahashi.
U.S. Appl. No. 16/915,116, filed Jun. 29, 2020 in the name of Takahashi et al.
U.S. Appl. No. 16/748,535, filed Jan. 21, 2020 in the name of Takahashi et al.
U.S. Appl. No. 16/748,195, filed Jan. 21, 2020 in the name of Takahashi et al.
U.S. Appl. No. 16/915,348, filed Jun. 29, 2020 in the name of Takahashi et al.
Apr. 2, 2021 Notice Of Allowance Issued in U.S. Appl. No. 16/915,348.
Jul. 22, 2021 Restriction/Election Issued In U.S. Appl. No. 16/748,195.
Nov. 2, 2021 Office Action issued in U.S. Appl. No. 16/914,605.
Nov. 24, 2021 Office Action issued in U.S. Appl. No. 16/748,195.

* cited by examiner

ROTATING ELECTRICAL MACHINE

CROSS REFERENCE TO RELATED APPLICATION

This application is a bypass continuation application of currently pending international application No. PCT/JP2018/048254 filed on Dec. 27, 2018 designating the United States of America, the entire disclosure of which is incorporated herein by reference.

This application is based on and claims the benefit of priority from Japanese Patent Applications No. 2017-255069 filed on Dec. 28, 2017 and 2018-203301 filed on Oct. 29, 2018, the disclosure of each of which is incorporated in its entirety herein by reference.

TECHNICAL FIELD

This disclosure generally relates to rotating electrical machines.

BACKGROUND

A known example of a rotating electrical machine, which is disclosed in patent literature 1, includes a field generator and an armature. The field generator includes a magnet unit. The magnet unit has a plurality of magnetic poles whose polarities are alternately arranged in a circumferential direction. The armature includes a multi-phase armature winding member.

CITATION LIST

Patent Literature

Patent Literature 1

Japanese Patent Application Publication No. 2014-093859

Summary

An armature includes teeth extending from a yoke with predetermined intervals therebetween, slots each disposed between a corresponding circumferential adjacent pair of slots, and armature windings installed in the slots. The armature is configured such that a major part of the magnetic flux flows into the yoke through the teeth. This configuration of the armature may result in the waveform of magnetic flux that actually interlinks to the armature windings being distorted as compared with the waveform of magnetic flux generated from the magnet unit.

In contrast, a slot-less armature, which is designed to have a slot-less structure or have no components that serve as slots, is configured such that the waveform of magnetic flux that actually interlinks to the armature windings becomes closer to the waveform of magnetic flux generated from the magnet unit.

The magnet unit has characteristics of magnetic flux decreasing as the temperature of the magnet unit increases. A typical armature, which is designed to have slots or have components that serve as slots, may result in the waveform of magnetic flux being greatly distorted. For this reason, change in the magnetic flux due to change in the temperature of the magnet unit has small influence on torque of the rotating electrical machine.

In contrast, a slot-less armature, which is designed to have a slot-less structure or have no components that serve as slots, is configured such that the waveform of magnetic flux has only small distortion. For this reason, change in the magnetic flux due to change in the temperature of the magnet unit has large influence on torque of the rotating electrical machine.

It is to be therefore desired that rotating electrical machines, each of which includes an armature with a slot-less structure or no components that serve as slots, is designed to have smaller influence, on torque of the corresponding rotating electrical machine, of change in magnetic flux due to change in the temperature of a magnet unit.

In view of the circumstances set forth above, the disclosure aims to mainly provide rotating electrical machines, each of which is designed to enable change in magnetic flux due to temperature change in a magnet unit to have smaller influence on torque of the corresponding rotating electrical machine.

Various aspects disclosed in this specification respectively utilize technical measures, which are different from each other, for achieving respective objects. The objects, features, and effects disclosed in this specification are more clarified with reference to the following detailed-descriptions, and the accompanying figures.

The first disclosure is a rotating electrical machine system. The rotating electrical machine system includes a field generator that includes a magnet unit. The magnet unit has a plurality of magnetic poles whose polarities are alternately arranged in a circumferential direction. The rotating electrical machine includes an armature that includes a multi-phase armature winding member. One of the field generator and the armature serves as a rotor of the rotating electrical machine.

The armature winding member includes a plurality of conductive members that face the armature and are arrayed at given intervals away from each other in the circumferential direction. The armature has any one of a first configuration and a second configuration. The first configuration has conductor-to-conductor members. Each of the conductor-to-conductor members is disposed between a corresponding adjacent pair of the conductive members of the armature winding member. The second configuration has no conductor-to-conductor member between each adjacent pair of the conductive members of the armature winding member.

Each of the conductor-to-conductor members is made of any one of a magnetic material and a non-magnetic material. The magnetic material satisfying the following relation:

$$Wt \times Bs \leq Wm \times Br$$

where:

Wt represents a total circumferential width of one or more of the conductor-to-conductor members lying within a range of one of the magnetic poles of the magnet unit;

Bs represents a saturation magnetic flux density of the conductor-to-conductor members;

Wm represents a circumferential width of a portion of the magnet unit equivalent to one of the magnetic poles of the magnet unit; and Br represents the remanent flux density of the magnet unit.

The rotating electrical machine further includes a power converter electrically connected to the armature winding member, and at least one controller configured to control the power converter to thereby adjust a q-axis current flowing through the armature winding member to a q-axis command current.

The at least one controller includes a command current determiner configured to determine a value of the q-axis command current in accordance with requirement information and an input command value for a controlled variable of the rotating electrical machine. The requirement information includes a relationship between values of the q-axis command current and corresponding command values for the controlled variable. The at least one controller includes a corrector configured to perform a task of correcting the value of the q-axis command current determined by the command current determiner to thereby suppress temperature change in the magnet unit from having an influence on the relationship between the command values for the controlled variable and the corresponding values of the q-axis command current.

The at least one controller is configured to control the power converter to thereby adjust a value of the q-axis current flowing through the armature winding member to the corrected value of the q-axis command current.

The first disclosure includes the armature that has any one of the first configuration and the second configuration. The first configuration having conductor-to-conductor members. Each of the conductor-to-conductor members is disposed between a corresponding adjacent pair of the conductive members of the armature winding member. The second configuration has no conductor-to-conductor member between each adjacent pair of the conductive members of the armature winding member.

Each of the conductor-to-conductor members is made of any one of a magnetic material and a non-magnetic material. The magnetic material satisfies the following relation:

$$Wt \times Bs \leq Wm \times Br$$

where:

Wt represents a total circumferential width of one or more of the conductor-to-conductor members lying within a range of one of the magnetic poles of the magnet unit;

Bs represents a saturation magnetic flux density of the conductor-to-conductor members;

Wm represents a circumferential width of a portion of the magnet unit equivalent to one of the magnetic poles of the magnet unit; and Br represents the remanent flux density of the magnet unit.

The at least one controller of the first disclosure controls the power converter to thereby adjust the q-axis current flowing through the armature winding member to the q-axis command current. A value of the q-axis command current is determined in accordance with the requirement information and an input command value for the controlled variable of the rotating electrical machine. The requirement information includes a relationship between values of the q-axis command current and corresponding command values for the controlled variable.

A change in magnetic flux of the magnet unit due to temperature change of the magnet unit may cause a value of the q-axis command current, which is required to match an actual value of the controlled variable with a corresponding command value, to be deviated from a corresponding value of the q-axis command current, which correlates, in the requirement information, with the corresponding command value. This may result in the actual value of the controlled variable being deviated from the corresponding command value even if the q-axis current is adjusted to the value of the q-axis command current.

From this viewpoint, the first disclosure performs the task of correcting the value of the q-axis command current determined by the command current determiner to thereby restrict or suppress temperature change in the magnet unit from having an influence on the relationship between the command values for the controlled variable and the corresponding values of the q-axis command current. This enables the influence of the change in the magnetic flux of the magnet unit due to its temperature change on torque of the rotating electrical machine to be reduced.

The first disclosure can be implemented for example by the following structure. Specifically, the at least one controller includes a temperature obtaining unit configured to obtain information about a temperature of the magnet unit. The corrector is configured to perform, as the task of correcting the value of the q-axis command current, a task of correcting the value of the q-axis command current in accordance with the obtained temperature information.

The second disclosure can be implemented for example by the following structure.

Specifically, the at least one controller includes an obtaining unit configured to obtain an electrical angular velocity of the corresponding one of the rotating electrical machines, and information about a voltage induced in the corresponding armature winding member. The corrector is configured to perform, as the task of correcting the value of the q-axis command current, a task of correcting the value of the q-axis command current in accordance with the obtained electrical angular velocity and the information about the induced voltage.

The magnetic flux of the magnet unit can be determined based on the induced voltage and the electrical angular velocity. This enables the induced voltage and the electrical angular velocity to be used, in place of the temperature information of the magnet unit, for obtaining the influence of the temperature change of the magnet unit on the relationship between the command values for the controlled variable and the corresponding values of the q-axis command current.

In the second disclosure, a rotating electrical machine system includes rotating electrical machines each described in the first disclosure. Each of the rotating electrical machines is applied to a vehicle equipped with a plurality of driving wheels. The rotating electrical machines are respectively provided for at least two driving wheels in the plurality of driving wheels. Each of the rotating electrical machines serves as a power source for rotating the corresponding one of the at least two driving wheels. The at least one controller includes controllers individually provided for the respective rotating electrical machines.

The rotating electrical machines according to the second disclosure are respectively provided for the at least two driving wheels in the plurality of driving wheels. Values of the temperatures of the magnet units of the respective rotating electrical machines may become different from each other depending on a difference among the operating conditions of the respective rotating electrical machines and/or a difference among the ambient temperatures around the respective rotating electrical machines.

Uniformly correcting the q-axis command current of the respective rotating electrical machines based on the temperature of any one of the magnet units might result in unsuitable correction of the q-axis command current in at least one of the rotating electrical machines. This might result in difficulty in appropriately performing traveling control of the vehicle.

From this viewpoint, the controllers of the second disclosure are individually provided for the respective rotating electrical machines. This enables each controller to appropriately correct the q-axis command current for the corresponding electrical rotating machine as a control target. This therefore makes it possible to appropriately perform traveling control of the vehicle.

The third disclosure is a rotating electrical machine system that includes rotating electrical machines each described in the first disclosure. Each of the rotating electrical machines is applied to an aerial vehicle. The rotating electrical machines serves as a power source for flying the aerial vehicle. The aerial vehicle includes a vehicle body, and a plurality of thrusters mounted to the vehicle body. Each of the thrusters includes a propeller. The rotating electrical machines are respectively provided for the propellers, and the at least one controller includes controllers individually provided for the respective rotating electrical machines.

The rotating electrical machines according to the third disclosure are respectively provided for the propellers. Values of the temperatures of the magnet units of the respective rotating electrical machines may become different from each other depending on a difference among the operating conditions of the respective rotating electrical machines and/or a difference among the ambient temperatures around the respective rotating electrical machines.

Uniformly correcting the q-axis command current of the respective rotating electrical machines based on the temperature of any one of the magnet units might result in unsuitable correction of the q-axis command current in at least one of the rotating electrical machines.

From this viewpoint, the controllers of the third disclosure are individually provided for the respective rotating electrical machines. This enables each controller to appropriately correct the q-axis command current for the corresponding electrical rotating machine as a control target. This therefore makes it possible to appropriately perform control of the attitude of the aerial vehicle.

BRIEF DESCRIPTION OF DRAWINGS

FIG. 15($b$) is a view showing the layout of conductors at the $n^{th}$ layer position as viewed in an axial direction of the stator coil.

FIG. 24($b$) is a view illustrating flows of magnetic flux in a magnet unit according to the second embodiment in which the magnet unit is not equipped with the magnetic members.

FIG. 33($b$) is a view which illustrates a modification of the electrical connection of the first and second conductors.

FIG. 33($c$) is a view which illustrates another modification of the electrical connection of the first and second conductors.

DESCRIPTION OF EMBODIMENTS

Figure 1:
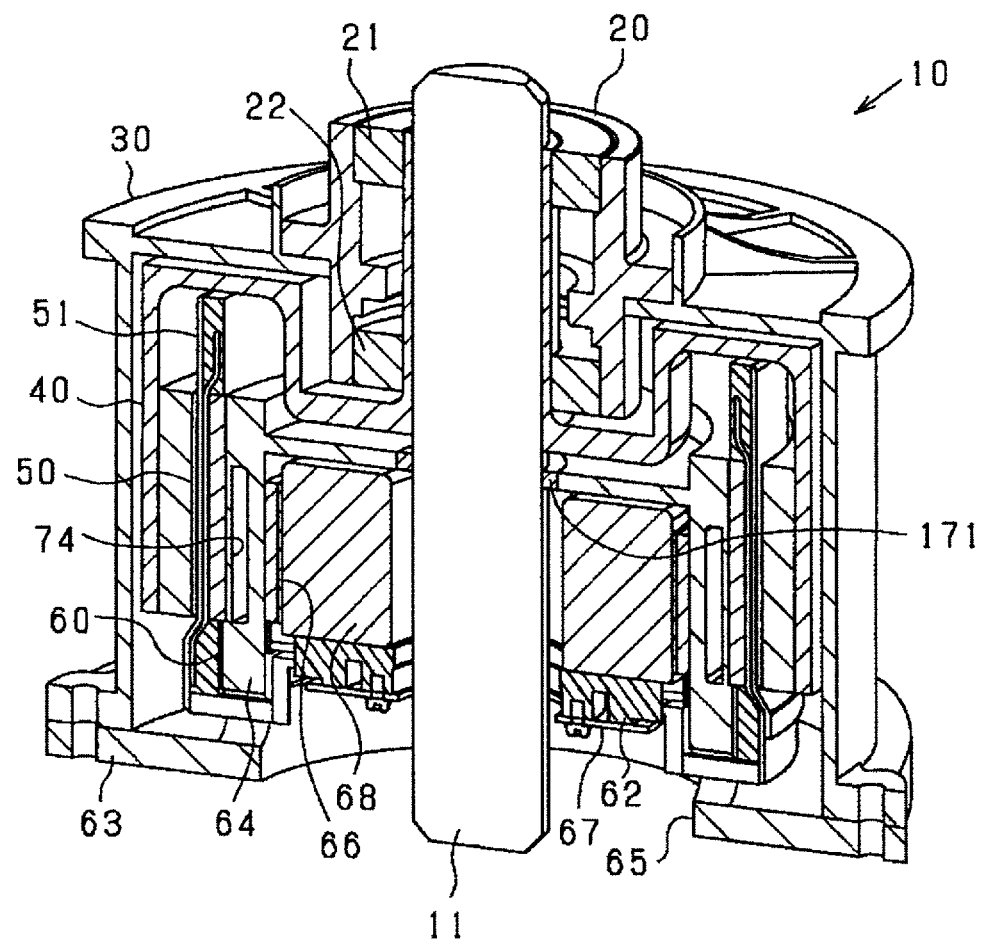
FIG. 1 is a perspective longitudinal sectional view of a rotating electrical machine.

The embodiments will be described below with reference to the drawings. Parts of the embodiments functionally or structurally corresponding to each other or associated with each other will be denoted by the same reference numbers or by reference numbers which are different in the hundreds place from each other. The corresponding or associated parts may refer to the explanation in the other embodiments.

The rotating electrical machine in the embodiments is configured to be used, for example, as a power source for vehicles. The rotating electrical machine may, however, be used widely for industrial, automotive, domestic, office automation, or game applications. In the following embodiments, the same or equivalent parts will be denoted by the same reference numbers in the drawings, and explanation thereof in detail will be omitted.

First Embodiment

A rotating electrical machine 10 in this embodiment is a synchronous polyphase alternating-current motor having an outer rotor structure (i.e., an outer rotating structure). The outline of the rotating electrical machine 10 is illustrated in FIGS. 1 to 5.

Figure 2:
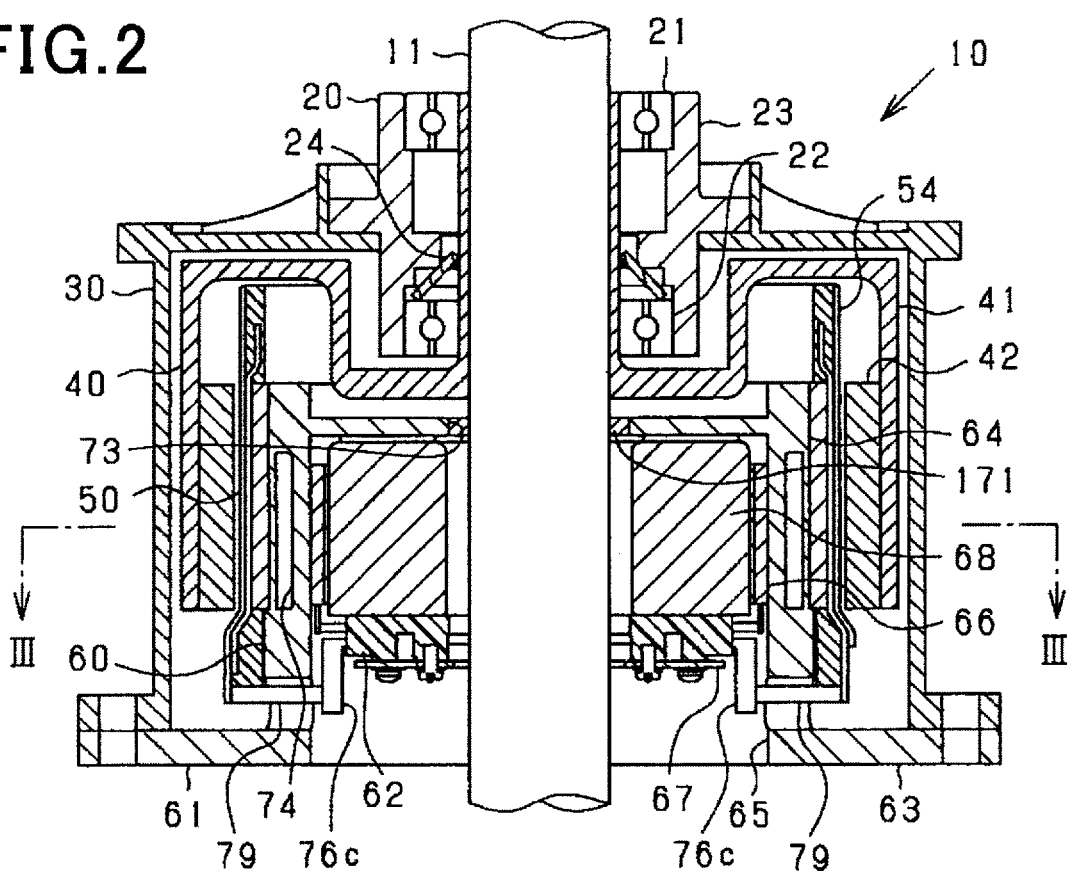
FIG. 2 is a longitudinal sectional view of the rotating electrical machine.
Figure 3:
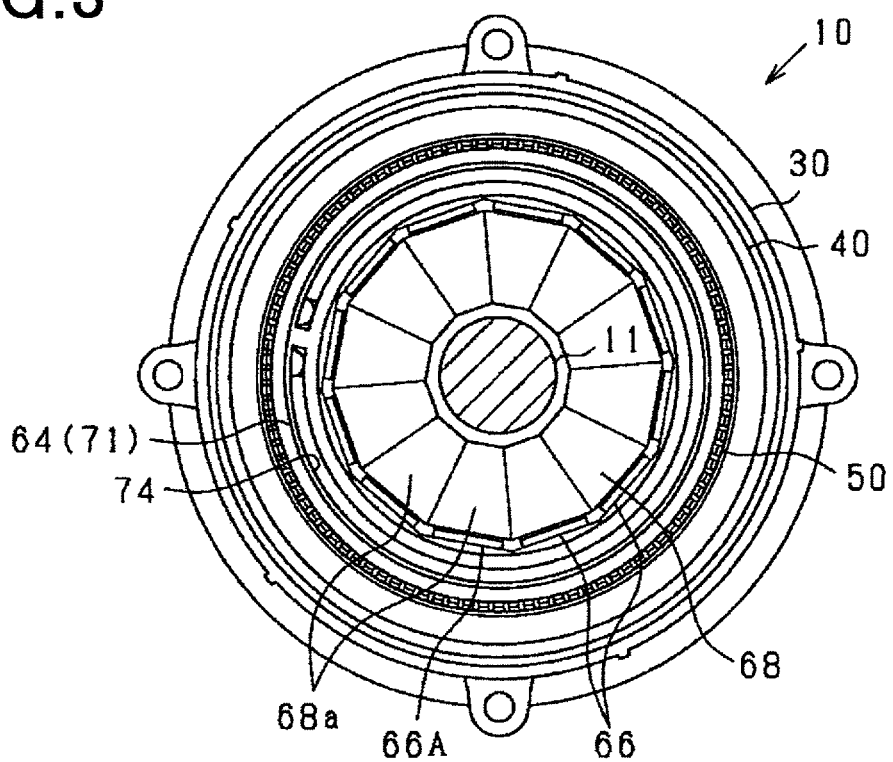
FIG. 3 is a sectional view taken along the line II-III in FIG. 2.

FIG. 1 is a perspective longitudinal sectional view of the rotating electrical machine 10. FIG. 2 is a longitudinal sectional view along the rotating shaft 11 of the rotating electrical machine 10. FIG. 3 is a traverse sectional view (i.e., sectional view taken along the line III-III in FIG. 2) of the rotating electrical machine 10 perpendicular to the rotating shaft 11.

Figure 4:
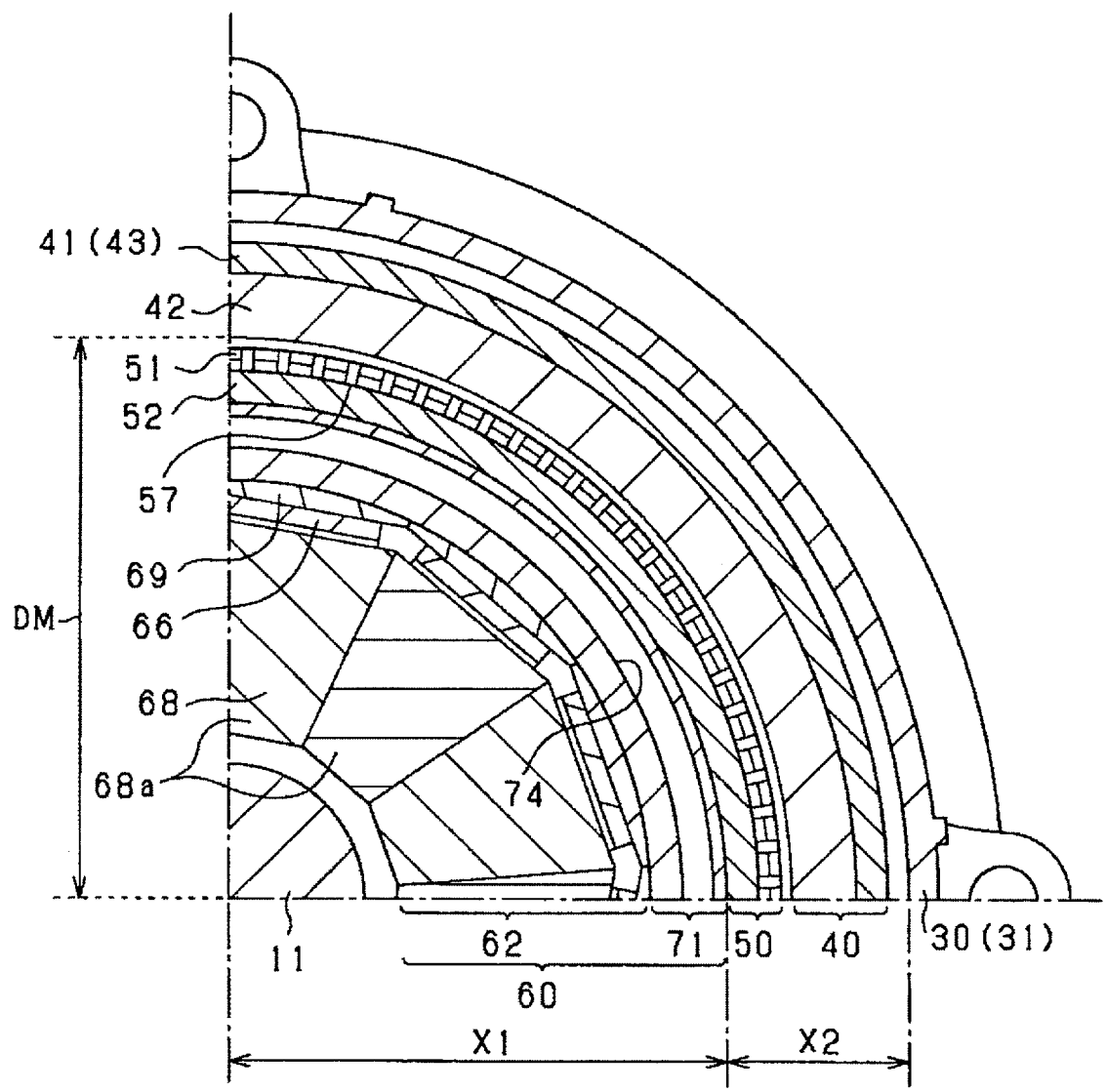
FIG. 4 is a partially enlarged sectional view of part of FIG. 3.
Figure 5:
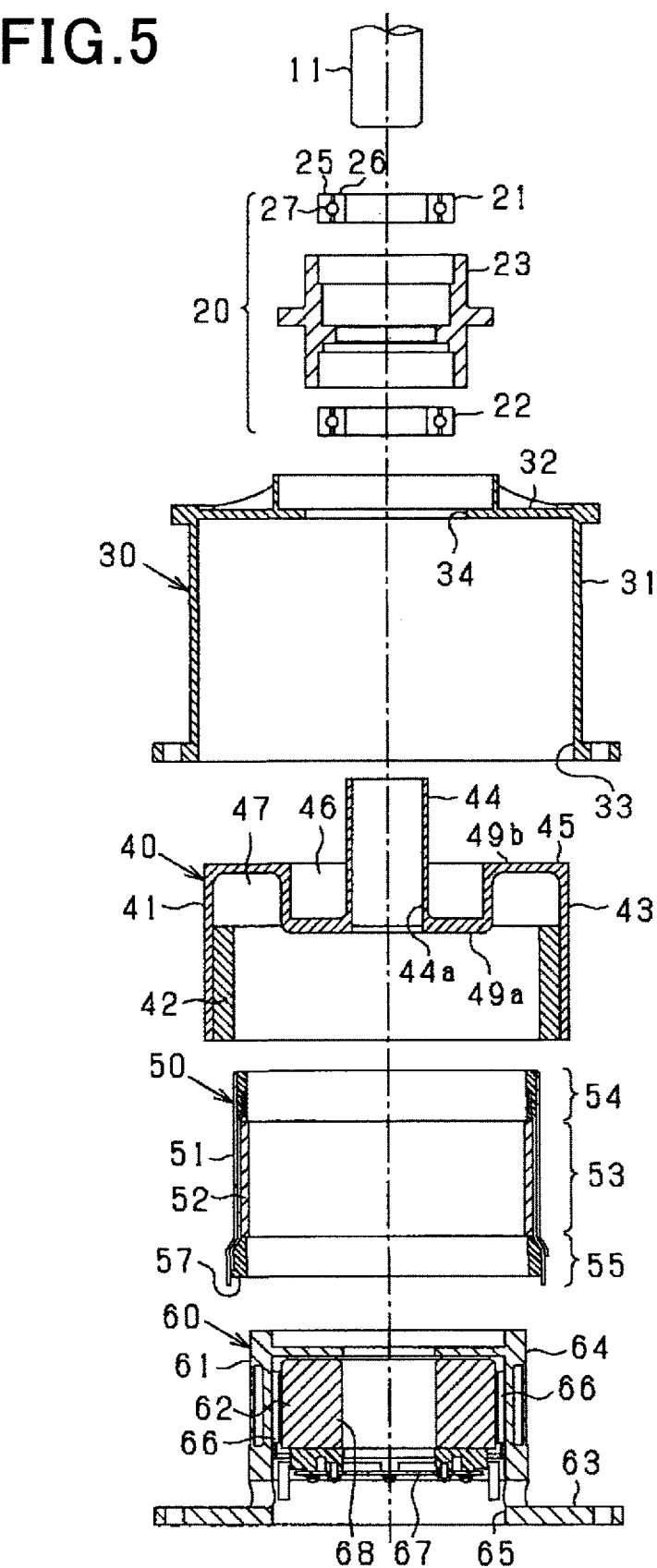
FIG. 5 is an exploded view of the rotating electrical machine.

FIG. 4 is a partially enlarged sectional view of FIG. 3. FIG. 5 is an exploded view of the rotating electrical machine 10. FIG. 3 omits hatching showing a section except the rotating shaft 11 for the sake of simplicity of the drawings. In the following discussion, a lengthwise direction of the rotating shaft 11 will also be referred to as an axial direction. A radial direction from the center of the rotating shaft 11 will be simply referred to as a radial direction. A direction along a circumference of the rotating shaft 11 about the center thereof will be simply referred to as a circumferential direction.

The rotating electrical machine 10 includes a bearing unit 20, a housing 30, a rotor 40, a stator 50, and an inverter unit 60. These members are arranged coaxially with each other together with the rotating shaft 11 and assembled in a given sequence to complete the rotating electrical machine 10. The rotating electrical machine 10 in this embodiment is equipped with the rotor 40 working as a magnetic field generator or a field system and the stator 50 working as an armature and engineered as a revolving-field type rotating electrical machine.

The bearing unit 20 includes two bearings 21 and 22 arranged away from each other in the axial direction and the retainer 23 which retains the bearings 21 and 22. The bearings 21 and 22 are implemented by, for example, radial ball bearings each of which includes the outer race 25, the inner race 26, and a plurality of balls 27 disposed between the outer race 25 and the inner race 26. The retainer 23 is of a cylindrical shape. The bearings 21 and 22 are disposed radially inside the retainer 23. The rotating shaft 11 and the rotor 40 are retained radially inside the bearings 21 and 22 to be rotatable. The bearings 21 and 22 are used as a set of bearings to rotatably retain the rotating shaft 11.

Each of the bearings 21 and 22 holds the balls 27 using a retainer, not shown, to keep a pitch between the balls 27 constant. Each of the bearings 21 and 22 is equipped with seals on axially upper and lower ends of the retainer and also has non-conductive grease (e.g., non-conductive urease grease) installed inside the seals. The position of the inner race 26 is mechanically secured by a spacer to exert constant inner precompression on the inner race 26 in the form of a vertical convexity.

The housing 30 includes a cylindrical peripheral wall 31. The peripheral wall 31 has a first end and a second end opposed to each other in an axial direction thereof. The peripheral wall 31 has an end surface 32 on the first end and the opening 33 in the second end. The opening 33 occupies the entire area of the second end. The end surface 32 has formed in the center thereof a circular hole 34.

The bearing unit 20 is inserted into the hole 34 and fixed using a fastener, such as a screw or a rivet. The rotor 40, which has a hollow cylindrical shape, and the stator 50, which has a hollow cylindrical shape, are disposed in an inner space defined by the peripheral wall 31 and the end surface 32 within the housing 30. In this embodiment, the rotating electrical machine 10 is of an outer rotor type, so that the stator 50 is arranged radially inside the cylindrical rotor 40 within the housing 30. The rotor 40 is retained in a cantilever form by a portion of the rotating shaft 11 close to the end surface 32 in the axial direction.

The rotor 40 includes a hollow cylindrical magnetic holder 41 and an annular magnet unit 42 disposed radially inside the magnet holder 41. The magnet holder 41 is of substantially a cup-shape and works as a magnet holding member. The magnet holder 41 includes a cylinder 43, an attaching portion 44 which is of a cylindrical shape and smaller in diameter than the cylinder 43, and an intermediate portion 45 connecting the cylinder 43 and the attaching portion 44 together. The cylinder 43 has the magnet unit 42 secured to an inner peripheral surface thereof.

The magnet holder 41 is made of cold rolled steel (SPCC), forging steel, or carbon fiber reinforced plastic (CFRP) which have a required degree of mechanical strength.

The attaching portion 44 has a through-hole 44a, and the rotating shaft 11 passes through the through-hole 44a of the attaching portion 44. The attaching portion 44 is secured to a portion of the rotating shaft 11 disposed inside the through-hole 44a. In other words, the magnet holder 41 is secured to the rotating shaft 11 through the attaching portion 44.

The attaching portion 44 may preferably be joined to the rotating shaft 11 using concavities and convexities, such as a spline joint or a key joint, welding, or crimping, so that the rotor 40 rotates along with the rotating shaft 11.

The bearings 21 and 22 of the bearing unit 20 are secured radially outside the attaching portion 44. The bearing unit 20 is, as described above, fixed on the end surface 32 of the housing 30, so that the rotating shaft 11 and the rotor 40 are retained by the housing 30 to be rotatable. The rotor is, thus, rotatable within the housing 30.

The rotor 40 is equipped with the attaching portion 44 arranged only one of ends thereof opposed to each other in the axial direction of the rotor 40. This cantilevers the rotor 40 on the rotating shaft 11. The attaching portion 44 of the rotor 40 is rotatably retained at two points of supports using the bearings 21 and 22 of the bearing unit 20 which are located away from each other in the axial direction.

In other words, the rotor 40 is held to be rotatable using the two bearings 21 and 22 which are separate at a distance away from each other in the axial direction on one of the axially opposed ends of the magnet holder 41. This ensures the stability in rotation of the rotor 40 even though the rotor 40 is cantilevered on the rotating shaft 11. The rotor 40 is retained by the bearings 21 and 22 at locations which are away from the center intermediate between the axially opposed ends of the rotor 40 in the axial direction thereof.

The bearing 22 of the bearing unit 20, which is located closer to the center of the rotor 40 (a lower one of the bearings 21 and 22 in the drawings), has gaps between each of the outer and inner races 25 and 26 and the balls 27, and the bearing 21 of the bearing unit 20, which is located farther away from the center of the rotor 40 (i.e., an upper one of the bearings 21 and 22), has gaps between each of the outer and inner races 25 and 26 and the balls 27. These gaps of the bearing 22 are different in dimension from these gaps of the bearing 21.

For instance, the bearing 22 closer to the center of the rotor 40 is greater in the dimension of the gaps from the bearing 21. This minimizes adverse effects on the bearing unit 20 which arise from deflection of the rotor or mechanical vibration of the rotor 40 due to imbalance resulting from parts tolerance at a location of the bearing unit 20 close to the center of the rotor 40.

Specifically, the bearing 22 closer to the center of the rotor 40 is engineered to have dimensions of the gaps or plays increased using precompression, thereby absorbing the vibration generating in the cantilever structure.

The precompression may be provided by either fixed position preload or constant pressure preload. In the case of the fixed position preload, the outer race 25 of each of the bearings 21 and 22 is joined to the retainer 23 using press-fitting or welding. The inner race 26 of each of the bearings 21 and 22 is joined to the rotating shaft 11 by press-fitting or welding. The precompression may be created by placing the outer race 25 of the bearing 21 away from the inner race 26 of the bearing 21 in the axial direction or alternatively placing the outer race 25 of the bearing 22 away from the inner race 26 of the bearing 22 in the axial direction.

In the case of the constant pressure preload, a preload spring, such as a wave washer 24, is arranged between the bearing 22 and the bearing 21 to create the preload directed from a region between the bearing 22 and the bearing 21 toward the outer race 25 of the bearing 22 in the axial direction. In this case, the inner race 26 of each of the bearing 21 and the bearing 22 is joined to the rotating shaft 11 using press fitting or bonding. The outer race 25 of the bearing 21 or the bearing 22 is arranged away from the outer race 25 through a given clearance. This structure exerts pressure, as produced by the preload spring, on the outer race 25 of the bearing 22 to urge the outer race 25 away from the bearing 21. The pressure is then transmitted through the rotating shaft 11 to urge the inner race 26 of the bearing 21 toward the bearing 22, thereby bringing the outer race 25 of each of the bearings 21 and 22 away from the inner race 26 thereof in the axial direction to exert the preload on the bearings 21 and 22 in the same way as the fixed position preload.

The constant pressure preload does not necessarily need to exert the spring pressure, as illustrated in FIG. 2, on the outer race 25 of the bearing 22, but may alternatively be created by exerting the spring pressure on the outer race 25 of the bearing 21. The exertion of the preload on the bearings 21 and 22 may alternatively be achieved by placing the inner race 26 of one of the bearings 21 and 22 away from the rotating shaft 11 through a given clearance therebetween and joining the outer race 25 of each of the bearings 21 and 22 to the retainer 23 using press-fitting or bonding.

Further, in the case where the pressure is created to bring the inner race 26 of the bearing 21 away from the bearing 22, such pressure is preferably additionally exerted on the inner race 26 of the bearing 22 away from the bearing 21. Conversely, in the case where the pressure is created to bring the inner race 26 of the bearing 21 close to the bearing 22, such pressure is preferably additionally exerted on the inner race 26 of the bearing 22 to bring it close to the bearing 21.

In a case where the rotating electrical machine 10 is used as, for example, a power source for a vehicle, there is a possibility that mechanical vibration having a component oriented in a direction in which the preload is created may be exerted on the preload generating structure or that a direction in which the force of gravity acts on an object to which the preload is applied may be changed. In order to alleviate such a problem, the fixed position preload is preferably used in the case where the rotating electrical machine 10 is mounted in a vehicle.

The intermediate portion 45 includes an annular inner shoulder 49a and an annular outer shoulder 49b.

The outer shoulder 49b is arranged outside the inner shoulder 49a in the radial direction of the intermediate portion 45. The inner shoulder 49a and the outer shoulder 49b are separate from each other in the axial direction of the intermediate portion 45. This layout results in a partial overlap between the cylinder 43 and the attaching portion 44 in the radial direction of the intermediate portion 45. In other words, the cylinder 43 protrudes outside a base end portion (i.e., a lower portion, as viewed in the drawing) of the attaching portion 44 in the axial direction. The structure in this embodiment enables the rotor 40 to be retained by the rotating shaft 11 at a location closer to the center of gravity of the rotor 40 than a case where the intermediate portion 45 is shaped to be flat without any shoulder, thereby ensuring the stability in operation of the rotor 40.

In the above described structure of the intermediate portion 45, the rotor 40 has an annular bearing housing recess 46 which is formed in an inner portion of the intermediate portion 45 and radially surrounds the attaching portion 44. The bearing housing recess 46 has a portion of the bearing unit 20 disposed therein.

The rotor 40 also has a coil housing recess 47 which is formed in an outer portion of the intermediate portion 45 and radially surrounds the bearing housing recess 46. The coil housing recess 47 has disposed therein the coil end 54 of a stator coil 51 of the stator 50, which will be described later in detail. The housing recesses 46 and 47 are arranged adjacent each other in the axial direction. In other words, a portion of the bearing unit 20 is laid to overlap the coil end 54 of the stator coil 51 in the axial direction. This enables the rotating electrical machine 10 to have a length decreased in the axial direction.

The intermediate portion 45 extends or overhangs outward from the rotating shaft 11 in the radial direction. The intermediate portion 45 is equipped with a contact avoider which extends in the axial direction and avoids a physical contact with the coil end 54 of the stator coil 51 of the stator 50. The intermediate portion 45 will also be referred to as an overhang.

The coil end 54 may be bent radially inwardly or outwardly to have a decreased axial dimension, thereby enabling the axial length of the stator 50 to be decreased. A direction in which the coil end 54 is bent is preferably determined depending upon installation thereof in the rotor 40. In the case where the stator 50 is installed radially inside the rotor 40, a portion of the coil end 54, which is inserted into the rotor 40, is preferably bent radially inwardly. A coil end opposite the coil end 54 may be bent either inwardly or outwardly, but is preferably bent to an outward side where there is an enough space in terms of the production thereof.

The magnet unit 42 working as a magnetic portion is made up of a plurality of permanent magnets which are disposed radially inside the cylinder 43 to have different magnetic poles arranged alternately in a circumferential direction thereof. The magnet unit 42, thus, has a plurality of magnetic poles arranged in the circumferential direction. The magnet unit 42 will also be described later in detail.

The stator 50 is arranged radially inside the rotor 40. The stator 50 includes the stator coil 51 wound in a substantially cylindrical (annular) form and a stator core 52 used as a base member arranged radially inside the stator coil 51. The stator coil 51 is arranged to face the annular magnet unit 42 through a given air gap therebetween. The stator coil 51 includes a plurality of phase windings each of which is made of a plurality of conductors which are arranged at given pitches away from one another in the circumferential direction and joined together. In this embodiment, first and second sets of three-phase windings:

The first set includes a U-phase winding, a V-phase winding, and a W-phase winging, and the second set includes an X-phase winding, a Y-phase winding, and a Z-phase winding. The stator coil 51 uses these first and second sets of three-phase windings so as to serve as a six-phase coil.

The stator core 52 is formed by an annular stack of magnetic steel plates made of soft magnetic material and mounted radially inside the stator coil 51. The magnetic steel plates are, for example, silicon nitride steel plates made by adding a small percent (e.g., 3o) of silicon nitride to iron. The stator coil 51 corresponds to an armature winding. The stator core 52 corresponds to an armature core.

The stator coil 51 overlaps the stator core 52 in the radial direction and includes a coil side portion 53 disposed radially outside the stator core 52, and the coil ends 54 and 55 overhanging respective ends of the stator core 52 in the axial direction. The coil side portion 53 faces the stator core 52 and the magnet unit 42 of the rotor 40 in the radial direction. The stator 50 is arranged inside the rotor 40. The coil end 54, which is one (i.e., an upper one, as viewed in the drawings) of the axially opposed coil ends 54 and 55 and arranged close to the bearing unit 20, is disposed in the coil housing recess 47 defined by the magnet holder 41 of the rotor 40. The stator 50 will also be described later in detail.

The inverter unit 60 includes a unit base 61 secured to the housing using fasteners, such as bolts, and a plurality of electrical components 62 mounted on the unit base 61. The unit base 61 is made from, for example, carbon fiber reinforced plastic (CFRP). The unit base 61 includes an end plate 63 secured to an edge of the opening 33 of the housing 30 and a casing 64 which is formed integrally with the end plate 63 and extends in the axial direction. The end plate 63 has a circular opening 65 formed in the center thereof. The casing 64 extends upward from a peripheral edge of the opening 65.

The stator 50 is arranged on an outer peripheral surface of the casing 64. Specifically, an outer diameter of the casing 64 is selected to be identical with or slightly smaller than an inner diameter of the stator core 52. The stator core 52 is attached to the outer side of the casing 64 to complete a unit made up of the stator 50 and the unit base 61. The unit base 61 is secured to the housing 30, so that the stator 50 is unified with the housing 50 in a condition where the stator core 52 is installed on the casing 64.

The stator core 52 may be bonded, shrink-fit, or press-fit on the unit base 61, thereby eliminating positional shift of the stator core 52 relative to the unit base 61 both in the circumferential direction and in the axial direction.

The casing 64 has a radially inner storage space in which the electrical components 62 are disposed. The electrical components 62 are arranged to surround the rotating shaft 11 within the storage space. The casing 64 functions as a storage space forming portion. The electrical components 62 include semiconductor modules 66, a control board 67, and a capacitor module 68 which constitute an inverter circuit.

The unit base 61 serves as a stator holder (i.e., an armature holder) which is arranged radially inside the stator 50 and retains the stator 50. The housing 30 and the unit base 61 define a motor housing for the rotating electrical machine 10. In the motor housing, the retainer 23 is secured to a first end of the housing 30 which is opposed to a second end of the housing through the rotor 40 in the axial direction. The second end of the housing 30 and the unit base 61 are joined together. For instance, in an electric-powered vehicle, such as an electric automobile, the motor housing is attached to a side of the vehicle to install the rotating electrical machine in the vehicle.

Figure 6:
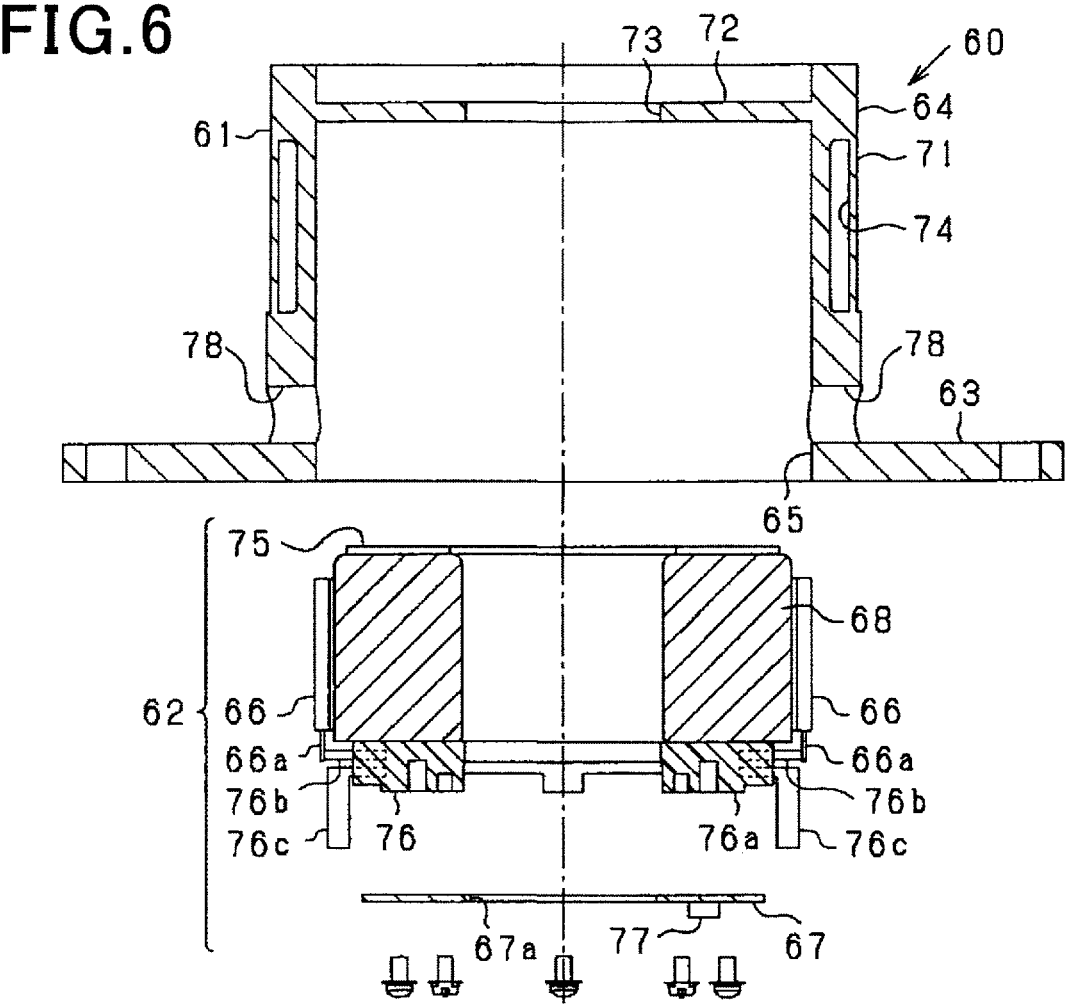
FIG. 6 is an exploded view of an inverter unit.

The inverter unit 60 will be also described using FIG. 6 that is an exploded view in addition to FIGS. 1 to 5.

The casing 64 of the unit base 61 includes a cylinder 71 and an end surface 72 that is one of ends of the cylinder 71 which are opposed to each other in the axial direction of the cylinder 71 (i.e., the end of the casing 64 closer to the bearing unit 20). The end of the cylinder 71 opposed to the end surface 72 in the axial direction is shaped to fully open to the opening 65 of the end plate 63.

The end surface 72 has formed in the center thereof a circular hole 73 through which the rotating shaft 11 is insertable. The hole 73 has fitted therein a sealing member 171 which hermetically seals an air gap between the hole 73 and the outer periphery of the rotating shaft 11. The sealing member 171 is preferably implemented by, for example, a resinous slidable seal.

The cylinder 71 of the casing 64 serves as a partition which isolates the rotor 40 and the stator 50 arranged radially outside the cylinder 71 from the electrical components 62 arranged radially inside the cylinder 71. The rotor 40, the stator 50, and the electrical components 62 are arranged to be radially aligned from the inside of the cylinder 71 to the outside thereof.

The electrical components 62 are electrical devices making up the inverter circuit equipped with a motor function and a generator function. The motor function is to deliver electrical current to the phase windings of the stator coil 51 in a given sequence to turn the rotor 40. The generator function is to receive a three-phase ac current flowing through the stator coil 51 in response to the rotation of the rotating shaft 11 and generate and output electrical power. The electrical components 62 may be engineered to perform either one of the motor function and the generator function. In a case where the rotating electrical machine 10 is used as a power source for a vehicle, the generator function serves as a regenerative function to output a regenerated electrical power.

Specifically, the electrical components 62, as demonstrated in FIG. 4, include the capacitor module 68, which has a hollow cylindrical shape, arranged around the rotating shaft 11, and the semiconductor modules 66 mounted on the outer peripheral surface of the capacitor module 68. The capacitor module 68 has a plurality of smoothing capacitors 68a connected in parallel to each other.

Specifically, each of the capacitors 68a is implemented by a stacked-film capacitor which is made of a plurality of film capacitors stacked in a trapezoidal shape in cross section. In this embodiment, twelve capacitors 68a are arranged annually to constitute the capacitor module 68.

The capacitors 68a may be produced by preparing a long film which has a given width and is made of a stack of films and cutting the long film into isosceles trapezoids each of which has a height identical with the width of the long film and whose short bases and long bases are alternately arranged. Mounting electrodes to the thus produced capacitor devices enables the capacitors 68a to be completed.

Each semiconductor module 66 includes, for example, a semiconductor switch, such as a MOSFET or an IGBT and is of substantially a planar shape. In this embodiment, the rotating electrical machine 10 is, as described above, equipped with the first and second sets of three-phase windings and has the inverter circuits, one for each set of the three-phase windings. The electrical components 62, therefore, include a total of twelve semiconductor modules 66 which are arranged in an annular form to make up a semiconductor module group 66A.

The semiconductor modules 66 are interposed between the cylinder 71 of the casing 64 and the capacitor module 68. The semiconductor module group 66A has an outer peripheral surface placed in contact with an inner peripheral surface of the cylinder 71. The semiconductor module group 66A also has an inner peripheral surface placed in contact with an outer peripheral surface of the capacitor module 68. This causes heat, as generated in the semiconductor modules 66, to be transferred to the end plate 63 through the casing 64, so that it is dissipated from the end plate 63.

The semiconductor module group 66A preferably has spacers 69 disposed radially outside the outer peripheral surface thereof, i.e., between the semiconductor modules 66 and the cylinder 71.

A combination of the capacitor modules 68 is so arranged as to have a regular dodecagonal section extending perpendicular to the axial direction thereof, while the inner periphery of the cylinder 71 has a circular transverse section. The spacers 69 are, therefore, each shaped to have a flat inner peripheral surface and a curved outer peripheral surface.

The spacers 69 may alternatively be formed integrally with each other in an annular shape and disposed radially outside the semiconductor module group 66A. The spacers 69 are highly thermally conductive and made of, for example, metal, such as aluminum or heat dissipating gel sheet. The inner periphery of the cylinder 71 may alternatively be shaped to have a dodecagonal transverse section like the capacitor modules 68. In this case, the spacers 69 are each preferably shaped to have a flat inner peripheral surface and a flat outer peripheral surface.

In this embodiment, the cylinder 71 of the casing 64 has formed therein a coolant path 74 through which coolant flows. The heat generated in the semiconductor modules 66 is also released to the coolant flowing in the coolant path 74. In other words, the casing 64 is equipped with a cooling mechanism. The coolant path 74 is, as clearly illustrated in FIGS. 3 and 4, formed in an annular shape and surrounds the electrical components 62 (i.e., the semiconductor modules 66 and the capacitor module 68). The semiconductor modules 66 are arranged along the inner peripheral surface of the cylinder 71. The coolant path 74 is laid to overlap the semiconductor modules 66 in the radial direction.

The stator 50 is arranged outside the cylinder 71. The electrical components 62 are arranged inside the cylinder 71. This layout causes the heat to be transferred from the stator 50 to the outer side of the cylinder 71 and also transferred from the electrical components 62 (e.g., the semiconductor modules 66) to the inner side of the cylinder 71. It is possible to simultaneously cool the stator 50 and the semiconductor modules 66, thereby facilitating dissipation of thermal energy generated by heat-generating members of the rotating electrical machine 10.

Further, at least one of the semiconductor modules 66, which constitute part or all of the inverter circuits serving to energize the stator coil 51 to drive the rotating electrical machine, is arranged in a region surrounded by the stator core 52 disposed radially outside the cylinder 71 of the casing 64. Preferably, one of the semiconductor modules 66 may be arranged fully inside the region surrounded by the stator core 52. More preferably, all the semiconductor modules 66 may be arranged fully in the region surrounded by the stator core 52.

At least a portion of the semiconductor modules 66 is arranged in a region surrounded by the coolant path 74. Preferably, all the semiconductor modules 66 may be arranged in a region surrounded by the yoke 141.

The electrical components 62 include an insulating sheet 75 disposed on one of axially opposed end surfaces of the capacitor module 68, and a wiring module 76 disposed on the other end surface of the capacitor module 68. The capacitor module 68 has two axially-opposed end surfaces: a first end surface and a second end surface. The first end surface of the capacitor module 68 closer to the bearing unit 20 faces the end surface 72 of the casing 64 and is laid on the end surface 72 through the insulating sheet 75. The second end surface of the capacitor module 68 closer to the opening 65 has the wiring module 76 mounted thereon.

The wiring module 76 includes a resin-made circular plate-shaped body 76a and a plurality of bus bars 76b and 76c embedded in the body 76a.

The bus bars 76b and 76c electrically connect the semiconductor modules 66 and the capacitor module 68 together. Specifically, the semiconductor modules 66 are equipped with connecting pins 66a extending from axial ends thereof. The connecting pins 66a connect with the bus bars 76b radially outside the body 76a. The bus bars 76c extend away from the capacitor module 68 radially outside the body 76a and have top ends connecting with the wiring members 79 (see FIG. 2).

The capacitor module 68, as described above, has the insulating sheet 75 mounted on the first end surface thereof. The capacitor module 68 also has the wiring module 76 mounted on the second end surface thereof. The capacitor module 68, therefore, has first and second heat dissipating paths which respectively extend from the first and second end surfaces of the capacitor module 68 to the end surface 72 and the cylinder 71.

Specifically, the first heat dissipating path is defined which extends from the first end surface to the end surface 72. The second heat dissipating path is defined which extends from the second end surface to the cylinder 71. This enables the heat to be released from the end surfaces of the capacitor module 68 other than the outer peripheral surface on which the semiconductor modules 66 are arranged. In other words, it is possible to dissipate the heat not only in the radial direction, but also in the axial direction.

The capacitor module 68 is of a hollow cylindrical shape, and the rotating shaft 11 is arranged within the capacitor module 68 at a given interval away from the inner periphery of the capacitor module 68, so that heat generated by the capacitor module 68 will be dissipated from the hollow cylindrical space. The rotation of the rotating shaft 11 usually produces a flow of air, thereby enhancing cooling effects.

The control board 67, which has a discotic shape, is mounted to the wiring module 76. The control board 67 includes a printed circuit board (PCB) on which given wiring patterns are formed and also has ICs and the control device 77 mounted thereon. The control device 77 serves as a controller and is comprised of a microcomputer. The control board 67 is secured to the wiring module 76 using fasteners, such as screws. The control board 67 has formed in the center thereof a hole 67a through which the rotating shaft 11 passes.

The wiring module 76 has a first surface and a second surface opposed to each other in the axial direction, that is, a thickness-wise direction of the wiring module 76. The first surface faces the capacitor module 68. The wiring module 76 has the control board 67 mounted on the second surface thereof. The bus bars 76c of the wiring module 76 extend from one of surfaces of the control board 67 to the other. The control board 67 may have cut-outs for avoiding physical interference with the bus bars 76c. For instance, the control board 67 may have the cut-outs formed in portions of the circular outer edge thereof.

The electrical components 62 are, as described already, arranged inside a space surrounded by the casing 64. The housing 30, the rotor 40, and the stator 50 are disposed outside the space in the form of layers. This structure serves to shield against electromagnetic noise generated in the inverter circuits.

Specifically, each inverter circuit works to control switching operations of the corresponding semiconductor modules 66 in a PWM control mode using a given carrier frequency. The switching operations usually generate electromagnetic noise against which the housing 30, the rotor 40, and the stator 50 which are arranged outside the electrical components 62 shield.

Further, at least a portion of the semiconductor modules 66 is arranged inside the region surrounded by the stator core 52 located radially outside the cylinder 71 of the casing 64, thereby minimizing adverse effects of magnetic flux generated by the semiconductor modules 66 on the stator coil 51 as compared with a case where the semiconductor modules 66 and the stator coil 51 are arranged without the stator core 52 interposed therebetween.

The magnetic flux created by the stator coil 51 also hardly affects the semiconductor modules 66. It is more effective that the whole of the semiconductor modules 66 are located in the region surrounded by the stator core 52 disposed radially outside the cylinder 71 of the casing 64. When at least a portion of the semiconductor modules 66 may be surrounded by the coolant path 74, it offers a beneficial advantage that the heat produced by the stator coil 51 or the magnet unit 42 is prevented from reaching the semiconductor modules 66.

The cylinder 71 has through-holes 78 which are formed near the end plate 63 and through which the wiring members 79 (see FIG. 2) respectively pass to electrically connect the stator 50 disposed outside the cylinder 71 and the electrical components 62 arranged inside the cylinder 71. The wiring members 79, as illustrated in FIG. 2, connect with ends of the stator coil 51 and with the bus bars 76c of the wiring module 76 using crimping or welding techniques.

The wiring members 79 are implemented by, for example, bus bars whose joining surfaces are preferably flattened. A single through-hole 78 or a plurality of through-holes 78 are preferably provided. This embodiment has two through-holes 78. The use of the two through-holes 78 facilitates the ease with which terminals extending from the two sets of the three-phase windings are connected by the wiring members 79, and is suitable for achieving multi-phase wire connections.

The rotor 40 and the stator 50 are, as described already in FIG. 4, arranged within the housing 30 in this order in a radially inward direction. The inverter unit 60 is arranged radially inside the stator 50.

If a radius of the inner periphery of the housing 30 is defined as d, the rotor 40 and the stator 50 are located radially outside a distance of d×0.705 away from the center of rotation of the rotor 40. If a region located radially inside the inner periphery of the stator 50 (i.e., the inner circumferential surface of the stator core 52) is defined as a first region X1, and a region radially extending from the inner periphery of the stator 50 to the housing 30 is defined as a second region X2, an area of a transverse section of the first region X1 is set greater than that of the second region X2. As viewed in a region where the magnet unit 42 of the rotor 40 overlaps the stator coil 51, the volume of the first region X1 is larger than that of the second region X2.

The rotor 40 and the stator 50 are fabricated as a magnetic circuit component assembly. In the housing 30, the first region X1, which is located radially inside the inner peripheral surface of the magnetic circuit component assembly, is larger in volume than the region X2, which lies between the inner peripheral surface of the magnetic circuit component assembly and the housing 30 in the radial direction.

Next, the structures of the rotor 40 and the stator 50 will be described below in more detail.

Typical rotating electrical machines are known which are equipped with a stator with an annular stator core; the annular stator core is made of a stack of steel plates. The stator has stator windings wound in a plurality of slots arranged in a circumferential direction of the stator core. Specifically, the stator core has teeth each extending in a corresponding radial direction thereof at a corresponding given interval away from a yoke. Each slot is formed between a corresponding pair of two radially adjacent teeth. In each slot, a plurality of conductors are arranged in the radial direction in the form of layers to form the stator windings.

However, the above described stator structure has a possibility that, when stator windings are energized, an increase in magnetomotive force based on the energized stator windings may result in magnetic saturation in the teeth of the stator core, thereby restricting torque density in the rotating electrical machine. In other words, rotational flux, as created by the energization of the stator windings of the stator core, may concentrate on the teeth, resulting in a possibility of causing magnetic saturation.

Generally, IPM (Interior Permanent Magnet) rotors are known which have a structure in which permanent magnets are arranged on a d-axis of a d-q axis coordinate system in a rotor core, and a portion of the rotor core is placed on a q-axis of the d-q axis coordinate system. Excitation of a stator winding near the d-axis causes an excited magnetic flux to flow from a stator to a rotor according to Fleming's rules. This causes magnetic saturation to occur widely in the rotor core on the q-axis.

Figure 7:
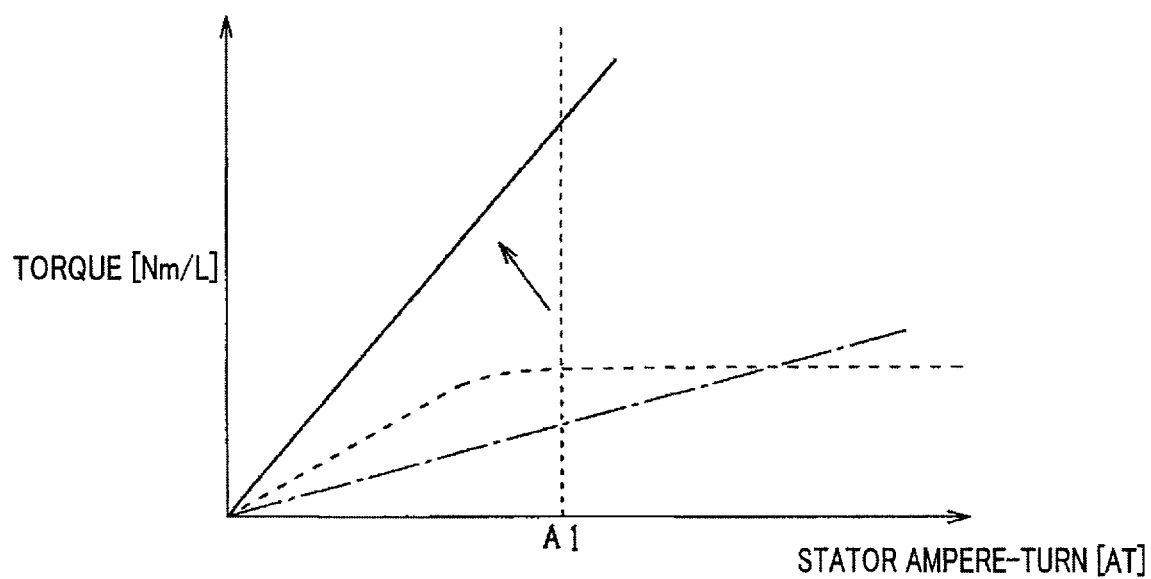
FIG. 7 is a graphic torque diagram which demonstrates a relationship between an ampere-turn and a torque density in a stator winding.

FIG. 7 is a graphic torque diagram which demonstrates a relationship between an ampere-turn (AT) representing a magnetomotive force created by a stator winding and a torque density (Nm/L). A broken line indicates characteristics of a typical IPM rotor-rotating electrical machine. FIG. 7 shows that, in the typical rotating electrical machine, an increase in magnetomotive force in a stator will cause magnetic saturation to occur at two places; one of the two places is each tooth between the corresponding adjacent pair of slots, and the other thereof is a q-axis core, which is a portion of the rotor core on the q-axis. This may result in a restriction of an increase in torque. In this way, a design value of the ampere-turn is restricted at A1 in the typical rotating electrical machine.

In order to alleviate the above problem in this embodiment, the rotating electrical machine 10 is designed to have an additional structure, as will be described below, which aims to eliminate the restriction arising from the magnetic saturation.

Specifically, as a first measure, the stator 50 is designed to have a slot-less structure for eliminating the magnetic saturation occurring in the teeth of the stator core of the stator and also to use an SPM (Surface Permanent Magnet) rotor for eliminating the magnetic saturation occurring in a q-axis core of the IPM rotor. The first measure serves to eliminate the above described two places where the magnetic saturation occurs, but however, may result in a decrease in torque in a low-current region (see an alternate long and short dash line in FIG. 7).

For alleviating this problem, as a second measure, the rotating electrical machine 10 employs a polar anisotropy structure to increase a magnetic path of magnets in the magnet unit 42 of the rotor 40 to thereby enhance a magnetic force. This will result in an increase in a magnetic flux in the SPM rotor to minimize the torque decrease.

Additionally, as a third measure, the rotating electrical machine 10 employs a flattened conductor structure to decrease a thickness of conductors of the coil side portion 53 of the stator coil 51 in the radial direction of the stator 50 for compensating for the torque decrease. The above magnetic force-enhanced polar anisotropy structure would result in a flow of large eddy current in the stator coil 51 facing the magnet unit 42.

From this viewpoint, the third measure is to employ the flattened conductor structure in which the conductors have a decreased thickness in the radial direction, thereby minimizing the generation of the eddy current in the stator coil 51 in the radial direction. The above first to third structures are, as indicated by a solid line in FIG. 7, expected to greatly improve the torque characteristics using high magnetic, i.e. strong, magnets and also alleviate a risk of generation of a large eddy current resulting from the use of the high magnetic magnets.

Additionally, as a fourth measure, the rotating electrical machine 10 employs a magnet unit, which has a polar anisotropic structure to create a magnetic density distribution approximating a sine wave. This increases a sine wave matching percentage using pulse control, as will be described later, to thereby enhance the torque and also results in a moderate change in magnetic flux, thereby minimizing an eddy-current loss (i.e., a copper loss caused by eddy current) as compared with radial magnets.

The sine wave matching percentage will be described below.

The sine wave matching percentage may be derived by comparing a waveform, a cycle, and a peak value of a surface magnetic flux density distribution measured by actually moving a magnetic flux probe on a surface of a magnet with those of a sine wave. The since wave matching percentage is given by a percentage of an amplitude of a primary waveform that is a waveform of a fundamental wave in a rotating electrical machine to that of the actually measured waveform, that is, an amplitude of the sum of the fundamental wave and harmonic components.

An increase in the sine wave matching percentage will cause the waveform in the surface magnetic flux density distribution to approach the waveform of the sine wave. When an electrical current of a primary sine wave is delivered by an inverter to a rotating electrical machine equipped with magnets having an improved sine wave matching percentage, it will cause a large degree of torque to be produced, combined with the fact that the waveform in the surface magnetic flux density distribution of the magnet is close to the waveform of a sine wave. The surface magnetic flux density distribution may alternatively be derived using electromagnetic analysis according to Maxwell's equations.

As a fifth measure, the stator coil 51 is designed to have a conductor strand structure made of a bundle of wires. In the conductor strand structure of the stator coil 51, the wires are connected parallel to each other, thus enabling a high current or large amount of current to flow in the stator coil 51 and also minimizing an eddy current occurring in the conductors widened in the circumferential direction of the stator 50 more effectively than the third measure in which the conductors are flattened in the radial direction because each of the wires has a decreased transverse sectional area.

The use of the bundle of the wires will cancel an eddy current arising from magnetic flux occurring according to Ampere's circuital law in response to the magnetomotive force produced by the conductors.

The use of the fourth and fifth measures minimizes the eddy-current loss resulting from the high magnetic force produced by the high-magnetic force magnets provided by the second measure and also enhance the torque.

The slot-less structure of the stator 50, the flattened conductor structure of the stator coil 51, and the polar anisotropy structure of the magnet unit 42 will be described below.

Figure 8:
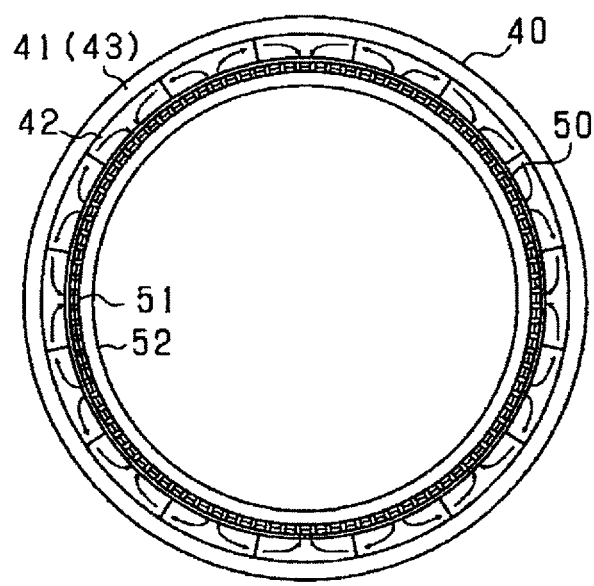
FIG. 8 is a transverse sectional view of a rotor and a stator.
Figure 9:
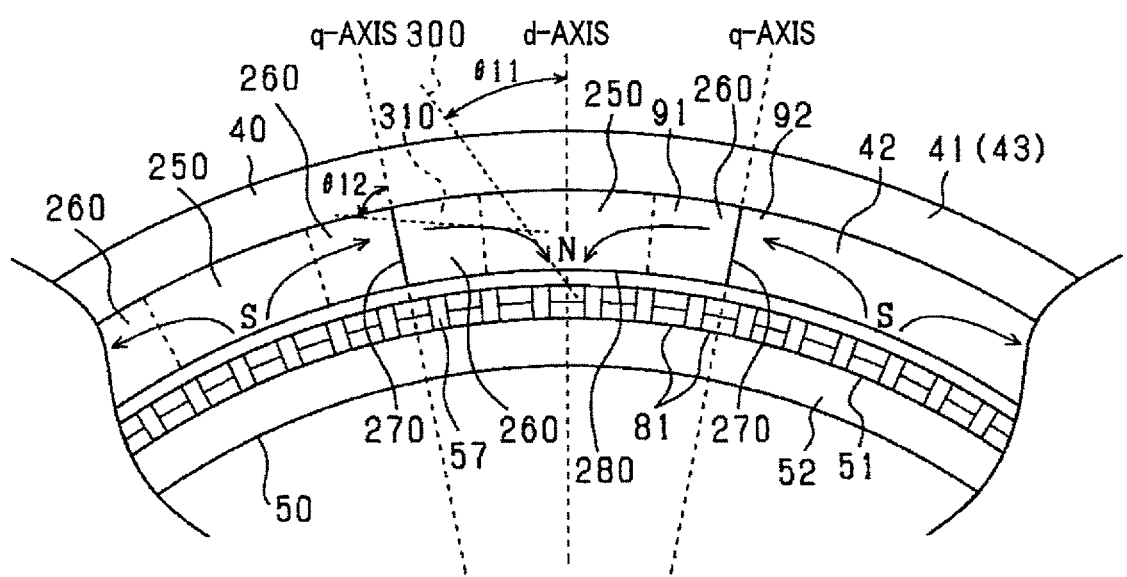
FIG. 9 is an enlarged view of part of FIG. 8.
Figure 10:
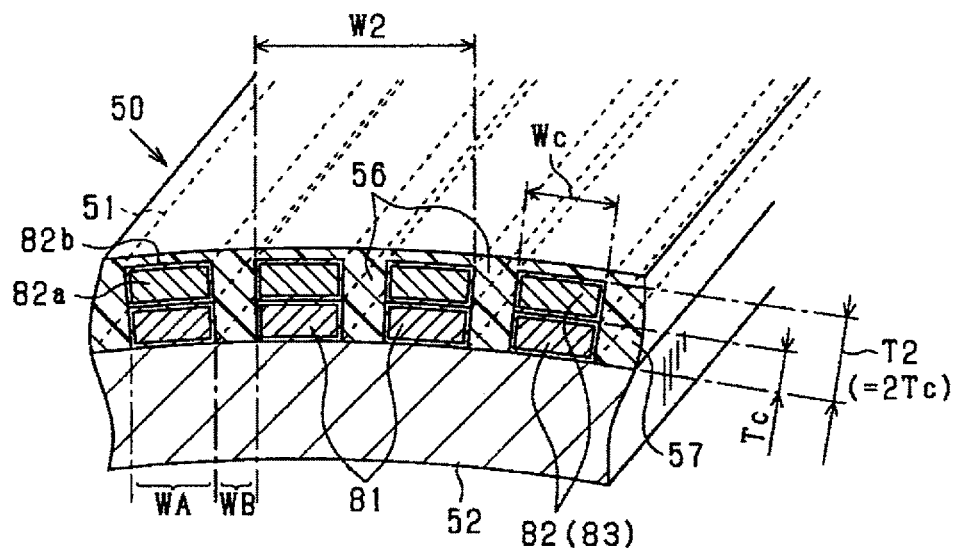
FIG. 10 is a transverse sectional view of a stator.
Figure 11:
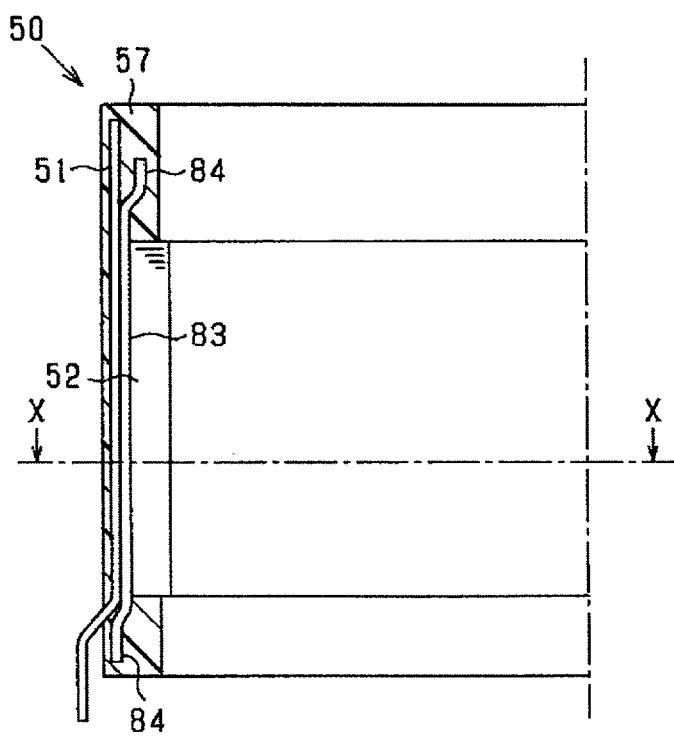
FIG. 11 is a longitudinal sectional view of a stator.
Figure 12:
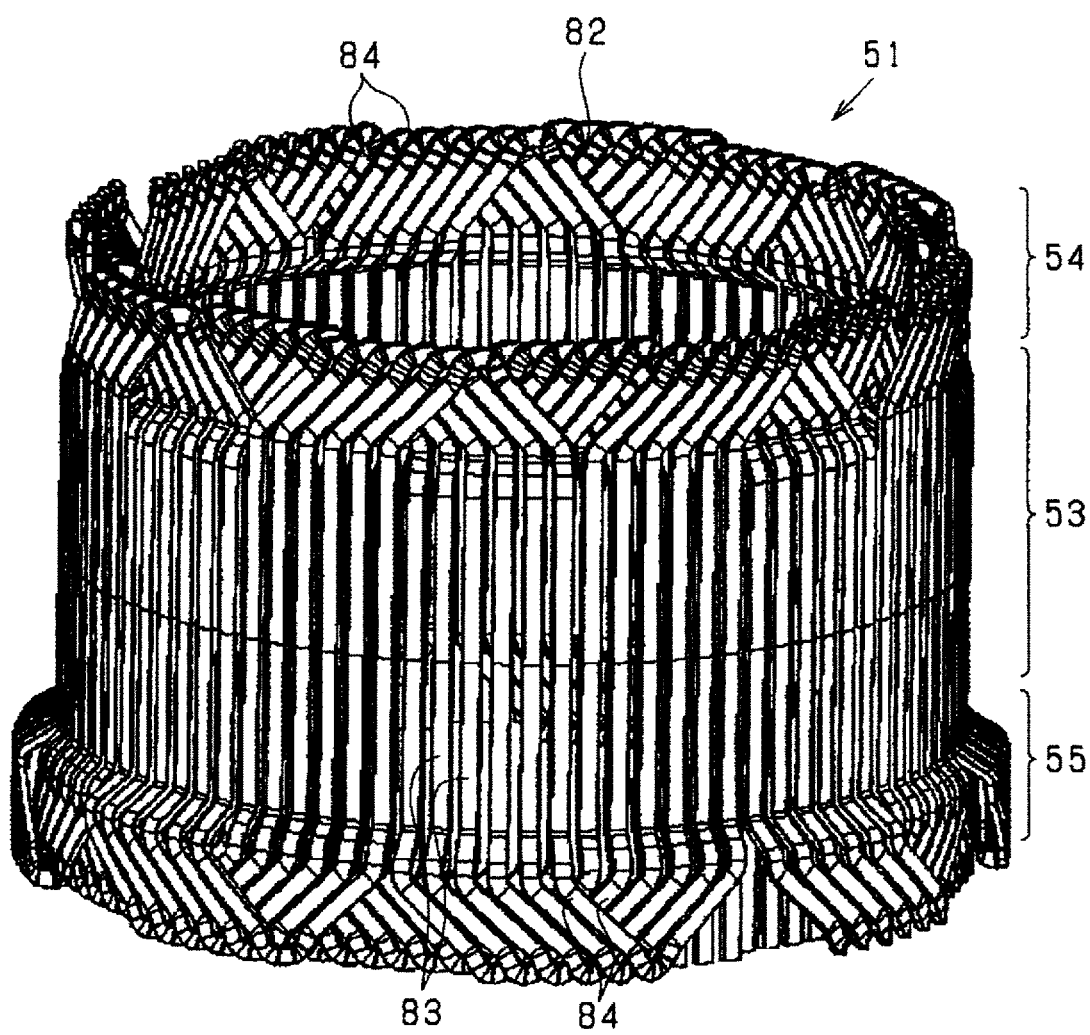
FIG. 12 is a perspective view of a stator winding.

The slot-less structure of the stator 50 and the flattened conductor structure of the stator coil 51 will first be discussed. FIG. 8 is a transverse sectional view illustrating the rotor 40 and the stator 50. FIG. 9 is a partially enlarged view illustrating the rotor 40 and the stator 50 in FIG. 8. FIG. 10 is a transverse sectional view of the stator 50 taken along the line X-X in FIG. 11. FIG. 11 is a longitudinal sectional view of the stator 50. FIG. 12 is a perspective view of the stator coil 51. FIGS. 8 and 9 indicate directions of magnetization of magnets of the magnet unit 42 using arrows.

The stator core 52 has, as clearly illustrated in FIGS. 8 to 11, a cylindrical shape and is comprised of a plurality of magnetic steel plates stacked in the axial direction of the stator core 52 to have a given thickness in a radial direction of the stator core 52. The stator coil 51 is mounted on the outer periphery of the stator core 52 which faces the rotor 40.

The outer peripheral surface of the stator core 52 facing the rotor 40 serves as a conductor mounting portion (i.e., a conductor area). The outer peripheral surface of the stator core 52 is shaped as a curved surface without any irregularities.

A plurality of conductor groups 81 are arranged on the outer peripheral surface of the stator core 52 at given intervals away from each other in the circumferential direction of the stator core 52. The stator core 52 functions as a back yoke that is a portion of a magnetic circuit working to rotate the rotor 40. The stator 50 is designed to have a structure in which no tooth (i.e., no portion of a core) made of a soft magnetic material is disposed between each pair of adjacent conductor groups 81 in the circumferential direction (i.e., the slot-less structure).

In this embodiment, a resin material of the sealing member 57 is disposed in the space or gap 56 between each pair of adjacent conductor groups 81. In other words, the stator 50 has a conductor-to-conductor member which is disposed between the conductor groups 81 arranged adjacent each other in the circumferential direction of the stator 50 and made of a non-magnetic material. The conductor-to-conductor members serve as the sealing members 57.

Before the sealing members 57 are placed to seal the gaps 56, the conductor groups 81 are arranged in the circumferential direction radially outside the stator core 52 at a given interval away from each other through the gaps 56 that are conductor-to-conductor regions. This makes up the slot-less structure of the stator 50. In other words, each of the conductor groups 81 is, as described later in detail, made of two conductors 82. An interval between a respective two of the conductor groups 81 arranged adjacent each other in the circumferential direction of the stator 50 is occupied only by a non-magnetic material. The non-magnetic material, as referred to herein, includes a non-magnetic gas, such as air, or a non-magnetic liquid. In the following discussion, the sealing members 57 will also be referred to as conductor-to-conductor members.

The structure, as referred to herein, in which each of the teeth is disposed between the corresponding adjacent pair of the conductor groups 81 arrayed in the circumferential direction means that each of the teeth has a given thickness in the radial direction and a given width in the circumferential direction of the stator 50, so that a portion of the magnetic circuit, that is, a magnet magnetic path, lies between each adjacent pair of the conductor groups 81.

In contrast, the structure in which no tooth lies between the adjacent conductor groups 81 means that there is no magnetic circuit between each adjacent pair of the conductor groups 81.

The stator coil (i.e., an armature coil) 51, as illustrated in FIG. 10, has a given thickness T2 (which will also be referred to below as a first dimension) and a width W2 (which will also be referred to below as a second dimension). The thickness T2 is given by a minimum distance between an outer side surface and an inner side surface of the stator coil 51 which are opposed to each other in the radial direction of the stator 50.

The width W2 is given by a dimension of a portion of the stator coil 51 which functions as one of multiple phases (i.e., the U-phase, the V-phase, the W-phase, the X-phase, the Y-phase, and the Z-phase in this embodiment) of the stator coil 51 in the circumferential direction. Specifically, in a case where one adjacent pair of the conductor groups 81 in the circumferential direction in FIG. 10 serves as a corresponding one of the three phases, for example, the U-phase winding, a distance between circumferentially outermost ends of the conductor groups 81 of the circumferentially adjacent pair of the conductor groups 81 is the width W2. The thickness T2 is smaller than the width W2.

The thickness T2 is preferably set smaller than the sum of widths of the two conductor groups 81 within the width W2. If the stator coil 51 (more specifically, the conductor 82) is designed to have a true circular transverse section, an oval transverse section, or a polygonal transverse section, the cross section of the conductor 82 taken in the radial direction of the stator 50 may be shaped to have a maximum dimension W12 in the radial direction of the stator 50 and a maximum dimension W11 in the circumferential direction of the stator 50.

The stator coil 51 is, as can be seen in FIGS. 10 and 11, sealed by the sealing members 57 which are formed by a synthetic resin mold.

Specifically, the stator coil 51 and the stator core 52 are put in a mold together when the sealing members 57 are molded by the resin. The resin may be considered as a non-magnetic material or an equivalent thereof whose Bs (saturation magnetic flux density) is zero.

As shown in the transverse section in FIG. 10, the sealing members 57 are provided by placing synthetic resin in the gaps 56 between the conductor groups 81. The sealing members 57 serve as insulators arranged between the conductor groups 81. In other words, each of the sealing members 57 functions as an insulator in one of the gaps 56. The sealing members 57 occupy a region which is located radially outside the stator core 52, and includes all the conductor groups 81, in other words, which is defined to have a thickness dimension larger than that of each of the conductor groups 81 in the radial direction.

As shown in the longitudinal section in FIG. 11, the sealing members 57 lie to occupy a region including the turns 84 of the stator coil 51. Radially inside the stator coil 51, the sealing members 57 lie in a region including at least a portion of the axially opposed ends of the stator core 52. In this case, the stator coil 51 is fully sealed by the resin except for the ends of each phase winding, i.e., terminals joined to the inverter circuits.

The structure in which the sealing members 57 are disposed in the region including the ends of the stator core 52 enables the sealing members 57 to compress the stack of the steel plates of the stator core 52 inwardly in the axial direction. In other words, the sealing members 57 work to firmly retain the stack of the steel plates of the stator core 52. In this embodiment, the inner peripheral surface of the stator core 52 is not sealed using resin, but however, the whole of the stator core 52 including the inner peripheral surface may be sealed using resin.

In a case where the rotating electrical machine 10 is used as a power source for a vehicle, the sealing members 57 are preferably made of a high heat-resistance fluororesin, epoxy resin, PPS resin, PEEK resin, LCP resin, silicon resin, PAI resin, or PI resin. In terms of a linear coefficient expansion to minimize breakage of the sealing members 57 due to an expansion difference, the sealing members 57 are preferably made of the same material as that of an outer film of the conductors of the stator coil 51. The silicon resin whose linear coefficient expansion is twice or more those of other resins is preferably excluded from the material of the sealing members 57. In a case of electrical products, such as electric vehicles equipped with no combustion engine, PPO resin, phenol resin, or FRP resin which resists 180° C. may be used. Other resin materials can be used in fields where an ambient temperature of the rotating electrical machine is expected to be lower than 100° C.

The degree of torque outputted by the rotating electrical machine 10 is usually proportional to the degree of magnetic flux. In a case where a stator core is equipped with teeth, a maximum amount of magnetic flux in the stator core is restricted depending upon the saturation magnetic flux density in the teeth, while in a case where the stator core is not equipped with teeth, the maximum amount of magnetic flux in the stator core is not restricted. Such a structure is, therefore, useful for increasing an amount of electrical current delivered to the stator coil 51 to increase the degree of torque produced by the rotating electrical machine 10.

This embodiment employs the slot-less structure in which the stator 50 is not equipped with teeth, thereby resulting in a decrease in inductance of the stator 50. Specifically, a stator of a typical rotating electrical machine in which conductors are disposed in slots isolated by teeth from each other has an inductance of approximately 1 mH, while the stator 50 in this embodiment has a decreased inductance of 5 to 60 pH. The rotating electrical machine 10 in this embodiment is of an outer rotor type, but has a decreased inductance of the stator 50 to decrease a mechanical time constant Tm. In other words, the rotating electrical machine 10 is capable of outputting a high degree of torque and designed to have a decreased value of the mechanical time constant Tm. If inertia is defined as J, inductance is defined as L, torque constant is defined as Kt, and back electromotive force constant is defined as Ke, the mechanical time constant Tm is calculated according to the equation of Tm=(J×L)/(Kt×Ke). This shows that a decrease in inductance L will result in a decrease in mechanical time constant Tm.

Each of the conductor groups 81 arranged radially outside the stator core 52 is made of a plurality of conductors 82 whose transverse section is of a flattened rectangular shape and which are disposed on one another in the radial direction of the stator core 52. Each of the conductors 82 is oriented to have a transverse section meeting a relation of radial dimension <circumferential dimension. This causes each of the conductor groups 81 to be thin in the radial direction. A conductive region of the conductor group 81 also extends inside a region occupied by teeth of a typical stator. This creates a flattened conductive region structure in which a sectional area of each of the conductors 82 is increased in the circumferential direction, thereby alleviating a possibility that the amount of thermal energy may be increased by a decrease in sectional area of a conductor arising from flattening of the conductor. A structure in which a plurality of conductors are arranged in the circumferential direction and connected in parallel to each other is usually subjected to a decrease in sectional area of the conductors by a thickness of a coated layer of the conductors, but however, has beneficial advantages obtained for the same reasons as described above. In the following discussion, each of the conductor groups 81 or each of the conductors 82 will also be referred to as a conductive member.

The stator 50 in this embodiment is, as described already, designed to have no slots, thereby enabling the stator coil 51 to be designed to have a conductive region of an entire circumferential portion of the stator 50 which is larger in size than a non-conductive region unoccupied by the stator coil 51 in the stator 50.

In typical rotating electrical machines for vehicles, a ratio of the conductive region/the non-conductive region is usually one or less. In contrast, this embodiment has the conductor groups 81 arranged to have the conductive region substantially identical in size with or larger in size than the non-conductive region. If the conductor region, as illustrated in FIG. 10, occupied by the conductor 82 (i.e., the straight section 83 which will be described later in detail) in the circumferential direction is defined as WA, and a conductor-to-conductor region that is an interval between a respective adjacent two of the conductors 82 is defined as WB, the conductor region WA is larger in size than the conductor-to-conductor region WB in the circumferential direction.

The conductor group 81 of the stator coil 51 has a thickness in the radial direction thereof which is smaller than a circumferential width of a portion of the stator coil 51 which lies in a region of one magnetic pole and serves as one of the phases of the stator coil 51.

In the structure in which each of the conductor groups 81 is made up of the two conductors 82 stacked in the form of two layers lying on each other in the radial direction, and the two conductor groups 81 are arranged in the circumferential direction within a region of one magnetic pole for each phase, a relation of Tc×2<Wc×2 is met where Tc is the thickness of each of the conductors 82 in the radial direction, and Wc is the width of each of the conductors 82 in the circumferential direction.

In another structure in which each of the conductor groups 81 is made up of the two conductors 82, and each of the conductor groups 81 lies within the region of one magnetic pole for each phase, a relation of Tc×2<Wc is preferably met.

In other words, in the stator coil 51 which is designed to have conductor portions (i.e., the conductor groups 81) arranged at a given interval away from each other in the circumferential direction, the thickness of each conductor portion (i.e., the conductor group 81) in the radial direction is set smaller than the width of a portion of the stator coil 51 lying in the region of one magnetic pole for each phase in the circumferential direction.

In other words, each of the conductors 82 is preferably shaped to have the thickness Tc in the radial direction which is smaller than the width Wc in the circumferential direction. The thickness 2Tc of each of the conductor groups 81 each made of a stack of the two conductors 82 in the radial direction is preferably smaller than the width Wc of each of the conductor groups 81 in the circumferential direction.

The degree of torque produced by the rotating electrical machine 10 is substantially inversely proportional to the thickness of the stator core 52 in the radial direction. The conductor groups 81 arranged radially outside the stator core 52 are, as described above, designed to have the thickness decreased in the radial direction. This design is useful in increasing the degree of torque outputted by the rotating electrical machine 10. This is because a distance between the magnet unit 42 of the rotor 40 and the stator core 52 (i.e., a distance in which there is no iron) may be decreased to decrease the magnetic resistance. This enables interlinkage magnetic flux in the stator core 52 produced by the permanent magnets to be increased to enhance the torque.

The decrease in thickness of the conductor groups 81 facilitates the ease with which a magnetic flux leaking from the conductor groups 81 is collected in the stator core 52, thereby preventing the magnetic flux from leaking outside the stator core 52 without being used for enhancing the torque. This avoids a drop in magnetic force arising from the leakage of the magnetic flux and increases the interlinkage magnetic flux in the stator core 52 produced by the permanent magnets, thereby enhancing the torque.

Each of the conductors 82 is made of a coated conductor formed by covering the surface of the conductor body 82a with the coating 82b. The conductors 82 stacked on one another in the radial direction are, therefore, insulated from each other. Similarly, the conductors 82 are insulated from the stator core 52.

The insulating coating 82b may be a coating of each wire 86, as will be described later in detail, in a case where each wire 86 is made of wire with a self-bonded coating or may be made by an additional insulator disposed on a coating of each wire 86. Each phase winding made of the conductors 82 is insulated by the coating 82b except an exposed portion thereof for joining purposes. The exposed portion includes, for example, an input or an output terminal or a neutral point in a case of a star connection. The conductor groups 81 arranged adjacent each other in the radial direction are firmly adhered to each other using resin or self-bonding coated wire, thereby minimizing a possibility of insulation breakdown, mechanical vibration, or noise caused by rubbing of the conductors 82.

Figure 13:
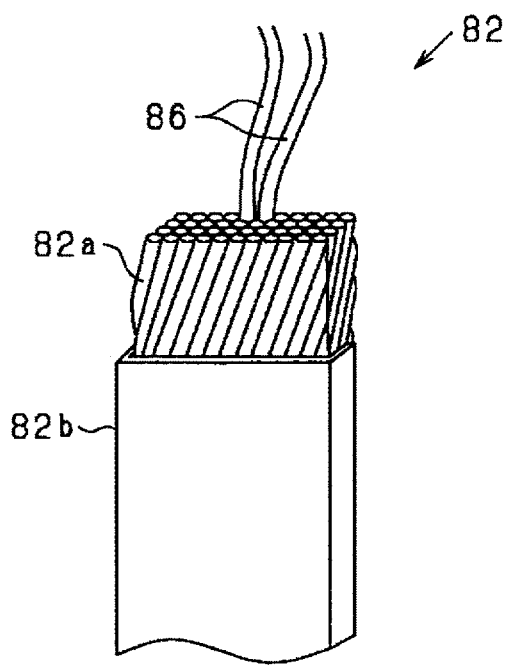
FIG. 13 is a perspective view of a conductor.
Figure 14:
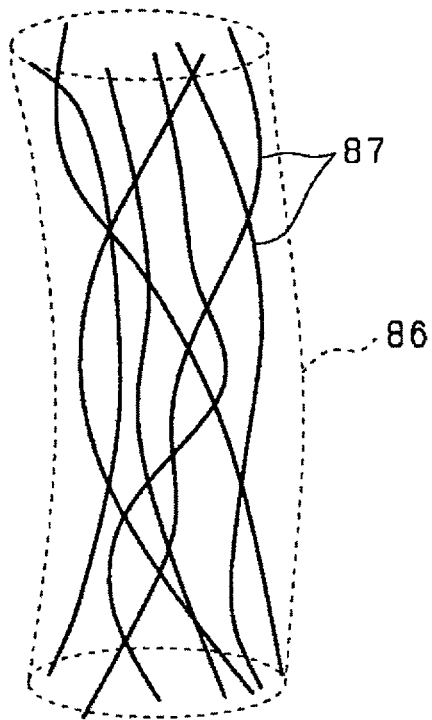
FIG. 14 is a schematic view illustrating a structure of wire.

In this embodiment, the conductor body 82a is made of a collection of a plurality of wires 86. Specifically, the conductor body 82a is, as can be seen in FIG. 13, made of a strand of the wires 86 each being twisted. Each of the wires 86 is, as can be seen in FIG. 14, made of a bundle of a plurality of thin conductive fibers 87.

For instance, each of the wires 86 is made of a complex of CNT (carbon nanotube) fibers. The CNT fibers include boron-containing microfibers in which at least a portion of carbon is substituted with boron. Instead of the CNT fibers that are carbon-based microfibers, vapor grown carbon fiber (VGCF) may be used, but however, the CNT fiber is preferable. The surface of the wire 86 is covered with a layer of insulating polymer, such as enamel. The surface of the wire 86 is preferably covered with an enamel coating, such as polyimide coating or amide-imide coating.

The conductors 82 constitute n-phase windings of the stator coil 51. The wires 86 of each of the conductors 82, i.e., the conductor body 82a of each of the conductors 82, are placed in contact with each other. Each of the conductors 82 has one or more portions which are formed by twisting the wires 86 and define one or more portions of a corresponding one of the phase-windings. A resistance value between the twisted wires 86 is larger than that of each of the wires 86. In other words, the respective adjacent two wires 86 have a first electrical resistivity in a direction in which the wires 86 are arranged adjacent each other. Each of the wires 86 has a second electrical resistivity in a lengthwise direction of the wire 86.

The first electrical resistivity is larger than the second electrical resistivity. Each of the conductors 82 may be made of an assembly of wires, i.e., the twisted wires 86 covered with insulating members whose first electrical resistivity is very high. The conductor body 82a of each of the conductors 82 is made of a strand of the twisted wires 86.

The conductor body 82a is, as described above, made of the twisted wires 86, thereby reducing an eddy current created in each of the wires 86, which reduces an eddy current in the conductor body 82a. Each of the wires 86 is twisted, thereby causing each of the wires 86 to have portions where directions of applied magnetic field are opposite each other, which cancels a back electromotive force. This results in a reduction in the eddy current. Particularly, each of the wires 86 is made of the conductive fibers 87, thereby enabling the conductive fibers 87 to be thin and also enabling the number of times the conductive fibers 87 are twisted to be increased, which enhances the reduction in eddy current.

How to insulate the wires 86 from each other is not limited to the above described use of the polymer insulating layer, but the contact resistance may be used to resist a flow of current between the wires 86. In other words, the above beneficial advantage is obtained by a difference in potential arising from a difference between the resistance between the twisted wires 86 and the resistance of each of the wires 86 as long as the resistance between the wires 86 is larger than that of each of the wires 86. For instance, the contact resistance may be increased by using production equipment for the wires 86 and production equipment for the stator 50 (i.e., an armature) of the rotating electrical machine 10 as discrete devices to cause the wires 86 to be oxidized during a transport time or a work interval.

Each of the conductors 82 is, as described above, of a low-profile or flattened rectangular shape in cross section. The conductors 82 are arranged in the radial direction. Each of the conductors 82 is made of a strand of the wires 86 each of which is formed by a self-bonding coating wire equipped with, for example, a fusing or bonding layer or an insulating layer and which are twisted with the bonding layers fused together. Each of the conductors 82 may alternatively be made by forming twisted wires with no bonding layer or twisted self-bonding coating wires into a desired shape using synthetic resin. The insulating coating 82b of each of the conductors 82 may have a thickness of 80 μm to 100 μm which is larger than that of a coating of typical wire (i.e., 5 μm to 40 μm). In this case, a required degree of insulation between the conductors 82 is achieved even if no insulating sheet is interposed between the conductors 82.

It is also advisable that the insulating coating 82b be higher in degree of insulation than the insulating layer of the wire 86 to achieve insulation between the phase windings. For instance, the polymer insulating layer of the wire 86 has a thickness of, for example, 5 μm. In this case, the thickness of the insulating coating 82b of the conductor 82 is preferably selected to be 80 μm to 100 μm to achieve the insulation between the phase windings.

Each of the conductors 82 may alternatively be made of a bundle of the untwisted wires 86. In brief, each of the conductors 82 may be made of a bundle of the wires 86 whose entire lengths are twisted, whose portions are twisted, or whose entire lengths are untwisted. Each of the conductors 82 constituting the conductor portion is, as described above, made of a bundle of the wires 86. The resistance between the wires 86 is larger than that of each of the wires 86.

The conductors 82 are each bent and arranged in a given pattern in the circumferential direction of the stator coil 51, thereby forming the phase-windings of the stator coil 51. The stator coil 51, as illustrated in FIG. 12, includes the coil side portion 53 and the coil ends 54 and 55. The conductors 82 have the straight sections 83 which extend straight in the axial direction of the stator coil 51 and form the coil side portion 53.

The conductors 82 have the turns 84 which are arranged outside the coil side portion 53 in the axial direction and form the coil ends 54 and 55. Each of the conductor 82 is made of a wave-shaped string of conductor formed by alternately arranging the straight sections 83 and the turns 84. The straight sections 83 are arranged to face the magnet unit 42 in the radial direction. The straight sections 83 are arranged at given intervals away from one another and joined together using the turns 84 located outside the magnet unit 42 in the axial direction. The straight sections 83 correspond to a magnet facing portion.

In this embodiment, the stator coil 51 is shaped in the form of an annular distributed coil. In the coil side portion 53, the straight sections 83 are arranged at intervals away from one another for each phase; each of the intervals corresponds to a corresponding pole pair of the magnet unit 42.

In each of the coil ends 54 and 55, the straight sections 83 for each phase are joined together by the turns 84, each of which is of a V-shape. The straight sections 83, which are paired for each pole pair, are opposite to each other in a direction of flow of electrical current.

Combination of pairs of straight sections 83, each joined together by a corresponding turn 84, in the coil end 53 is different from combination of pairs of straight sections 83, each joined together by a corresponding turn 84, in the coil end 54. The joints of the straight sections 83 by the turns 84 are arranged in the circumferential direction on each of the coil ends 54 and 55 to complete the stator winding in a hollow cylindrical shape.

More specifically, the stator coil 51 is made up of two pairs of the conductors 82 for each phase. The stator coil 51 is equipped with a first three-phase winding set including the U-phase winding, the V-phase winding, and the W-phase winding and a second three-phase phase winding set including the X-phase winding, the Y-phase winding, and the Z-phase winding. The first three-phase winding set and the second three-phase winding set are arranged adjacent each other in the radial direction in the form of two layers. If the number of phases of the stator coil 51 is defined as S (i.e., 6 in this embodiment), the number of the conductors 82 for each phase is defined as m, 2×S×m=2Sm conductors 82 are used for each pole pair in the stator coil 51. The rotating electrical machine in this embodiment is designed so that the number of phases S is 6, the number m is 4, and 8 pole pairs are used. 6×4×8=192 conductors 82 are arranged in the circumferential direction of the stator core 52.

The stator coil 51 in FIG. 12 is designed to have the coil side portion 53 which has the straight sections 82 arranged in the form of two overlapping layers disposed adjacent each other in the radial direction. Each of the coil ends 54 and 55 has a respective two of the turns 84 which extend from the radially overlapping straight sections 82 in opposite circumferential directions. In other words, the conductors 82 arranged adjacent each other in the radial direction are opposite to each other in direction in which the turns 84 extend except for ends of the stator coil 51.

A winding structure of the conductors 82 of the stator coil 51 will be described below in detail. In this embodiment, the conductors 82 formed in the shape of a wave winding are arranged in the form of a plurality of layers (e.g., two layers) disposed adjacent or overlapping each other in the radial direction.

Figure 15A:
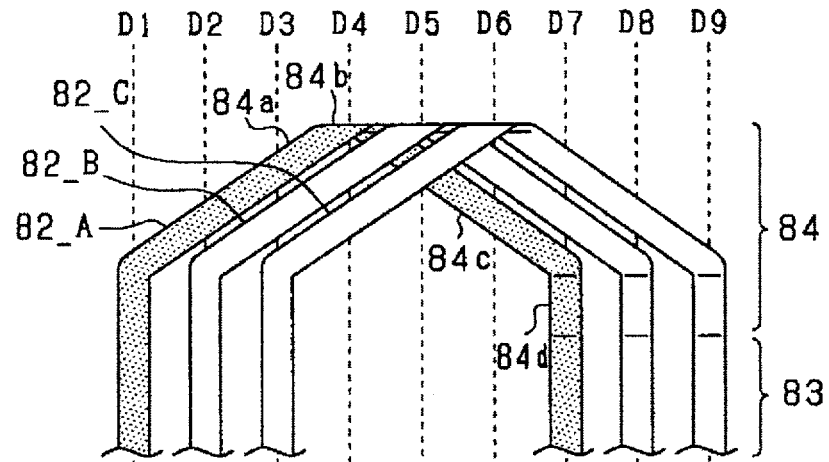
FIG. 15($a$) is a view showing the layout of conductors at the $n^{th}$ layer position as the side of a stator coil is viewed.
Figure 15B:
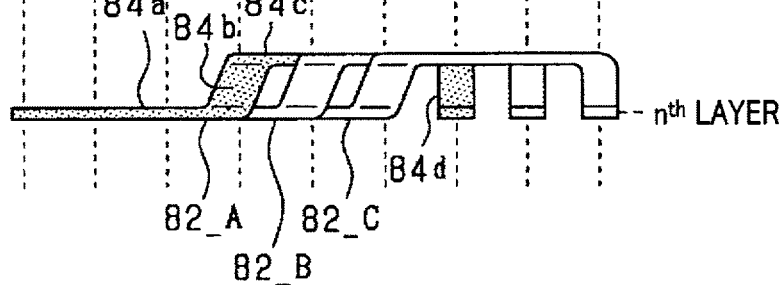

FIGS. 15(*a*) and 15(*b*) illustrate the layout of the conductors 82 which form the $n^{th}$ layer. FIG. 15(*a*) shows the configuration of the conductors 82, as the side of the stator coil 51 is viewed. FIG. 15(*b*) shows the configuration of the conductors 82 as viewed in the axial direction of the stator coil 51. In FIGS. 15(*a*) and 15(*b*), locations of the conductor groups 81 are indicated by symbols D1, D2, D3 . . . , and D9. For the sake of simplicity of disclosure, FIGS. 15(*a*) and 15(*b*) show only three conductors 82 which will be referred to herein as the first conductor 82_A, the second conductor 82_B, and the third conductor 82_C.

The conductors 82_A to 82_C have the straight sections 83 arranged at a location of the $n^{th}$ layer, in other words, at the same position in the radial direction. Every two of the straight sections 82 which are arranged at 6 pitches (corresponding to 3×m pairs) away from each other in the circumferential direction are joined together by one of the turns 84. In other words, in each of the conductors 82_A to 82_C, outermost two straight sections of the seven straight sections 83 arranged in the circumferential direction of the stator coil 51 on the same circle defined about the center of the rotor 40 are joined together using one of the turns 84. For instance, in the first conductor 82_A, the straight sections 83 placed at the respective locations D1 and D7 are joined together by the inverse V-shaped turn 84.

The conductor 82_B is arranged at the same location of the $n^t$ layer to be circumferentially shifted by one pitch relative to the conductor 82_A, and the conductor 82_C is arranged at the same location of the $n^t$ layer to be circumferentially shifted by one pitch relative to the conductor 82_B.

In this layout, the conductors 82_A to 82_C are placed at a location of the same layer, thereby resulting in a possibility that the turns 84 thereof might physically interfere with each other. In order to alleviate such a possibility, each of the turns 84 of the conductors 82_A to 82_C in this embodiment is shaped to have an interference avoiding portion formed by offsetting a portion of the corresponding turn 84 in the radial direction.

Specifically, the turn 84 of each of the conductors 82_A to 82_C includes a slant portion 84*a*, a head portion 84*b*, a slant portion 84*c*, and a return portion 84*d*. The slant portion 84*a* extends in the circumferential direction of the same circle (which will also be referred to as a first circle). The head portion 84 extends from the slant portion 84*a* radially inside the first circle (i.e., upward in FIG. 15(*b*)) to reach another circle (which will also be referred to as a second circle).

The slant portion 84*c* extends in the circumferential direction of the second circle. The return portion 84*d* returns from the second circle back to the first circle. The head portion 84*b*, the slant portion 84*c*, and the return portion 84*d* define the interference avoiding portion. The slant portion 84*c* may be arranged radially outside the slant portion 84*a*.

In other words, each of the conductors 82_A to 82_C has the turn 84 shaped to have the slant portion 84*a* and the slant portion 84*c* which are arranged on opposite sides of the head portion 84*b* at the center in the circumferential direction. The locations of the slant portions 84*a* and 84*b* are different from each other in the radial direction (i.e., a direction perpendicular to the drawing of FIG. 15(*a*) or a vertical direction in FIG. 15(*b*)).

For instance, the turn 84 of the first conductor 82_A is shaped to extend from the location D1 on the $n^t$ layer in the circumferential direction, be bent at the head portion 84*b* that is the center of the circumferential length of the turn 84 in the radial direction (e.g., radially inwardly), be bent again in the circumferential direction, extend again in the circumferential direction, and then be bent at the return portion 84*d* in the radial direction (e.g., radially outwardly) to reach the location D7 on the $n^t$ layer.

With the above arrangements, the slant portions 84*a* of the conductors 82_A to 82_C are arranged vertically or downward in the order of the first conductor 82_A, the second conductor 82_B, and the third conductor 82_C. The head portions 84*b* change the order of the locations of the conductors 82_A to 82_C in the vertical direction, so that the slant portions 84*c* are arranged vertically or downward in the order of the third conductor 82_C, the second conductor 82_B, and the first conductor 82_A. This layout achieves an arrangement of the conductors 82_A to 82_C in the circumferential direction without any physical interference with each other.

In the structure wherein the conductors 82 are laid to overlap each other in the radial direction to form the conductor group 81, the turns 84 leading to a radially innermost one and a radially outermost one of the straight sections 83 forming the two or more layers are preferably located radially outside the straight sections 83. In a case where the conductors 83 forming the two or more layers are bent in the same radial direction near boundaries between ends of the turns 84 and the straight sections 83, the conductors 83 are preferably shaped not to deteriorate the insulation therebetween due to physical interference of the conductors 83 with each other.

Figure 16:
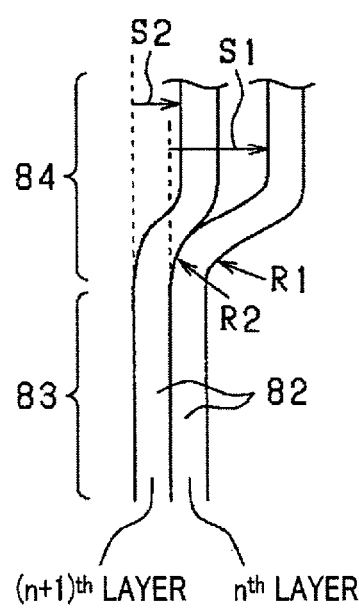
FIG. 16 is a side view showing conductors at the $n^{th}$ layer position and the $(n+1)^{th}$ layer position.

In the example of FIGS. 15(*a*) and 15(*b*), the conductors 82 laid on each other in the radial direction are bent radially at the return portions 84*d* of the turns 84 at the location D7 to D9. It is advisable that the conductor 82 of the n′ layer and the conductor 82 of the n+1 layer be bent, as illustrated in FIG. 16, at radii of curvature different from each other. Specifically, the radius of curvature R1 of the conductor 82 of the n′ layer is preferably selected to be smaller than the radius of curvature R2 of the conductor 82 of the n+1 layer.

Additionally, radial displacements of the conductor 82 of the n′ layer and the conductor 82 of the n+1 layer are preferably selected to be different from each other. If the amount of radial displacement of the conductor 82 of the n′ layer is defined as S, and the amount of radial displacement of the conductor 82 of the n+1 layer located radially outside the $n^{th}$ layer defined as S2, the amount of radial displacement S is preferably selected to be greater than the amount of radial displacement S2.

The above layout of the conductors 82 eliminates the risk of interference with each other, thereby ensuring a required degree of insulation between the conductors 82 even when the conductors 82 laid on each other in the radial direction are bent in the same direction.

The structure of the magnet unit 42 of the rotor 40 will be described below. In this embodiment, the magnet unit 42 is made of permanent magnets in which a remanent flux density Br=1.0 T, and an intrinsic coercive force Hcj=400 kA/m. The permanent magnets used in this embodiment are implemented by sintered magnets formed by sintering grains of magnetic material and compacting them into a given shape and have the following specifications. The intrinsic coercive force Hcj on a J-H curve is 400 kA/m or more. The remanent flux density Br on the J-H curve is 1.0 T or more. Magnets designed so that when 5,000 to 10,000 AT is applied thereto by phase-to-phase excitation, a magnetic distance between paired poles, i.e., between a N-pole and an S-pole, in other words, of a path in which a magnetic flux flows between the N-pole and the S-pole, a portion lying in the magnet has a length of 25 mm may be used to meet a relation of Hcj=10000 A without becoming demagnetized.

In other words, the magnet unit 42 is engineered so that a saturation magnetic flux density Js is 1.2 T or more, a grain size is 10 μm or less, and a relation of Js×a≥1.0 T is met where a is an orientation ratio.

The magnet unit 42 will be additionally described below. The magnet unit 42 (i.e., magnets) has a feature that Js meets a relation of 2.15 T≥Js≥1.2 T. In other words, magnets used in the magnet unit 42 may be FeNi magnets having NdFe11TiN, Nd2Fe14B, Sm2Fe17N3, or L10 crystals. Note that samarium-cobalt magnets, such as SmCo5, FePt, Dy2Fe14B, or CoPt magnets cannot be used. When magnets in which high Js characteristics of neodymium are slightly lost, but a high degree of coercive force of Dy is ensured using the heavy rare earth dysprosium, like in homotopic compounds, such as Dy2Fe14B and Nd2Fe14B, which may meet a relation of 2.15 T≥Js≥1.2 T, they may be used in the magnet unit 42. Such a type of magnet will also be referred to herein as [Nd1-xDyx]2Fe14B]. Further, a magnet contacting different types of compositions, in other words, a magnet made from two or more types of materials, such as FeNi and Sm2Fe17N3, may be used to meet a relation of 2.15 T≥Js≥1.2 T. A mixed magnet made by adding a small amount of, for example, Dy2Fe14B in which Js<1 T to an Nd2Fe14B magnet in which Js=1.6T, meaning that Js is sufficient to enhance the coercive force, may also be used to meet a relation of 2.15T≥Js≥1.2T.

In use of the rotating electrical machine at a temperature outside a temperature range of human activities which is higher than, for example, 60° C. exceeding temperatures of deserts, for example, within a passenger compartment of a vehicle where the temperature may rise to 80° C. in summer, the magnet preferably contains FeNi or Sm2Fe17N3 components which are less dependent on temperature. This is because motor characteristics are greatly changed by temperature-dependent factors thereof in motor operations within a range of approximately −40° which is within a range experienced by societies in Northern Europe to 60° C. or more experienced in desert regions or at 180 to 240° C. that is a heat resistance temperature of the enamel coating, which leads to a difficulty in achieving a required control operation using the same motor driver. The use of FeNi containing the above described L10 crystals or Sm2Fe17N3 magnets will result in a decrease in load on the motor driver because characteristics thereof have temperature-dependent factors lower than half that of Nd2Fe14B magnets.

Additionally, the magnet unit 42 is engineered to use the above described magnet mixing so that a particle size of fine powder before being magnetically oriented is lower than or equal to 10 μm and higher than or equal to a size of single-domain particles. The coercive force of a magnet is usually increased by decreasing the size of powered particles thereof to a few hundred nm. In recent years, smallest possible particles have been used. If the particles of the magnet are too small, the BHmax (i.e., the maximum energy product) of the magnet will be decreased due to oxidization thereof. It is, thus, preferable that the particle size of the magnet is higher than or equal to the size of the single-domain particles. The particle size being only up to the size of the single-domain particles is known to increase the coercive force of the magnet. The particle size, as referred to herein, refers to the diameter or size of fine powdered particles in a magnetic orientation operation in production processes of magnets.

The magnet unit 42 includes a first magnet 91 and a second magnet 92. Each of the first magnet 91 and the second magnet 92 of the magnet unit 42 is made of a sintered magnet formed by firing or heating magnetic powder at high temperatures and compacting it. The sintering is achieved so as to meet the conditions where the saturation magnetization Js of the magnet unit 42 is 1.2 T (Tesla) or more, the particle size of the first magnet 91 and the second magnet 92 is 10 μm or less, and Js×a is higher than or equal to 1.0 T (Tesla) where a is an orientation ratio.

Each of the first magnet 91 and the second magnet 92 is also sintered to meet the following conditions. By performing the magnetic orientation in the magnetic orientation operation in the production processes of the first magnet 91 and the second magnet 92, the first and second magnets 91 and 92 have an orientation ratio different to the definition of orientation of magnetic force in a magnetization operation for isotropic magnets. The magnet unit 42 in this embodiment is designed to have (1) The saturation magnetization Js more than or equal to 1.2 T (2) The high orientation ratio a of each of the first magnet 91 and the second magnet 92 meeting a relation of Jr≥Js× a≥1.0T The orientation ratio a, as referred to herein, is defined in the following way. If each of the first magnet 91 and the second magnet 92 has six easy axes of magnetization, five of the easy axes of magnetization are oriented in the same direction A10, and the remaining one of the easy axes of magnetization is oriented in the direction B10 angled at 90 degrees to the direction A10, then a relation of a=5/6 is met.

Alternatively, if each of the first magnet 91 and the second magnet 92 has six easy axes of magnetization, five of the easy axes of magnetization are oriented in the same direction A10, and the remaining one of the easy axes of magnetization is oriented in the direction B10 angled at 45 degrees to the direction A10, then a relation of a=(5+0.707)/6 is met since a component oriented in the direction A10 is expressed by cos 45°=0.707. The first magnet 91 and the second magnet 92 in this embodiment are, as described above, each made using sintering techniques, but however, they may be produced in another way as long as the above conditions are satisfied. For instance, a method of forming an MQ3 magnet may be used.

This embodiment uses permanent magnets, each of which is magnetically oriented to have a controlled easy axis of magnetization thereof, thereby enabling a magnetic circuit length within the corresponding one of the magnets to be longer than that within a typical linearly oriented magnet which produces a magnetic flux density of 1.0 T or more.

In other words, this embodiment enables the magnetic circuit length for one pole pair in the magnets in this embodiment to be achieved using magnets each with a smaller volume. Additionally, a range of reversible flux loss in the magnets is not lost when subjected to severe high temperatures, as compared with use of typical linearly oriented magnets. The disclosers or inventors of this application have found that characteristics similar to those of anisotropic magnets are obtained even using prior art magnets.

The easy axis of magnetization represents a crystal orientation in which a crystal is easy to magnetize in a magnet. The orientation of the easy axis of magnetization in the magnet, as referred to herein, is a direction in which an orientation ratio is 50% or more where the orientation ratio indicates the degree to which easy axes of magnetization of crystals are aligned with each other or a direction of an average of magnetic orientations in the magnet.

The magnet unit 42 is, as clearly illustrated in FIGS. 8 and 9, of an annular shape and arranged inside the magnet holder 41 (specifically, radially inside the cylinder 43). The magnet unit 42 is equipped with the first magnets 91 and the second magnets 92 which are each made of a polar anisotropic magnet.

Each of the first magnets 91 and each of the second magnets 92 are different in polarity from each other. The first magnets 91 and the second magnets 92 are arranged alternately in the circumferential direction of the magnet unit 42. Each of the first magnets 91 is engineered to have a portion creating an N-pole near the stator coil 51. Each of the second magnets 92 is engineered to have a portion creating an S-pole near the stator coil 51. The first magnets 91 and the second magnets 92 are each made of, for example, a permanent rare earth magnet, such as a neodymium magnet.

Each of the magnets 91 and 92 is engineered to have a direction of magnetization (which will also be referred to below as a magnetization direction) which extends in an annular shape in between a d-axis (i.e., a direct-axis) and a q-axis (i.e., a quadrature-axis) in a known d-q coordinate system where the d-axis represents the center of a magnetic pole, and the q-axis represents a magnetic boundary between the N-pole and the S-pole, in other words, where a density of magnetic flux is zero Tesla. In each of the magnets 91 and 92, the magnetization direction is oriented in the radial direction of the annular magnet unit 42 close to the d-axis and also oriented in the circumferential direction of the annular magnet unit 42 closer to the q-axis.

This layout will also be described below in detail.

Each of the magnets 91 and 92, as can be seen in FIG. 9, includes a first portion 250 and two second portions 260 arranged on opposite sides of the first portion 250 in the circumferential direction of the magnet unit 42. In other words, the first portion 250 is located closer to the d-axis than the second portions 260 are. The second portions 260 are arranged closer to the q-axis than the first portion 250 is. The direction in which the easy axis of magnetization 300 extends in the first portion 250 is oriented more parallel to the d-axis than the direction in which the easy axis of magnetization 310 extends in the second portions 260. In other words, the magnet unit 42 is engineered so that an angle θ11 which the easy axis of magnetization 300 in the first portion 250 makes with the d-axis is selected to be smaller than an angle θ12 which the easy axis of magnetization 310 in the second portion 260 makes with the q-axis.

More specifically, if a direction from the stator 50 (i.e., an armature) toward the magnet unit 42 on the d-axis is defined to be positive, the angle θ11 represents an angle which the easy axis of magnetization 300 makes with the d-axis. Similarly, if a direction from the stator 50 (i.e., an armature) toward the magnet unit 42 on the q-axis is defined to be positive, the angle θ12 represents an angle which the easy axis of magnetization 310 makes with the q-axis. In this embodiment, each of the angle θ11 and the angle θ12 is set to be 900 or less.

Each of the easy axes of magnetization 300 and 310, as referred to herein, is defined in the following way. If in each of the magnets 91 and 92, a first one of the easy axes of magnetization is oriented in a direction A11, and a second one of the easy axes of magnetization is oriented in a direction B11, an absolute value of cosine of an angle θ which the direction A11 and the direction B11 make with each other (i.e., |cos θ|) is defined as the easy axis of magnetization 300 or the easy axis of magnetization 310.

The magnets 91 are different in easy axis of magnetization from the magnets 92 in regions close to the d-axis and the q-axis. Specifically, in the region close to the d-axis, the direction of the easy axis of magnetization is oriented approximately parallel to the d-axis, while in the region close to the q-axis, the direction of the easy axis of magnetization is oriented approximately perpendicular to the q-axis. Annular magnetic paths are created according to the directions of easy axes of magnetization. In each of the magnets 91 and 92, the easy axis of magnetization in the region close to the d-axis may be oriented parallel to the d-axis, while the easy axis of magnetization in the region close to the q-axis may be oriented perpendicular to the q-axis.

Each of the magnets 91 and 92 is shaped to have a first peripheral surface facing the stator 50 (i.e., a lower surface viewed in FIG. 9 which will also be referred to as a stator-side outer surface) and a second peripheral surface facing the q-axis in the circumferential direction. The first and second peripheral surfaces function as magnetic flux acting surfaces into and from which magnetic flux flows. The magnetic paths are each created to extend between the magnetic flux acting surfaces (i.e., between the stator-side outer surface and the second peripheral surface facing the q-axis).

Figure 17:
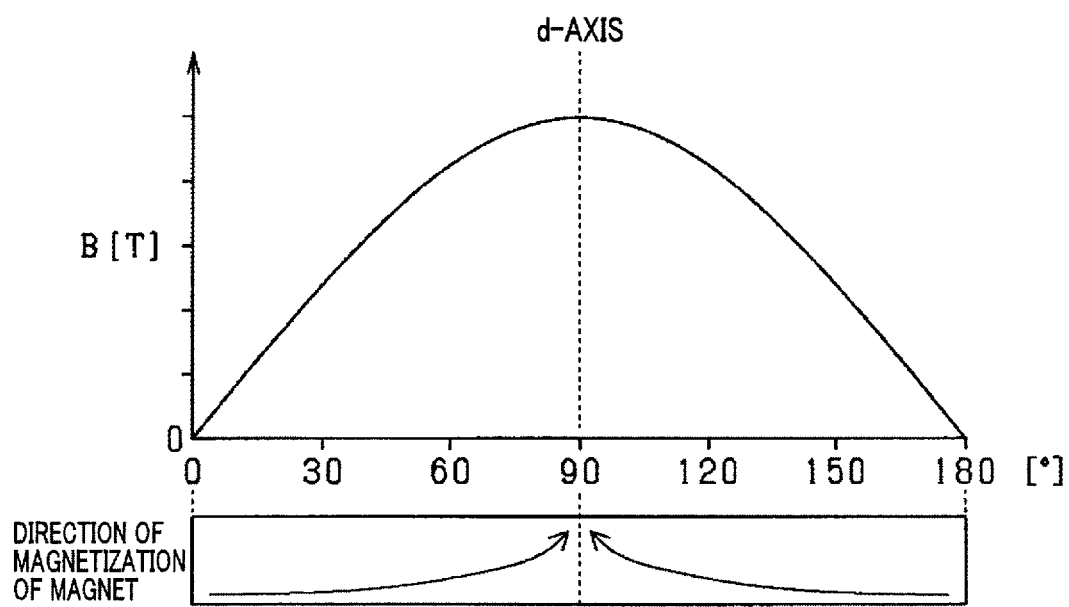
FIG. 17 is a view representing a relation between an electrical angle and a magnetic flux density in a magnet unit of an embodiment.
Figure 18:
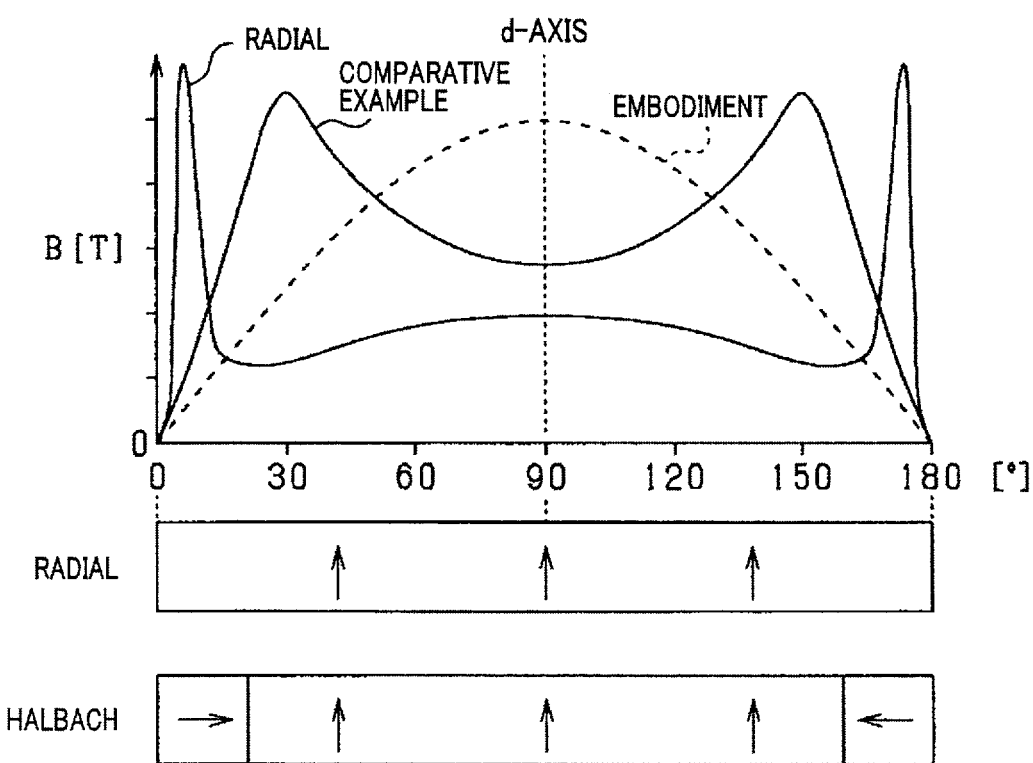
FIG. 18 is a view which represents a relation between an electrical angle and a magnetic flux density in a magnet unit of a comparative example.

In the magnet unit 42, a magnetic flux flows in an annular shape between a respective adjacent two of the N-poles and the S-poles of the magnets 91 and 92, so that each of the magnetic paths has an increased length, as compared with, for example, radial anisotropic magnets. A distribution of the magnetic flux density will, therefore, exhibit a shape similar to a sine wave illustrated in FIG. 17. This facilitates concentration of magnetic flux around the center of the magnetic pole unlike a distribution of magnetic flux density of a radial anisotropic magnet demonstrated in FIG. 18 as a comparative example, thereby enabling the degree of torque produced by the rotating electrical machine 10 to be increased. It has also been found that the magnet unit 42 in this embodiment has the distribution of the magnetic flux density distinct from that of a typical Halbach array magnet. In FIGS. 17 and 18, a horizontal axis indicates the electrical angle, while a vertical axis indicates the magnetic flux density. 900 on the horizontal axis represents the d-axis (i.e., the center of the magnetic pole). 0° and 1800 on the horizontal axis represent the q-axis.

Accordingly, the above described structure of each of the magnets 91 and 92 functions to enhance the magnet magnetic flux thereof on the d-axis and reduce a change in magnetic flux near the q-axis. This enables the magnets 91 and 92 to be produced which have a smooth change in surface magnetic flux from the q-axis to the d-axis on each magnetic pole The sine wave matching percentage in the distribution of the magnetic flux density is preferably set to, for example, 40% or more. This improves the amount of magnetic flux around the center of a waveform of the distribution of the magnetic flux density as compared with a radially oriented magnet or a parallel oriented magnet in which the sine wave matching percentage is approximately 30%. By setting the sine wave matching percentage to be 60% or more, the amount of magnetic flux around the center of the waveform is improved, as compared with a concentrated magnetic flux array, such as the Halbach array.

In the radial anisotropic magnet demonstrated in FIG. 18, the magnetic flux density changes sharply near the q-axis. The more sharp the change in magnetic flux density, the more an eddy current generating in the stator coil 51 will increase. The magnetic flux close to the stator coil 51 also sharply changes. In contrast, the distribution of the magnetic flux density in this embodiment has a waveform approximating a sine wave. A change in magnetic flux density near the q-axis is, therefore, smaller than that in the radial anisotropic magnet near the q-axis. This minimizes the generation of the eddy current.

The magnet unit 42 creates a magnetic flux oriented perpendicular to the magnetic flux acting surface 280 close to the stator 50 near the d-axis (i.e., the center of the magnetic pole) in each of the magnets 91 and 92. Such a magnetic flux extends in an arc-shape farther away from the d-axis as leaving the magnetic flux acting surface 280 close to the stator 50. The more perpendicular to the magnetic flux acting surface the magnetic flux extends, the stronger the magnetic flux is. The rotating electrical machine in this embodiment is, as described above, designed to shape each of the conductor groups 81 to have a decreased thickness in the radial direction, so that the radial center of each of the conductor groups 81 is located close to the magnetic flux-acting surface of the magnet unit 42, thereby causing the strong magnetic flux to be applied to the stator 50 from the rotor 40.

The stator 50 has the cylindrical stator core 52 arranged radially inside the stator coil 51, that is, on the opposite side of the stator coil 51 to the rotor 40. This causes the magnetic flux extending from the magnetic flux-acting surface of each of the magnets 91 and 92 to be attracted by the stator core 52, so that it circulates through the magnetic path partially including the stator core 52. This enables the orientation of the magnetic flux and the magnetic path to be optimized.

Steps to assemble the bearing unit 20, the housing 30, the rotor 40, the stator 50, and the inverter unit 60 illustrated in FIG. 5 will be described below as a production method of the rotating electrical machine 10. The inverter unit 60 is, as illustrated in FIG. 6, equipped with the unit base 61 and the electrical components 62. Operation processes including installation processes for the unit base 61 and the electrical components 62 will be explained. In the following discussion, an assembly of the stator 50 and the inverter unit 60 will be referred to as a first unit. An assembly of the bearing unit 20, the housing 30, and the rotor 40 will be referred to as a second unit.

The production processes include:
a first step of installing the electrical components 62 radially inside the unit base 61;
a second step of installing the unit base 61 radially inside the stator 50 to make the first unit;
a third step of inserting the attaching portion 44 of the rotor 40 into the bearing unit 20 installed in the housing 30 to make the second unit;
a fourth step of installing the first unit radially inside the second unit; and
a fifth step of fastening the housing 30 and the unit base 61 together. The order in which the above steps are performed is the first step→the second step→the third step→the fourth step→the fifth step.

In the above production method, the bearing unit 20, the housing 30, the rotor 40, the stator 50, and the inverter unit 60 are assembled as a plurality of sub-assemblies, and the sub-assemblies are assembled, thereby facilitating handling thereof and achieving completion of inspection of each sub-assembly. This enables an efficient assembly line to be established and thus facilitates multi-product production planning.

In the first step, a high thermal conductivity material is applied or adhered to at least one of the radial inside of the unit base 61 and the radial outside of the electrical components 62. Subsequently, the electrical components may be mounted on the unit base 61. This achieves efficient transfer of heat, as generated by the semiconductor modules 66, to the unit base 61.

In the third step, an insertion operation for the rotor 40 may be achieved with the housing 30 and the rotor 40 arranged coaxially with each other. Specifically, the housing 30 and the rotor 40 are assembled while sliding one of the housing 30 and the rotor 40 along a jig which positions the outer peripheral surface of the rotor 40 (i.e., the outer peripheral surface of the magnetic holder 41) or the inner peripheral surface of the rotor 40 (i.e., the inner peripheral surface of the magnet unit 42) with respect to, for example, the inner peripheral surface of the housing 30. This achieves the assembly of heavy-weight parts without exertion of unbalanced load to the bearing unit 20. This results in improvement of reliability in operation of the bearing unit 20.

In the fourth step, the first unit and the second unit may be installed while being placed coaxially with each other. Specifically, the first unit and the second unit are installed while sliding one of the first unit and the second unit along a jig which positions the inner peripheral surface of the unit base 61 with respect to, for example, the inner peripheral surfaces of the rotor 40 and the attaching portion 44. This achieves the installation of the first and second units without any physical interference therebetween within a small clearance between the rotor 40 and the stator 50, thereby eliminating risks of defects caused by the installation, such as physical damage to the stator coil 51 or damage to the permanent magnets.

The above steps may alternatively be scheduled as the second step→the third step→the fourth step→the fifth step→the first step. In this order, the delicate electrical components 62 is finally installed, thereby minimizing stress on the electrical components in the installation processes.

Figure 19:
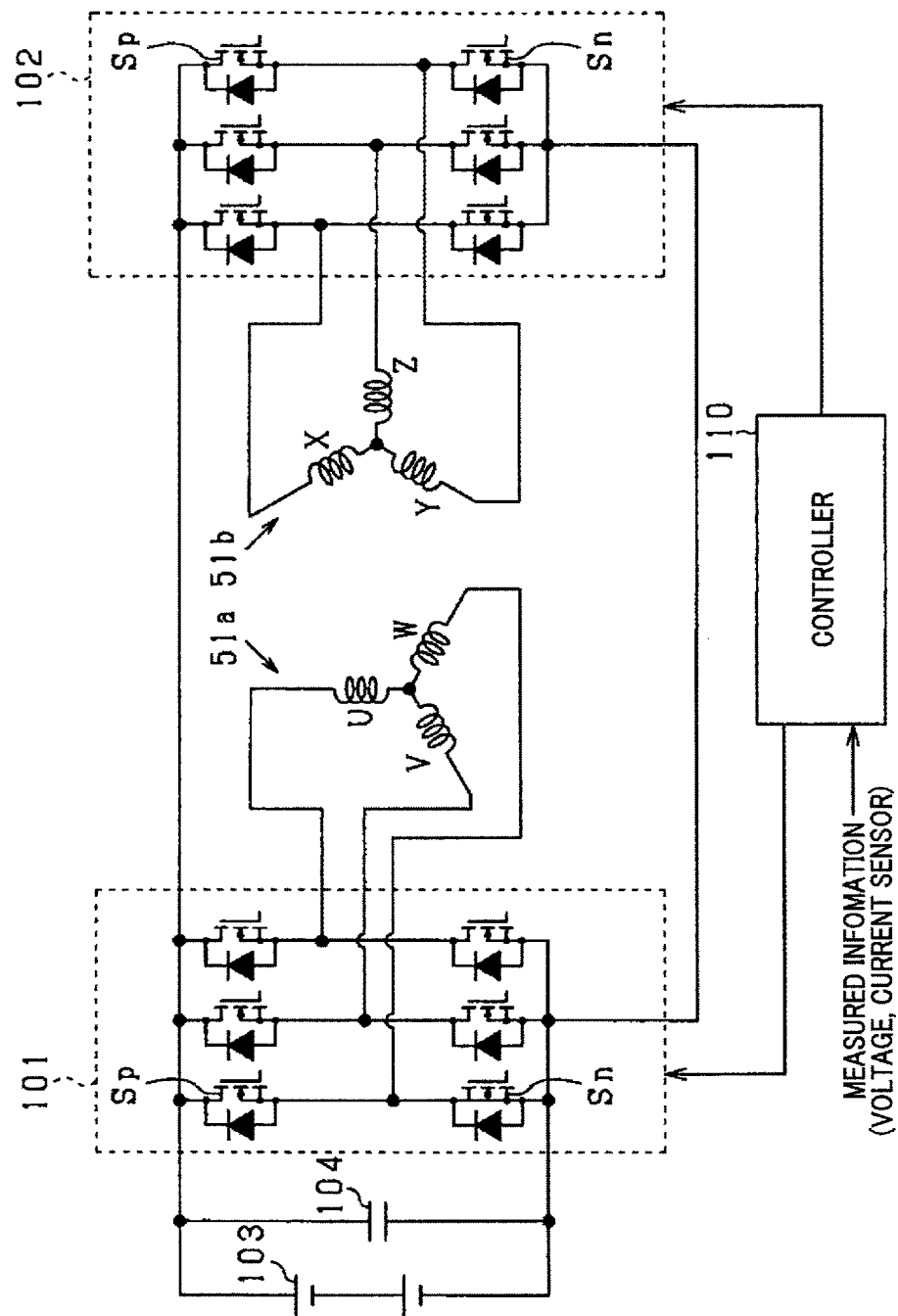
FIG. 19 is an electrical circuit diagram of a control system for a rotating electrical machine.
Figure 20:
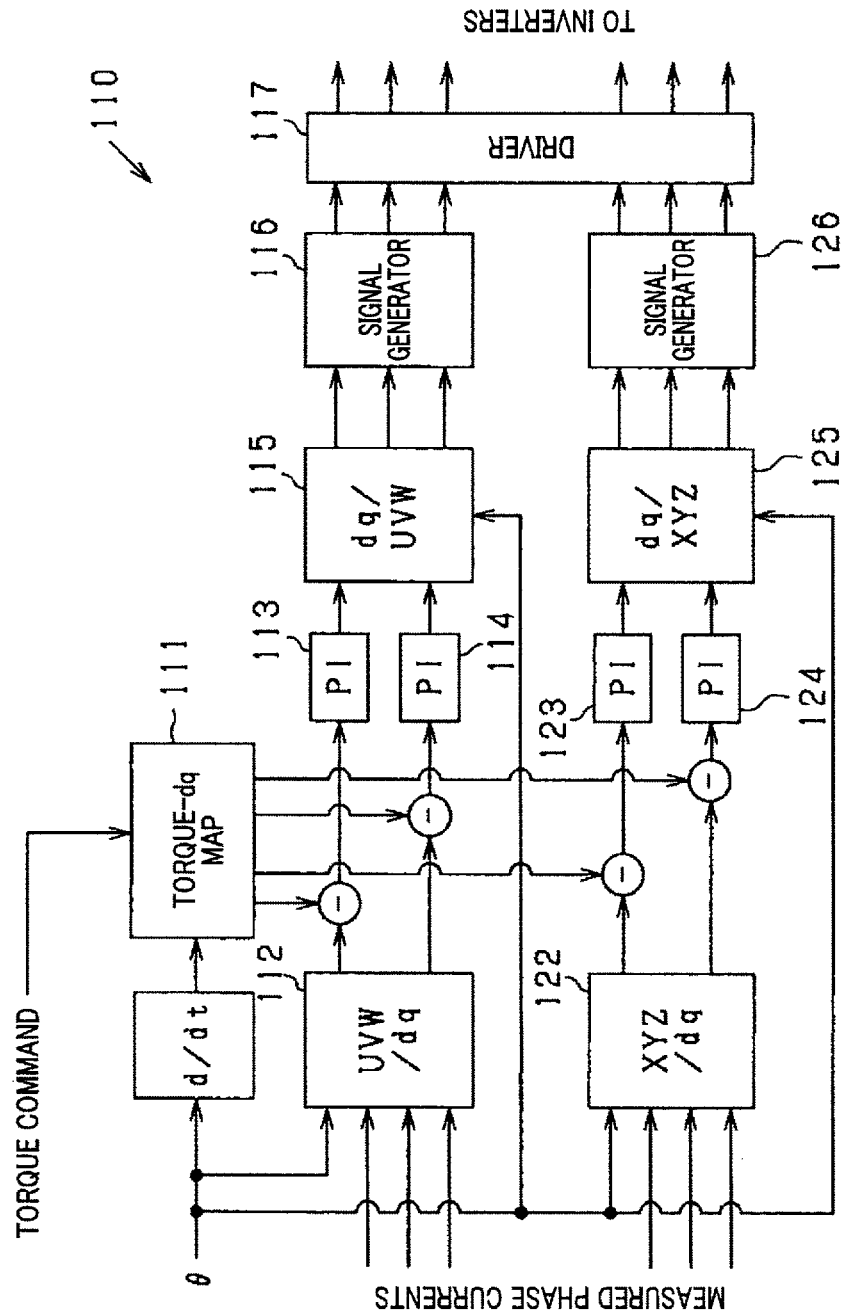
FIG. 20 is a functional block diagram which shows a current feedback control operation of a control device.

The structure of a control system for controlling an operation of the rotating electrical machine 10 will be described below. FIG. 19 is an electrical circuit diagram of the control system for the rotating electrical machine 10. FIG. 20 is a functional block diagram which illustrates control steps performed by the controller 110.

FIG. 19 illustrates two sets of three-phase windings 51*a* and 51*b*. The three-phase windings 51*a* include a U-phase winding, a V-phase winding, and a W-phase winding. The three-phase windings 51*b* include an X-phase winding, a Y-phase winding, and a Z-phase winding.

The first inverter 101 and the second inverter 102 are provided as electrical power converters for the three-phase windings 51*a* and 51*b*, respectively. The inverters 101 and 102 are made of bridge circuits with as many upper and lower arms as there are the phase-windings. The current delivered to the phase windings of the stator coil 51 is regulated by turning on or off switches (i.e., semiconductor switches) mounted on the upper and lower arms.

The dc power supply 103 and the smoothing capacitor 104 are connected parallel to the inverters 101 and 102. The dc power supply 103 is made of, for example, a plurality of series-connected cells. The switches of the inverters 101 and 102 correspond to the semiconductor modules 66 in FIG. 1. The capacitor 104 corresponds to the capacitor module 68 in FIG. 1.

The controller 110 is equipped with a microcomputer made of a CPU and memories and works to perform control energization by turning on or off the switches of the inverters 101 and 102 using several types of measured information measured in the rotating electrical machine 10 or requests for a motor mode or a generator mode of the rotating electrical machine 10. The controller 110 corresponds to the control device 77 shown in FIG. 6.

The measured information about the rotating electrical machine 10 includes, for example, an angular position (i.e., an electrical angle) of the rotor 40 measured by an angular position sensor, such as a resolver, a power supply voltage (i.e., voltage inputted into the inverters) measured by a voltage sensor, and electrical current delivered to each of the phase-windings, as measured by a current sensor. The controller 110 produces and outputs an operation signal to operate each of the switches of the inverters 101 and 102. A request for electrical power generation is a request for driving the rotating electrical machine 10 in a regenerative mode, for example, in a case where the rotating electrical machine 10 is used as a power source for a vehicle.

The first inverter 101 is equipped with a series-connected part made up of an upper arm switch Sp and a lower arm switch Sn for each of the three-phase windings: the U-phase winding, the V-phase winding, and the W-phase winding. The upper arm switches Sp are connected at high-potential terminals thereof to a positive terminal of the dc power supply 103. The lower arm switches Sn are connected at low-potential terminals thereof to a negative terminal (i.e., ground) of the dc power supply 103. Intermediate joints of the upper arm switches Sp and the lower arm switches Sn are connected to ends of the U-phase winding, the V-phase winding, and the W-phase winding. The U-phase winding, the V-phase winding, and the W-phase winding are connected in the form of a star connection (i.e., Y-connection). The other ends of the U-phase winding, the V-phase winding, and the W-phase winding are connected with each other at a neutral point.

The second inverter 102 is, like the first inverter 101, equipped with a series-connected part made up of an upper arm switch Sp and a lower arm switch Sn for each of the three-phase windings: the X-phase winding, the Y-phase winding, and the Z-phase winding. The upper arm switches Sp are connected at high-potential terminals thereof to the positive terminal of the dc power supply 103. The lower arm switches Sn are connected at low-potential terminals thereof to the negative terminal (i.e., ground) of the dc power supply 103. Intermediate joints of the upper arm switches Sp and the lower arm switches Sn are connected to ends of the X-phase winding, the Y-phase winding, and the Z-phase winding. The X-phase winding, the Y-phase winding, and the Z-phase winding are connected in the form of a star connection (i.e., Y-connection). The other ends of the X-phase winding, the Y-phase winding, and the Z-phase winding are connected with each other at a neutral point.

FIG. 20 illustrates a current feedback control operation to control electrical currents delivered to the U-phase winding, the V-phase winding, and the W-phase winding and a current feedback control operation to control electrical currents delivered to the X-phase winding, the Y-phase winding, and the Z-phase winding. The control operation for the U-phase winding, the V-phase winding, and the W-phase winding will first be discussed.

In FIG. 20, a current command determiner 111 uses a torque-dq map to determine current command values for the d-axis and the q-axis using a torque command value in the motor mode of the rotating electrical machine (which will also be referred to as a motor-mode torque command value), a torque command value in the generator mode of the rotating electrical machine 10 (which will be referred to as a generator-mode torque command value), and an electrical angular velocity ω derived by differentiating an electrical angle θ with respect to time. The current command determiner 111 is shared between the U-, V-, and W-phase windings and the X-, Y-, and W-phase windings. The generator-mode torque command value is a regenerative torque command value in a case where the rotating electrical machine 10 is used as a power source of a vehicle.

A d-q converter 112 works to convert currents (i.e., three phase currents), as measured by current sensors mounted for the respective phase windings, into a d-axis current and a q-axis current that are components in a two-dimensional rotating Cartesian coordinate system in which a d-axis is defined as a direction of an axis of a magnetic field or field direction.

A d-axis current feedback control device 113 determines a command voltage for the d-axis as a manipulated variable for bringing the d-axis current into agreement with the current command value for the d-axis in a feedback mode.

A q-axis current feedback control device 114 determines a command voltage for the q-axis as a manipulated variable for bringing the q-axis current into agreement with the current command value for the q-axis in a feedback mode. The feedback control devices 113 and 114 calculates the command voltage as a function of a deviation of each of the d-axis current and the q-axis current from a corresponding one of the current command values using PI feedback techniques.

A three-phase converter 115 works to convert the command values for the d-axis and the q-axis into command values for the U-phase, V-phase, and W-phase windings. Each of the devices 111 to 115 is engineered as a feedback controller to perform a feedback control operation for a fundamental current in the d-q transformation theory. The command voltages for the U-phase, V-phase, and W-phase windings are feedback control values.

An operation signal generator 116 uses the known triangle wave carrier comparison to produce operation signals for the first inverter 101 as a function of the three-phase command voltages. Specifically, the operation signal generator 116 works to produce switch operation signals (i.e., duty signals) for the upper and lower arms for the three-phase windings (i.e., the U-, V-, and W-phase windings) under PWM control based on comparison of levels of signals derived by normalizing the three-phase command voltages using the power supply voltage with a level of a carrier signal, such as a triangle wave signal.

The same structure as described above is provided for the X-, Y-, and Z-phase windings.

A d-q converter 122 works to convert currents (i.e., three phase currents), as measured by current sensors mounted for the respective phase windings, into a d-axis current and a q-axis current that are components in the two-dimensional rotating Cartesian coordinate system in which the d-axis is defined as the direction of the axis of the magnetic field.

A d-axis current feedback control device 123 determines a command voltage for the d-axis.

A q-axis current feedback control device 124 determines a command voltage for the q-axis.

A three-phase converter 125 works to convert the command values for the d-axis and the q-axis into command values for the X-phase, Y-phase, and Z-phase windings.

An operation signal generator 126 produces operation signals for the second inverter 102 as a function of the three-phase command voltages.

Specifically, the operation signal generator 126 works to switch operation signals (i.e., duty signals) for the upper and lower arms for the three-phase windings (i.e., the X-, Y-, and Z-phase windings) based on comparison of levels of signals derived by normalizing the three-phase command voltages using the power supply voltage with a level of a carrier signal, such as a triangle wave signal.

A driver 117 works to turn on or off the switches Sp and Sn in the inverters 101 and 102 in response to the switch operation signals produced by the operation signal generators 116 and 126.

Subsequently, a torque feedback control operation will be described below. This operation is to increase an output of the rotating electrical machine 10 and reduce torque loss in the rotating electrical machine 10, for example, in a high-speed and high-output range wherein output voltages from the inverters 101 and 102 rise. The controller 110 selects one of the torque feedback control operation and the current feedback control operation and perform the selected one as a function of an operating condition of the rotating electrical machine 10.

Figure 21:
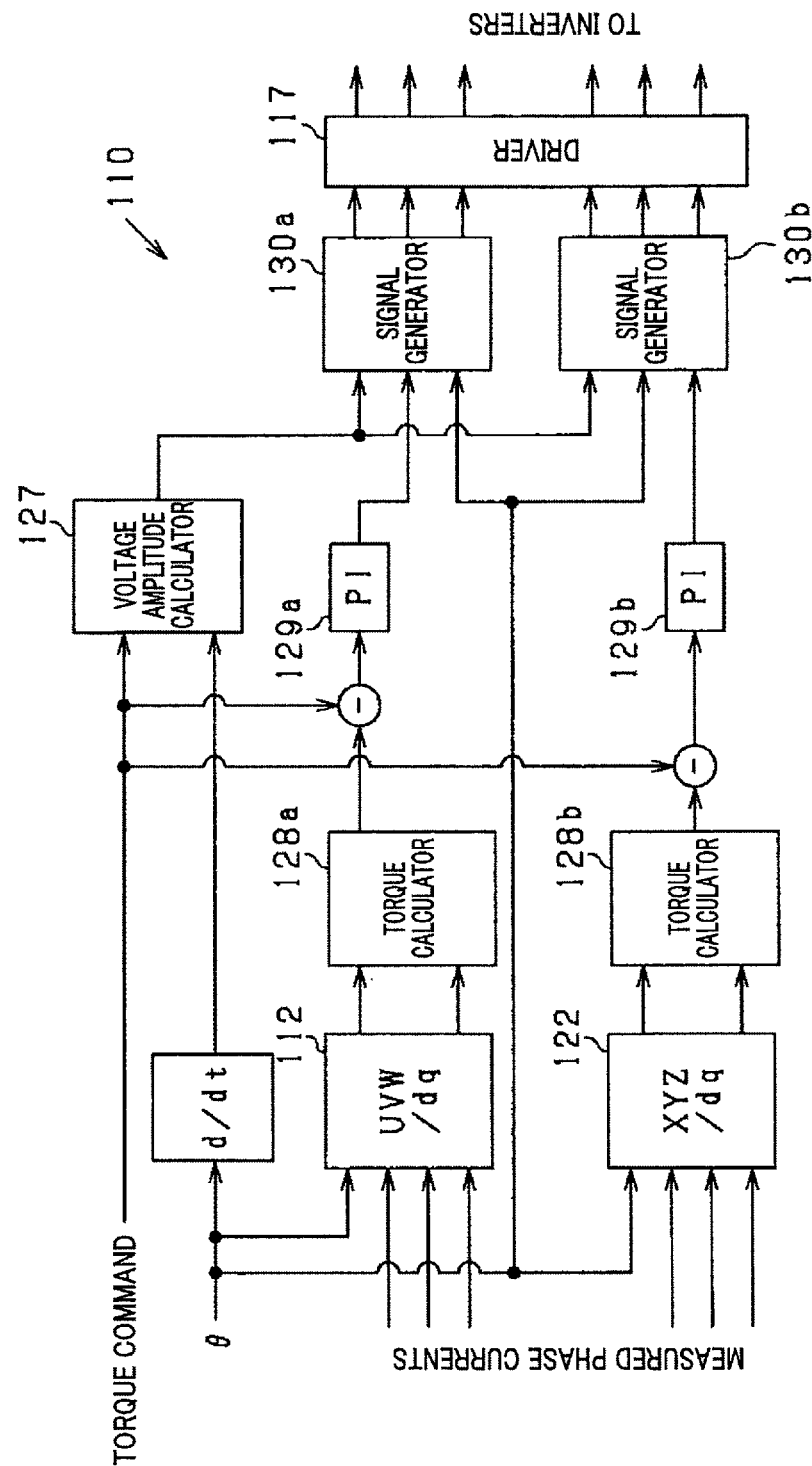
FIG. 21 is a functional block diagram which shows a torque feedback control operation of the control device.

FIG. 21 shows the torque feedback control operation for the U-, V-, and W-phase windings and the torque feedback control operation for the X-, Y-, and Z-phase windings. In FIG. 21, the same reference numbers as employed in FIG. 20 refer to the same parts, and explanation thereof in detail will be omitted here. The control operation for the U-, V-, and W-phase windings will be described first.

A voltage amplitude calculator 127 works to calculate a voltage amplitude command that is a command value of a degree of a voltage vector as a function of the motor-mode torque command value or the generator-mode torque command value for the rotating electrical machine 10 and the electrical angular velocity r) derived by differentiating the electrical angle θ with respect to time.

A torque calculator 128a works to estimate a torque value in the U-phase, V-phase, or the W-phase as a function of the d-axis current and the q-axis current converted by the d-q converter 112. The torque calculator 128a may be designed to calculate the voltage amplitude command using a map listing relations among the d-axis current, the q-axis current, and the voltage amplitude command.

A torque feedback controller 129a calculates a voltage phase command that is a command value for a phase of the voltage vector as a manipulated variable for bringing the estimated torque value into agreement with the motor-mode torque command value or the generator-mode torque command value in the feedback mode. Specifically, the torque feedback controller 129a calculates the voltage phase command as a function of a deviation of the estimated torque value from the motor-mode torque command value or the generator-mode torque command value using PI feedback techniques.

An operation signal generator 130a works to produce the operation signal for the first inverter 101 using the voltage amplitude command, the voltage phase command, and the electrical angle θ. Specifically, the operation signal generator 130a calculates the command values for the three-phase windings based on the voltage amplitude command, the voltage phase command, and the electrical angle θ and then generates switching operation signals for the upper and lower arms for the three-phase windings by means of PWM control based on comparison of levels of signals derived by normalizing the three-phase command voltages using the power supply voltage with a level of a carrier signal, such as a triangle wave signal.

The operation signal generator 130a may alternatively be designed to produce the switching operation signals using pulse pattern information that is map information about relations among the voltage amplitude command, the voltage phase command, the electrical angle θ, and the switching operation signal, the voltage amplitude command, the voltage phase command, and the electrical angle θ.

The same structure as described above is provided for the X-, Y-, and Z-phase windings. A torque calculator 128b works to estimate a torque value in the X-phase, Y-phase, or the Z-phase as a function of the d-axis current and the q-axis current converted by the d-q converter 122.

A torque feedback controller 129b calculates a voltage phase command as a manipulated variable for bringing the estimated torque value into agreement with the motor-mode torque command value or the generator-mode torque command value in the feedback mode. Specifically, the torque feedback controller 129b calculates the voltage phase command as a function of a deviation of the estimated torque value from the motor-mode torque command value or the generator-mode torque command value using PI feedback techniques.

An operation signal generator 130b works to produce the operation signal for the second inverter 102 using the voltage amplitude command, the voltage phase command, and the electrical angle θ. Specifically, the operation signal generator 130b calculates the command values for the three-phase windings based on the voltage amplitude command, the voltage phase command, and the electrical angle θ and then generates the switching operation signals for the upper and lower arms for the three-phase windings by means of PWM control based on comparison of levels of signals derived by normalizing the three-phase command voltages using the power supply voltage with a level of a carrier signal, such as a triangle wave signal. The driver 117 then works to turn on or off the switches Sp and Sn for the three-phase windings in the inverters 101 and 102 in response to the switching operation signals derived by the operation signal generators 130a and 130b.

The operation signal generator 130b may alternatively be designed to produce the switching operation signals using pulse pattern information that is map information about relations among the voltage amplitude command, the voltage phase command, the electrical angle θ, and the switching operation signal, the voltage amplitude command, the voltage phase command, and the electrical angle θ.

The rotating electrical machine 10 has a possibility that generation of an axial current may result in electrical erosion in the bearing 21 or 22. For example, when the stator coil 51 is excited or de-excited in response to the switching operation, a small switching time gap (i.e., switching unbalance) may occur, thereby resulting in distortion of magnetic flux, which may lead to the electrical erosion in the bearings 21 and 22 retaining the rotating shaft 11. The distortion of magnetic flux depending upon the inductance of the stator 50 may create an electromotive force oriented in the axial direction, which may result in dielectric breakdown in the bearing 21 or 22 to develop the electrical erosion.

In order to avoid the electrical erosion, this embodiment is engineered to take three measures as discussed below.

The first erosion avoiding measure is to reduce the inductance by designing the stator 50 to have a core-less structure and also to shape the magnetic flux in the magnet unit 42 to be smooth to minimize the electrical erosion.

The second erosion avoiding measure is to retain the rotating shaft in a cantilever form to minimize the electrical erosion.

The third erosion avoiding measure is to unify the annular stator coil 51 and the stator core 52 using molding techniques using a molding material to minimize the electrical erosion. The first to third erosion avoiding measures will be described below in detail.

In the first erosion avoiding measure, the stator 50 is designed to have no teeth in gaps between the conductor groups 81 in the circumferential direction. The sealing members 57 made of non-magnetic material are arranged in the gaps between the conductor groups 81 instead of teeth (iron cores) (see FIG. 10). This results in a decrease in inductance of the stator 50, thereby minimizing the distortion of magnetic flux caused by the switching time gap occurring upon excitation of the stator coil 51 to reduce the electrical erosion in the bearings 21 and 22. The inductance on the d-axis is preferably less than that on the q-axis.

Additionally, each of the magnets 91 and 92 is magnetically oriented to have the easy axis of magnetization which is directed near the d-axis to be more parallel to the d-axis than that near the q-axis (see FIG. 9). This strengthens the magnetic flux on the d-axis, thereby resulting in a smooth change in surface magnetic flux (i.e., an increase or decrease in magnetic flux) from the q-axis to the d-axis on each magnetic pole of the magnets 91 and 92. This minimizes a sudden voltage change arising from the switching imbalance to avoid the electrical erosion.

In the second erosion avoiding measure, the rotating electrical machine 10 is designed to have the bearings 21 and 22 located away from the axial center of the rotor 40 toward one of the ends of the rotor 40 opposed to each other in the axial direction thereof (see FIG. 2). This minimizes the risk of the electrical erosion as compared with a case where a plurality of bearings are arranged outside axial ends of a rotor. In other words, in the structure wherein the rotor has ends retained by the bearings, generation of a high-frequency magnetic flux results in creation of a closed circuit extending through the rotor, the stator, and the bearings (which are arranged axially outside the rotor). This leads to a possibility that the axial current may result in the electrical erosion in the bearings. In contrast, the rotor 40 are retained by the plurality of bearings 21 and 22 in the cantilever form, so that the above closed circuit does not occur, thereby minimizing the electrical erosion in the bearings 21 and 22.

In addition to the above one-side layout of the bearings 21 and 22, the rotating electrical machine 10 also has the following structure. In the magnet holder 41, the intermediate portion 45 extending in the radial direction of the rotor 40 is equipped with the contact avoider which axially extends to avoid physical contact with the stator 50 (see FIG. 2). This enables a closed circuit through which the axial current flows through the magnet holder 41 to be lengthened to increase the resistance thereof. This minimizes the risk of the electrical erosion of the bearings 21 and 22.

The retainer 23 for the bearing unit 20 is secured to the housing 30 and located on one axial end side of the rotor 40, while the housing 30 and the unit base 61 (i.e., a stator holder) are joined together on the other axial end of the rotor 40 (see FIG. 2). These arrangements properly achieve the structure in which the bearings 21 and 22 are located only on the one end of the length of the rotating shaft 11.

Additionally, the unit base 61 is connected to the rotating shaft 11 through the housing 30, so that the unit base 61 is located electrically away from the rotating shaft 11. An insulating member such as resin may be disposed between the unit base 61 and the housing 30 to place the unit base 61 and the rotating shaft 11 electrically farther away from each other. This also minimizes the risk of the electrical erosion of the bearings 21 and 22.

The one-side layout of the bearings 21 and 22 in the rotating electrical machine 10 in this embodiment decreases the axial voltage applied to the bearings 21 and 22 and also decreases the potential difference between the rotor 40 and the stator 50. A decrease in the potential difference applied to the bearings 21 and 22 is, thus, achieved without use of conductive grease in the bearings 21 and 22. The conductive grease usually contains fine particles such as carbon particles, thus leading to a risk of generation of acoustic noise. In order to alleviate the above problem, this embodiment uses a non-conductive grease in the bearings 21 and 22 to minimize the acoustic noise in the bearings 21 and 22. For instance, in a case where the rotating electrical machine 10 is used with an electrical vehicle, it is usually required to take a measure to eliminate the acoustic noise. This embodiment is capable of properly taking such a measure.

In the third erosion avoiding measure, the stator coil 51 and the stator core 52 are unified together using a molding material to minimize a positional error of the stator coil 51 in the stator 50 (see FIG. 11). The rotating electrical machine 10 in this embodiment is designed not to have conductorto-conductor members (e.g., teeth) between the conductor groups 81 arranged in the circumferential direction of the stator coil 51, thus leading to a concern about the positional error or misalignment of the stator coil 51. The misalignment of the conductor of the stator coil 51 may be minimized by unifying the stator coil 51 and the stator core 52 in the mold. This eliminates risks of the distortion of magnetic flux arising from the misalignment of the stator coil 51 and the electrical erosion in the bearings 21 and 22 resulting from the distortion of the magnetic flux.

The unit base 61 serving as a housing to firmly fix the stator core 52 is made of carbon fiber reinforced plastic (CFRP), thereby minimizing electrical discharge to the unit base 61 as compared with when the unit base 61 is made of aluminum, thereby avoiding the electrical erosion.

An additional erosion avoiding measure may be taken to make at least one of the outer race 25 and the inner race 26 of each of the bearings 21 and 22 using a ceramic material or alternatively to install an insulating sleeve outside the outer race 25.

Other embodiments will be described below in terms of differences between themselves and the first embodiment.

Second Embodiment

In this embodiment, the polar anisotropy structure of the magnet unit 42 of the rotor 40 is changed and will be described below in detail.

Figure 22:
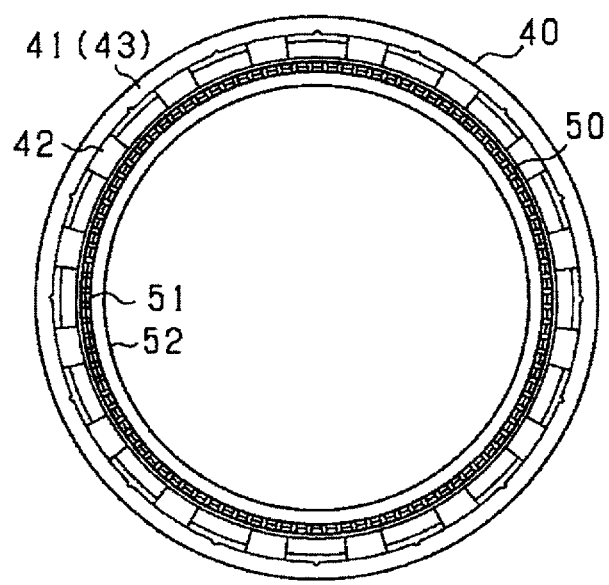
FIG. 22 is a transverse sectional view of a rotor and a stator in the second embodiment.
Figure 23:
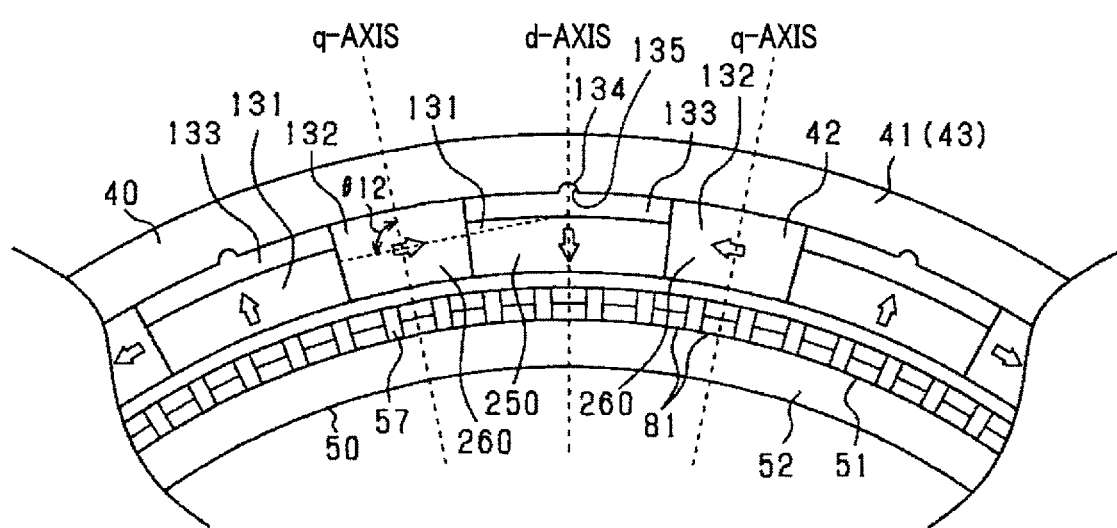
FIG. 23 is a partially enlarged view of part of FIG. 22.

The magnet unit 42 is, as clearly illustrated in FIGS. 22 and 23, made using a magnet array referred to as a Halbach array.

Specifically, the magnet unit 42 is equipped with the first magnets 131 and the second magnets 132. The first magnets 131 have a magnetization direction (i.e., an orientation of a magnetization vector thereof) oriented in the radial direction of the magnet unit 42. The second magnets 132 have a magnetization direction (i.e., an orientation of the magnetization vector thereof) oriented in the circumferential direction of the magnet unit 42. The first magnets 131 are arrayed at a given interval away from each other in the circumferential direction. Each of the second magnets 132 is disposed between the first magnets 131 arranged adjacent each other in the circumferential direction. The first magnets 131 and the second magnets 132 are each implemented by a rare-earth permanent magnet, such as a neodymium magnet.

The first magnets 131 are arranged away from each other in the circumferential direction so as to have N-poles and S-poles which are created in radially inner portions thereof and face the stator 50. The N-poles and the S-poles are arranged alternately in the circumferential direction. The second magnets 132 are arranged to have N-poles and S-poles alternately located adjacent the first magnets 131 in the circumferential direction. The cylinder 43 which surrounds the magnets 131 and 132 may be formed as a soft magnetic core made of a soft magnetic material and which functions as a back core. The magnet unit 42 in this embodiment are designed to have the easy axis of magnetization oriented in the same way as in the first embodiment relative to the d-axis and the q-axis in the d-q axis coordinate system.

The magnetic members 133 each of which is made of a soft magnetic material are disposed radially outside the first magnets 131, in other words, close to the cylinder 43 of the magnet holder 41. Each of the magnetic members 133 may be made of magnetic steel sheet, soft iron, or a dust core material. Each of the magnetic members 133 has a length identical with that of the first magnet 131 (especially, a length of an outer periphery of the first magnet 131) in the circumferential direction. An assembly made up of each of the first magnets 131 and a corresponding one of the magnetic members 133 has a thickness identical with that of the second magnet 132 in the radial direction. In other words, each of the first magnets 131 has the thickness smaller than that of the second magnet 132 by that of the magnetic member 133 in the radial direction. The magnets 131 and 132 and the magnetic members 133 are firmly secured to each other using, for example, adhesive agent. In the magnet unit 42, the radial outside of the first magnets 131 faces away from the stator 50. The magnetic members 133 are located on the opposite side of the first magnets 131 to the stator 50 in the radial direction (i.e., farther away from the stator 50).

Each of the magnetic members 133 has the key 134 in a convex shape which is formed on the outer periphery thereof and protrudes radially outside the magnetic member 133, in other words, protrudes into the cylinder 43 of the magnet holder 41. The cylinder 43 has the key grooves 135 which are formed in an inner peripheral surface thereof in a concave shape and in which the keys 134 of the magnetic members 133 are fit. The protruding shape of the keys 134 is contoured to conform with the recessed shape of the key grooves 135. As many of the key grooves 135 as the keys 134 of the magnetic members 133 are formed. The engagement between the keys 134 and the key grooves 135 serves to eliminate misalignment or a positional deviation of the first magnets 131, the second magnets 132, and the magnet holder 41 in the circumferential direction (i.e. a rotational direction). The keys 134 and the key grooves 135 (i.e., convexities and concavities) may be formed either on the cylinders 43 of the magnet holder 41 or in the magnetic members 133, respectively. Specifically, the magnetic members 133 may have the key grooves 135 in the outer periphery thereof, while the cylinder 43 of the magnet holder 41 may have the keys 134 formed on the inner periphery thereof.

The magnet unit 42 has the first magnets 131 and the second magnets 132 alternately arranged to increase the magnetic flux density in the first magnets 131. This results in concentration of magnetic flux on one surface of the magnet unit 42 to enhance the magnetic flux close to the stator 50.

The layout of the magnetic members 133 radially arranged outside the first magnets 131, in other words, farther away from the stator 50 reduces partial magnetic saturation occurring radially outside the first magnets 131, thereby alleviating a risk of demagnetization in the first magnets 131 arising from the magnetic saturation. This results in an increase in magnetic force produced by the magnet unit 42. In other words, the magnet unit 42 in this embodiment is viewed to have portions which are usually subjected to the demagnetization and replaced with the magnetic members 133.

FIGS. 24(*a*) and 24(*b*) are illustrations which demonstrate flows of magnetic flux in the magnet unit 42. FIG. 24(*a*) illustrates a conventional structure in which the magnet unit 42 is not equipped with the magnetic members 133. FIG. 24(*b*) illustrates the structure in this embodiment in which the magnet unit 42 is equipped with the magnetic members 133. FIGS. 24(*a*) and 24(*b*) are linearly developed views of the cylinder 43 of the magnet holder 41 and the magnet unit 42. Lower sides of FIGS. 24(*a*) and 24(*b*) are close to the stator 50, while upper sides thereof are farther away from the stator 50.

Figure 24A:
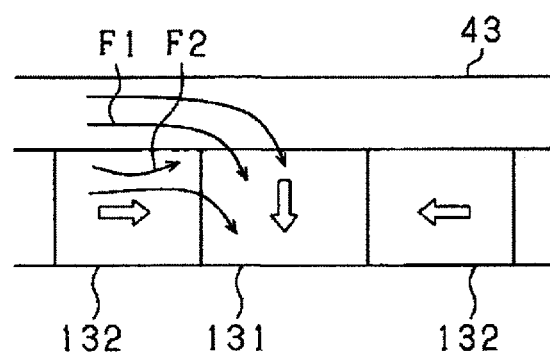
FIG. 24($a$) is a view illustrating flows of magnetic flux in a magnet unit according to a conventional structure in which the magnet unit is not equipped with magnetic members.

In the structure shown in FIG. 24(a), a magnetic flux-acting surface of each of the first magnets 131 and a side surface of each of the second magnets 132 are placed in contact with the inner peripheral surface of the cylinder 43. A magnetic flux-acting surface of each of the second magnets 132 is placed in contact with the side surface of one of the first magnets 131. Such layout causes a combined magnetic flux to be created in the cylinder 43. The combined magnetic flux is made up of a magnetic flux F1 which passes outside the second magnet 132 and then enters the surface of the first magnets 131 contacting the cylinder 43 and a magnetic flux which flows substantially parallel to the cylinder 43 and attracts a magnetic flux F2 produced by the second magnet 132. This leads to a possibility that the magnetic saturation may occur near the surface of contact between the first magnet 131 and the second magnet 132 in the cylinder 43

Figure 24B:
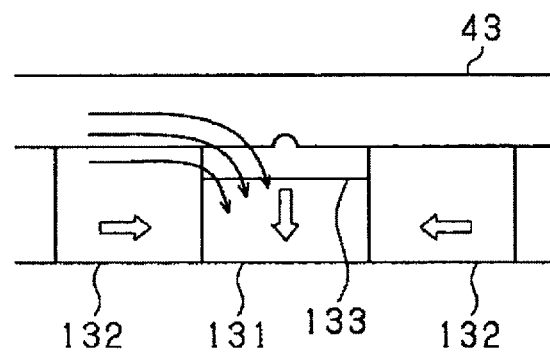

In the structure in FIG. 24(b) wherein each of the magnetic members 133 is disposed between the magnetic flux-acting surface of the first magnet 131 and the inner periphery of the cylinder 43 farther away from the stator 50, the magnetic flux is permitted to pass through the magnetic member 133. This minimizes the magnetic saturation in the cylinder 43 and increases resistance against the demagnetization.

The structure in FIG. 24(b), unlike FIG. 24(a), functions to eliminate the magnetic flux F2 facilitating the magnetic saturation. This effectively enhances the permeance in the whole of the magnetic circuit, thereby ensuring the stability in properties of the magnetic circuit under elevated temperature.

As compared with radial magnets used in conventional SPM rotors, the structure in FIG. 24(b) has an increased length of the magnetic path passing through the magnet. This results in a rise in permeance of the magnet which enhances the magnetic force to increase the torque. Further, the magnetic flux concentrates on the center of the d-axis, thereby increasing the sine wave matching percentage. Particularly, the increase in torque may be achieved effectively by shaping the waveform of the current to a sine or trapezoidal wave under PWM control or using 120 excitation switching ICs In a case where the stator core 52 is made of magnetic steel sheets, the thickness of the stator core 52 in the radial direction thereof is preferably half or greater than half the thickness of the magnet unit 42 in the radial direction. For instance, it is preferable that the thickness of the stator core 52 in the radial direction is greater than half the thickness of the first magnets 131 arranged at the pole-to-pole center in the magnet unit 42. It is also preferable that the thickness of the stator core 52 in the radial direction is smaller than that of the magnet unit 42. In this case, a magnet magnetic flux is approximately 1T, while the saturation magnetic flux density in the stator core 52 is 2T. The leakage of magnetic flux to inside the inner periphery of the stator core 52 is avoided by selecting the thickness of the stator core 52 in the radial direction to be greater than half that of the magnet unit 42.

Magnets arranged to have the Halbach structure or the polar anisotropy structure usually have an arc-shaped magnetic path, so that the magnetic flux may be increased in proportion to a thickness of ones of the magnets which handle a magnetic flux in the circumferential direction. In such a structure, the magnetic flux flowing through the stator core 52 is thought of as not exceeding the magnetic flux flowing in the circumferential direction. In other words, when the magnetic flux produced by the magnets is 1T, while ferrous metal whose saturation magnetic flux density is 2T is used to make the stator core 52, a light weight and compact electrical rotating machine may be produced by selecting the thickness of the stator core 52 to be greater than half that of the magnets. The demagnetizing field is usually exerted by the stator 50 on the magnetic field produced by the magnets, so that the magnetic flux produced by the magnets will be 0.9T or less. The magnetic permeability of the stator core may, therefore, be properly kept by selecting the thickness of the stator core to be half that of the magnets.

Modifications of the above structure will be described below.

Modification 1

Figure 25:
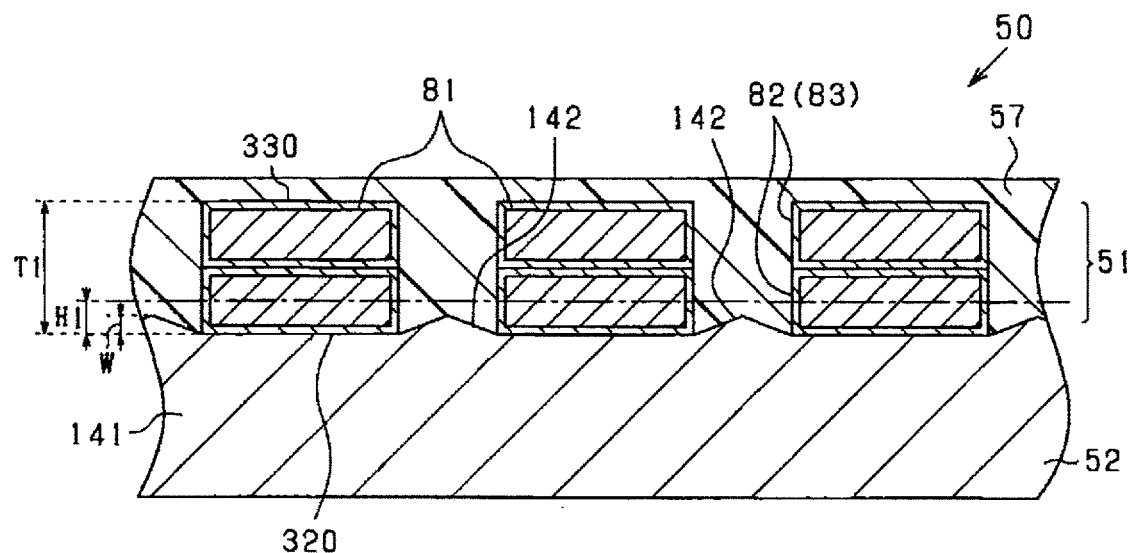
FIG. 25 is a sectional view of a stator in a modification 1.

In the above embodiment, the outer peripheral surface of the stator core 52 has a curved surface without any irregularities. The plurality of conductor groups 81 are arranged at given intervals away from one another on the outer peripheral surface of the stator core 52. This layout may be changed. For instance, the stator core 52 illustrated in FIG. 25 is equipped with the circular ring-shaped yoke 141 and the protrusions 142. The yoke 141 is located on the opposite side (i.e., a lower side, as viewed in the drawing) of the stator coil 51 to the rotor 40 in the radial direction. Each of the protrusions 142 protrudes into a gap between a respective two of the straight sections 83 arranged adjacent each other in the circumferential direction. The protrusions 142 are arranged at given intervals away from one another in the circumferential direction radially outside the yoke 141, i.e., close to the rotor 40. Each of the conductor groups 81 of the stator coil 51 engages the protrusions 142 in the circumferential direction, in other words, the protrusions 142 are used as positioners to position and array the conductor groups 81 in the circumferential direction. The protrusions 142 correspond to conductor-to-conductor members.

A radial thickness of each of the protrusions 142 from the yoke 141, in other words, a distance W, as illustrated in FIG. 25, between the inner surface 320 of the straight sections 82 which is placed in contact with the yoke 141 and the top of the protrusion 412 in the radial direction of the yoke 141 is selected to be smaller than half a radial thickness (as indicated by H1 in the drawing) of the straight sections 83 arranged adjacent the yoke 141 in the radial direction. In other words, non-conductive members (i.e., the sealing members 57) preferably each occupy three-fourths of a dimension (i.e., thickness) T1 (i.e., twice the thickness of the conductors 82, in other words, a minimum distance between the surface 320 of the conductor group 81 placed in contact with the stator core 52 and the surface 330 of the conductor group 81 facing the rotor 40) of the conductor groups (i.e., conductors) 81 in the radial direction of the stator coil 51 (i.e., the stator core 52). Such selection of the thickness of the protrusions 142 causes each of the protrusions 142 not to function as a tooth between the conductor groups 81 (i.e., the straight sections 83) arranged adjacent each other in the circumferential direction, so that there are no magnetic paths which would usually be formed by the teeth. The protrusions 142 need not necessarily be arranged between a respective circumferentially adjacent two of all the conductor groups 81, but however, a single protrusion 142 may be disposed at least only between two of the conductor groups 81 which are arranged adjacent each other in the circumferential direction. For instance, the protrusions 142 may be disposed away from each other in the circumferential direction at equal intervals each of which corresponds to a given number of the conductor groups 81. Each of the protrusions 142 may be designed to have any shape, such as a rectangular or arc-shape.

The straight sections 83 may alternatively be arranged in a single layer on the outer peripheral surface of the stator core 52. In a broad sense, the thickness of the protrusions 142 from the yoke 141 in the radial direction may be smaller than half that of the straight sections 83 in the radial direction.

If an imaginary circle whose center is located at the axial center of the rotating shaft 11 and which passes through the radial centers of the straight sections 83 placed adjacent the yoke 141 in the radial direction is defined, each of the protrusions 142 may be shaped to protrude only within the imaginary circle, in other words, not to protrude radially outside the imaginary circle toward the rotor 40.

The above structure in which the protrusions 142 have the limited thickness in the radial direction and do not function as teeth in the gaps between the straight sections 83 arranged adjacent each other in the circumferential direction enables the adjacent straight sections 83 to be disposed closer to each other as compared with a case where teeth are provided in the gaps between the straight sections 83. This enables a sectional area of the conductor body 82a to be increased, thereby reducing heat generated upon excitation of the stator coil 51. The absence of the teeth enables magnetic saturation to be eliminated to increase the amount of electrical current delivered to the stator coil 51. It is, however, possible to alleviate the adverse effects arising from an increase in amount of heat generated by the increase in electrical current delivered to the stator coil 51. The stator coil 51, as described above, has the turns 84 which are shifted in the radial direction and equipped with the interference avoiding portions with the adjacent turns 84, thereby enabling the turns 84 to be disposed away from each other in the radial direction. This enhances the heat dissipation from the turns 84. The above structure is enabled to optimize the heat dissipating ability of the stator 50.

The radial thickness of the protrusions 142 may not be restricted by the dimension H1 in FIG. 25 as long as the yoke 141 of the stator core 52 and the magnet unit 42 (i.e., each of the magnets 91 and 92) of the rotor 40 are arranged at given distances away from one another. Specifically, the radial thickness of the protrusions 142 may be larger than or equal to the dimension H1 in FIG. 38 as long as the yoke 141 and the magnet unit 42 arranged 2 mm or more away from each other. For instance, in a case where the radial thickness of the straight section 83 is larger than 2 mm, and each of the conductor groups 81 is made up of the two conductors 82 stacked in the radial direction, each of the protrusions 142 may be shaped to occupy a region ranging to half the thickness of the straight section 83 not contacting the yoke 141, i.e., the thickness of the conductor 82 located farther away from the yoke 141. In this case, the above beneficial advantages will be obtained by increasing the conductive sectional area of the conductor groups 81 as long as the radial thickness of the protrusions 142 is at least H1×3/2.

Figure 26:
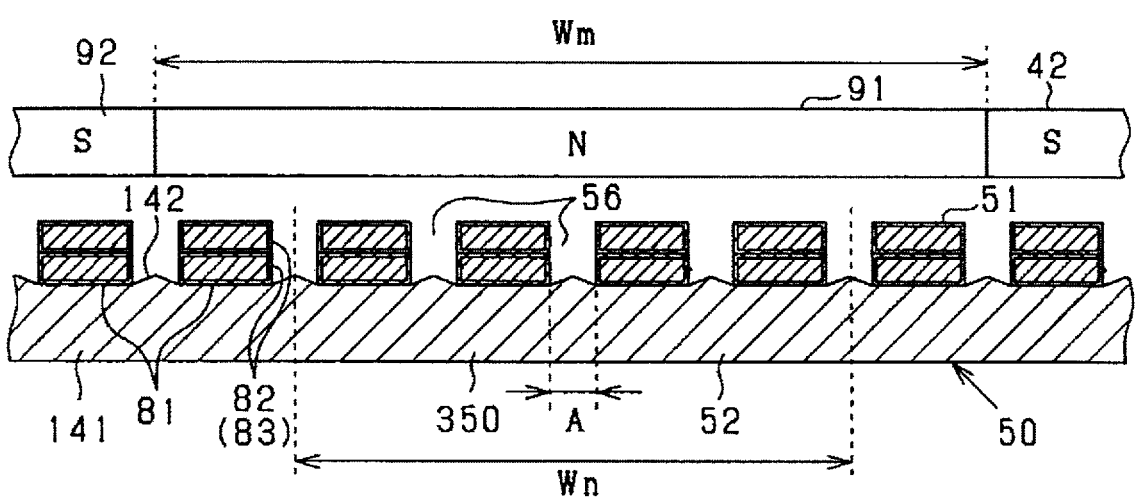
FIG. 26 is a sectional view of a stator in the modification 1.

The stator core 52 may be designed to have the structure illustrated in FIG. 26. FIG. 26 omits the sealing members 57, but the sealing members 57 may be used. FIG. 26 illustrates the magnet unit 42 and the stator core 52 as being arranged linearly for the sake of simplicity.

In the structure of FIG. 26, the stator 50 has the protrusions 142 as conductor-to-conductor members each of which is arranged between a respective two of the conductors 82 (i.e., the straight sections 83) located adjacent each other in the circumferential direction. The stator 50 is equipped with the portions 350 each of which magnetically operates along with one of the magnetic poles (i.e., an N-pole or an S-pole) of the magnet unit 42 when the stator coil 51 is excited. The portions 350 extend in the circumferential direction of the stator 50. If each of the portions 350 has a length Wn in the circumferential direction of the stator 50, the sum of widths of the protrusions 142 lying in a range of this length Wn (i.e., the total dimension of the protrusions 412 in the circumferential direction of the stator 50 in the range of length Wn) is defined as Wt, the saturation magnetic flux density of the protrusions 412 is defined as Bs, a width of a portion of the magnet unit 42 equivalent to one of the magnetic poles of the magnet unit 42 in the circumferential direction of the magnet unit 42 is defined as Wm, and the remanent flux density in the magnet unit 42 is defined as Br, the protrusions 142 are made of a magnetic material meeting a relation of $$Wt \times Bs \leq Wm \times Br \quad (1)$$

The range Wn is defined to contain ones of the conductor groups 81 which are arranged adjacent each other in the circumferential direction and which overlap in time of excitation thereof with each other. It is advisable that a reference (i.e., a border) used in defining the range Wn be set to the center of the gap 56 between the conductor groups 81. For instance, in the structure illustrated in FIG. 26, the plurality of conductor groups 81 lying in the range Wn include the first, the second, the third, and the fourth conductor groups 81 where the first conductor group 81 is closest to the magnetic center of the N-pole. The range Wn is defined to include the total of those four conductor groups 81. Ends (i.e., outer limits) of the range Wn are defined to lie at the centers of the gaps 56.

In FIG. 26, the range Wn contains half of the protrusion 142 inside each of the ends thereof. The total of the four protrusions 142 lie in the range Wn. If the width of each of the protrusions 142 (i.e., a dimension of the protrusion 142 in the circumferential direction of the stator 50, in other words, an interval between the adjacent conductor groups 81) is defined as A, the sum of widths Wt of the protrusions 142 lying in the range Wn meets a relation of Wt=1/2A+A+A+A+1/2A=4A.

Specifically, the three-phase windings of the stator coil 51 in this embodiment are made in the form of distributed windings. In the stator coil 51, the number of the protrusions 142 for each pole of the magnet unit 42, that is, the number of the gaps 56 each between the adjacent conductor groups 81 is selected to be "the number of phases×Q" where Q is the number of the conductors 82 for each phase which are placed in contact with the stator core 52. In other words, in the case where the conductors 82 are stacked in the radial direction of the rotor 40 to constitute each of the conductor groups 81, Q is the number of inner ones of the conductors 82 of the conductor groups 81 for each phase. In this case, when the three-phase windings of the stator coil 51 are excited in a given sequence, the protrusions 142 for two of the three-phases within each pole are magnetically excited. The total circumferential width Wt of the protrusions 142 excited upon excitation of the stator coil 51 within a range of each pole of the magnet unit 42, therefore, meets a relation of "the number of the phases excited×Q×A=2×2×A where A is the width of each of the protrusions 142 (i.e., the gap 56) in the circumferential direction.

The total width Wt is determined in the above way. Additionally, the protrusions 142 of the stator core 52 are made of magnetic material meeting the above equation (1). The total width Wt is also viewed as being equivalent to a circumferential dimension of where the relative magnetic permeability is expected to become greater than one within each pole. The total width Wt may alternatively be determined as a circumferential width of the protrusions 142 in each pole with some margin. Specifically, since the number of the protrusions 142 for each pole of the magnet unit 42 is given by the number of phases×Q, the width of the protrusions 412 in each pole (i.e., the total width Wt) may be given by the number of phases×Q×A=3×2×A=6A.

The distributed winding, as referred to herein, means that there is a pair of poles (i.e., the N-pole and the S-pole) of the stator coil 51 for each pair of magnetic poles. The pair of poles of the stator coil 51, as referred to herein, is made of the two straight sections 83 in which electrical current flows in opposite directions and the turn 84 electrically connecting them together. Note that a short pitch winding or a full pitch winding may be viewed as an equivalent of the distributed winding as long as it meets the above conditions.

Next, the case of a concentrated winding will be described below. The concentrated winding, as referred to herein, means that the width of each pair of magnetic poles is different from that of each pair of poles of the stator coil 51. An example of the concentrated winding includes a structure in which there are three conductor groups 81 for each pair of magnetic poles, in which there are three conductor groups 81 for two pairs of magnetic poles, in which there are nine conductor groups 81 for four pairs of magnetic poles, or in which there are nine conductor groups 81 for five pairs of magnetic poles.

In the case where the stator coil 51 is made in the form of the concentrated winding, when the three-phase windings of the stator coil 51 are excited in a given sequence, a portion of the stator coil 51 for two phases is excited. This causes the protrusions 142 for two phases to be magnetically excited. The circumferential width Wt of the protrusions 142 which is magnetically excited upon excitation of the stator winding in a range of each pole of the magnet unit 42 is given by Wt=A×2. The width Wt is determined in this way. The protrusions 142 are made of magnetic material meeting the above equation (1). In the above described case of the concentrated winding, the sum of widths of the protrusions 142 arranged in the circumferential direction of the stator 50 within a region surrounded by the conductor groups 81 for the same phase is defined as A. The dimension Wm in the concentrated winding is given by [an entire circumference of a surface of the magnet unit 42 facing the air gap]×[the number of phases]÷[the number of the distributed conductor groups 81].

Usually, a neodymium magnet, a samarium-cobalt magnet, or a ferrite magnet whose value of BH is higher than or equal to 20[MGOe (kJ/m^3)] has Bd=1.0 T or more. Iron has Br=2.0 T or more. The protrusions 142 of the stator core 52 may, therefore, be made of magnetic material meeting a relation of Wt<1/2×Wm for realizing a high-power motor.

In a case where each of the conductors 82 is, as described later, equipped with the outer coated layer 182, the conductors 82 may be arranged in the circumferential direction of the stator core with the outer coated layers 182 placed in contact with each other. In this case, the width Wt may be viewed to be zero or equivalent to thicknesses of the outer coated layers 182 of the conductors 82 contacting with each other.

The structure illustrated in FIG. 25 or 26 is designed to have conductor-to-conductor members (i.e., the protrusions 142) which are too small in size for the magnet-produced magnetic flux in the rotor 40. The rotor 40 is implemented by a surface permanent magnet rotor which has a flat surface and a low inductance, and does not have a salient pole in terms of a magnetic resistance. Such a structure enables the inductance of the stator 50 to be decreased, thereby reducing a risk of distortion of the magnetic flux caused by the switching time gap in the stator coil 51, which minimizes the electrical erosion of the bearings 21 and 22.

Modification 2

Figure 40:
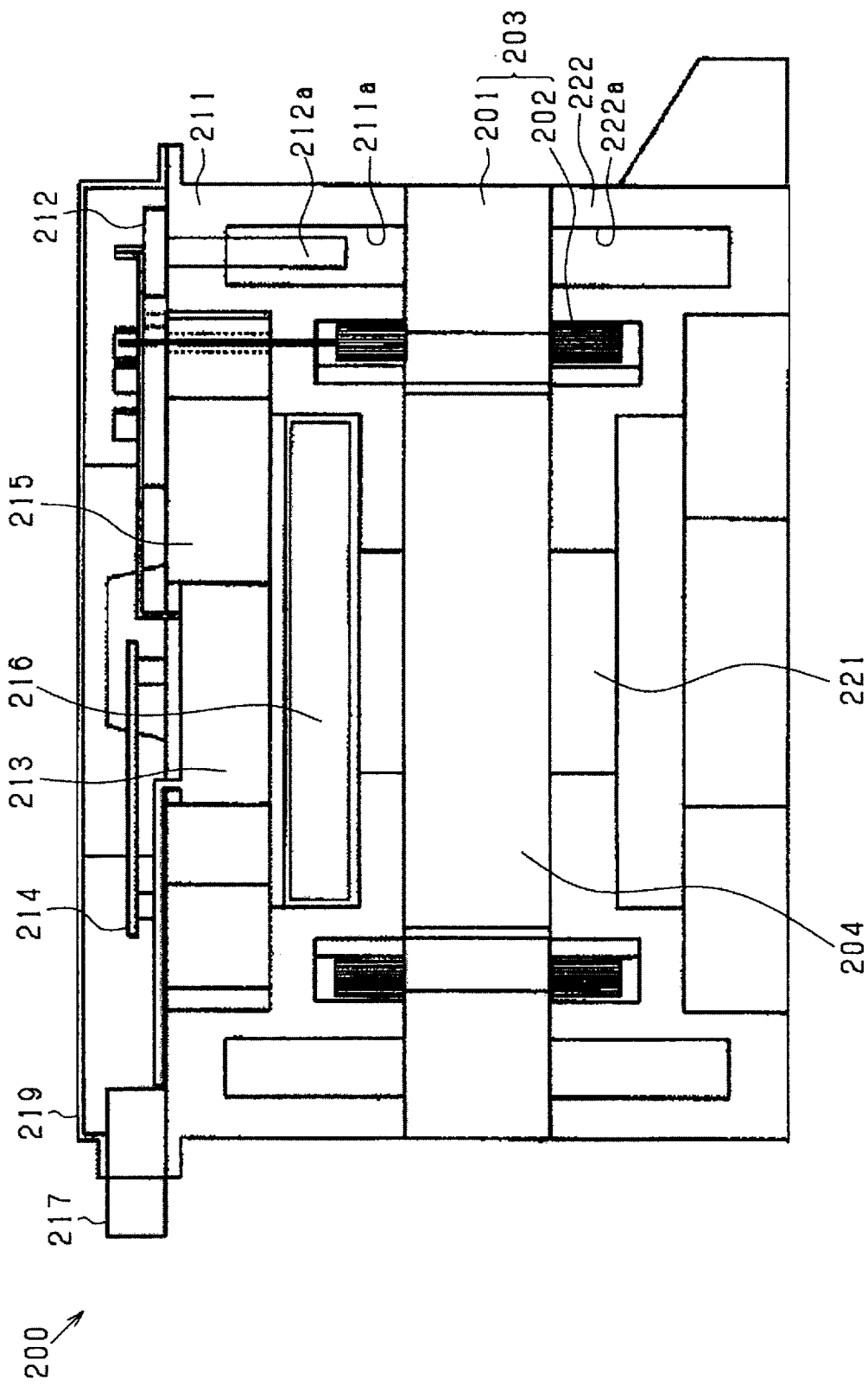
FIG. 40 is a view which illustrates a structure of an inner rotor type rotating electrical machine in the modification 11.

The stator 50 equipped with the conductor-to-conductor members made to meet the above equation may be designed to have the following structure. In FIG. 40, the stator core 52 is equipped with the teeth 143 as conductor-to-conductor members which are formed in an outer peripheral portion (an upper portion, as viewed in the drawing) of the stator core 52. The teeth 143 protrude from the yoke 141 and are arranged at given intervals away from one another in the circumferential direction of the stator core 52. Each of the teeth 143 has a thickness identical with that of the conductor group 81 in the radial direction. The teeth 143 have side surfaces placed in contact with the conductors 82 of the conductor groups 81. The teeth 143 may alternatively be located away from the conductors 82 through gaps.

The teeth 143 are shaped to have a restricted width in the circumferential direction. Specifically, each of the teeth 143 has a stator tooth which is very thin for the volume of magnets. Such a structure of the teeth 143 serves to achieve saturation by the magnet-produced magnetic flux at 1.8T or more to reduce the permeance, thereby decreasing the inductance.

If a surface area of a magnetic flux-acting surface of the magnet unit 42 facing the stator 50 for each pole is defined as Sm, and the remanent flux density of the magnet unit 42 is defined as Br, the magnetic flux in the magnet unit 42 will be Sm×Br. A surface area of each of the teeth 143 facing the rotor 40 is defined as St. The number of the conductors 83 for each phase is defined as m. When the teeth 143 for two phases within a range of one pole are magnetically excited upon excitation of the stator coil 51, the magnetic flux in the stator 50 is expressed by St×m×2×Bs. The decrease in inductance may be achieved by selecting the dimensions of the teeth 143 to meet a relation of $$St \times m \times 2 \times Bs < Sm \times Br \qquad (2).$$

In a case where the dimension of the magnet unit 42 is identical with that of the teeth 143 in the axial direction, the above equation (2) may be rewritten as an equation (3) of Wst×m×2×Bs<Wm×Br where Wm is the circumferential width of the magnet unit 42 for each pole, and Wst is the circumferential width of the teeth 143. For example, when Bs=2 T, Br=1 T, and m=2, the equation (3) will be Wst<Wm/8. In this case, the decrease in inductance may be achieved by selecting the width Wst of the teeth 143 to be smaller than one-eighth (⅛) of the width Wm of the magnet unit 42 for one pole. When m is one, the width Wst of the teeth 143 is preferably selected to be smaller than one-fourth (¼) of the width Wm of the magnet unit 42 for one pole.

"Wst×m×2" in the equation (3) corresponds to a circumferential width of the teeth 143 magnetically excited upon excitation of the stator coil 51 in a range of one pole of the magnet unit 42.

Figure 27:
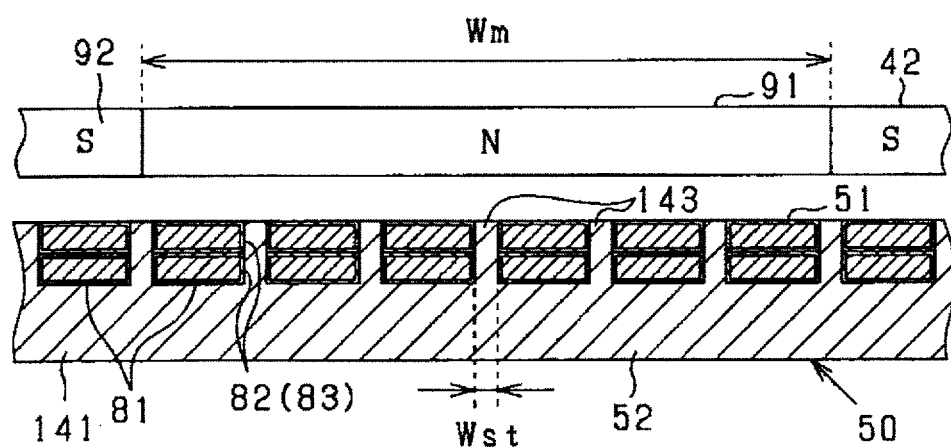
FIG. 27 is a sectional view of a stator in a modification 2.

The structure in FIG. 27 is, like in FIGS. 25 and 26, equipped with the conductor-to-conductor members (i.e., the teeth 143) which are very small in size for the magnet-produced magnetic flux in the rotor 40. Such a structure is capable of reducing the inductance of the stator 50 to alleviate a risk of distortion of the magnetic flux arising from the switching time gap in the stator coil 51, which minimizes the probability of the electrical erosion of the bearings 21 and 22. Note that the definitions of parameters, such as Wt, Wn, A, and Bs, associated with the stator 50 or parameters, such as Wm and Br, associated with the magnet unit 42 may refer to those in the above described modification 1.

Modification 3

Figure 28:
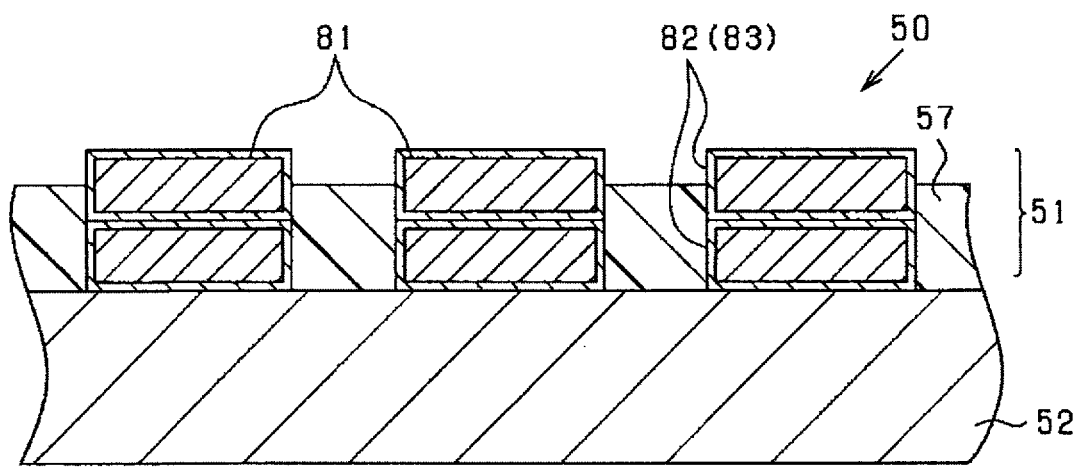
FIG. 28 is a sectional view of a stator in a modification 3.

The above embodiment has the sealing members 57 which cover the stator coil 51 and occupy a region including all of the conductor groups 81 radially outside the stator core 52, in other words, lie in a region where the thickness of the sealing members 57 is larger than that of the conductor groups 81 in the radial direction. This layout of the sealing members 57 may be changed. For instance, the sealing members 57 may be, as illustrated in FIG. 28, designed so that the conductors 82 protrude partially outside the sealing members 57. Specifically, the sealing members 57 are arranged so that portions of the conductors 82 that are radially outermost portions of the conductor groups 81 are exposed outside the sealing members 57 toward the stator 50. In this case, the thickness of the sealing members 57 in the radial direction may be identical with or smaller than that of the conductor groups 81.

Modification 4

Figure 29:
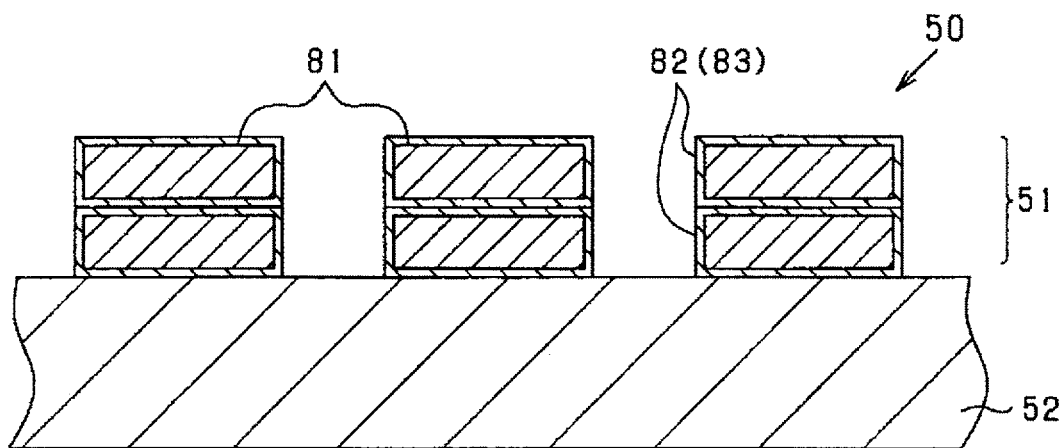
FIG. 29 is a sectional view of a stator in a modification 4.

The stator 50 may be, as illustrated in FIG. 29, designed not to have the sealing members 57 covering the conductor groups 81, i.e., the stator coil 51. In this case, a gap is created between the adjacent conductor groups 81 arranged in the circumferential direction without a conductor-to-conductor member therebetween. In other words, no conductor-to-conductor member is disposed between the conductor groups 81 arranged in the circumferential direction. Air may be arranged in the gaps between the conductor groups 81. The air may be viewed as a non-magnetic member or an equivalent thereof whose Bs is zero (0).

Modification 5

The conductor-to-conductor members of the stator 50 may be made of a non-magnetic material other than resin. For instance, a non-metallic material, such as SUS304 that is austenitic stainless steel.

Modification 6

The stator 50 may be designed not to have the stator core 52.

Specifically, the stator 50 is made of the stator coil 51 shown in FIG. 12. The stator coil 51 of the stator 50 may be covered with a sealing member. The stator 50 may alternatively be designed to have an annular winding retainer made from non-magnetic material such as synthetic resin instead of the stator core 52 made from soft magnetic material.

Modification 7

Figure 30:
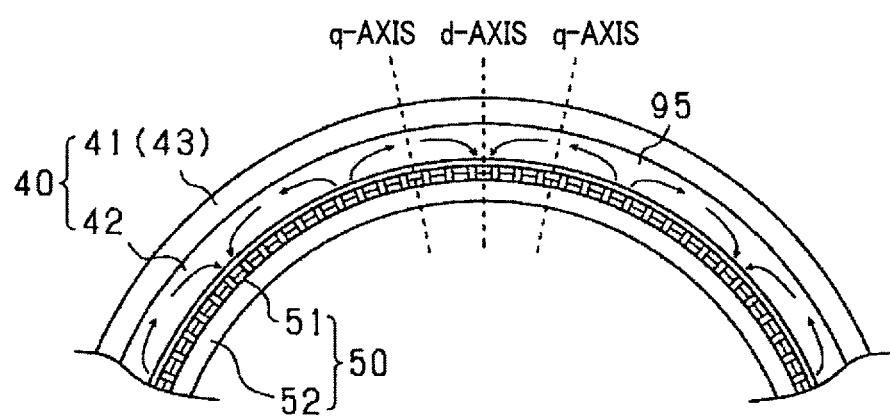
FIG. 30 is a transverse sectional view of a rotor and a stator in a modification 7.

The structure in the first embodiment uses the magnets 91 and 92 arranged in the circumferential direction to constitute the magnet unit 42 of the rotor 40. The magnet unit 42 may be made using an annular permanent magnet. For instance, the annular magnet 95 is, as illustrated in FIG. 30, secured to a radially inner periphery of the cylinder 43 of the magnet holder 41. The annular magnet 95 is equipped with a plurality of different magnetic poles whose polarities are arranged alternately in the circumferential direction of the annular magnet 95. The magnet 95 lies integrally both on the d-axis and the q-axis. The annular magnet 95 has a magnetic orientation directed in the radial direction on the d-axis of each magnetic pole and a magnetic orientation directed in the circumferential direction on the q-axis between magnetic poles, thereby creating arc-shaped magnetic paths.

The annular magnet 95 may be designed to have an easy axis of magnetization directed parallel or near parallel to the d-axis near the d-axis and also to have an easy axis of magnetization directed perpendicular or near perpendicular to the q-axis near the q-axis, thereby creating the arc-shaped magnetic paths.

Modification 8

This modification is different in operation of the controller 110 from the above embodiment or modifications. Only differences from those in the first embodiment will be described below.

Figure 31:
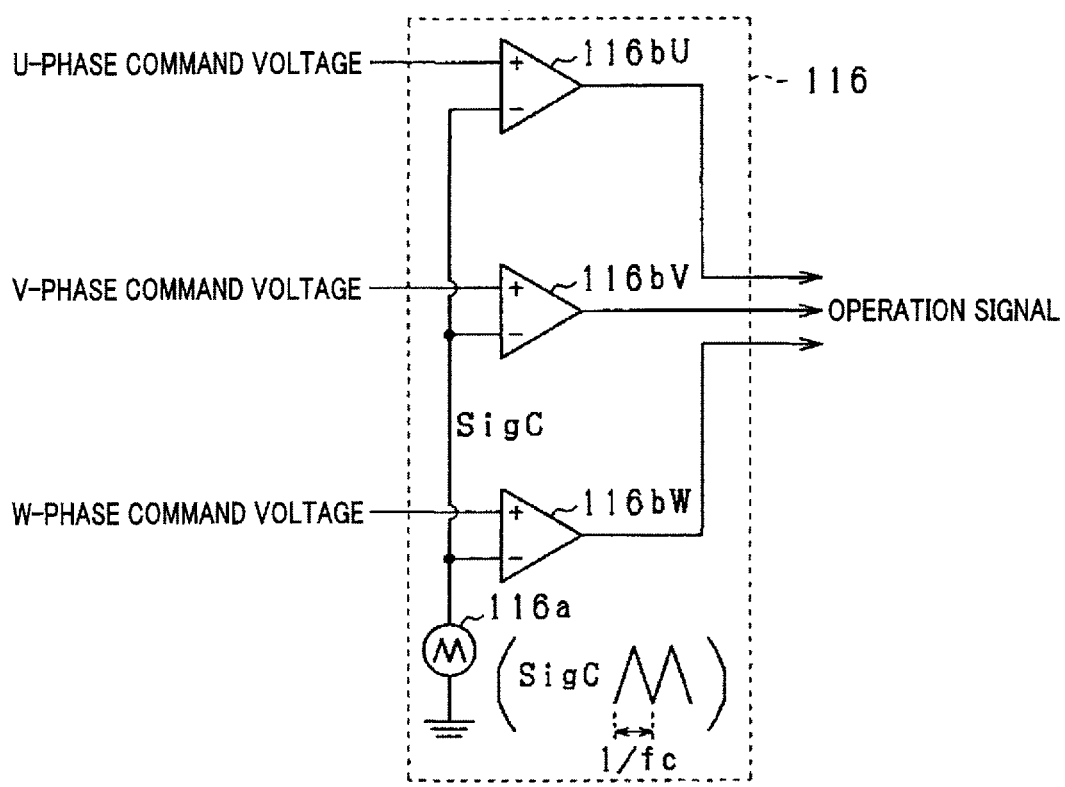
FIG. 31 is a functional block diagram which illustrates a portion of operations of an operation signal generator in a modification 8.

The operations of the operation signal generators 116 and 126 illustrated in FIG. 20 and the operation signal generators 130a and 130b illustrated in FIG. 21 will first be discussed below using FIG. 31. The operations executed by the operation signal generators 116, 126, 130a, and 130b are basically identical with each other. Only the operation of the operation signal generator 116 will, therefore, be described below for the sake of simplicity.

The operation signal generator 116 includes the carrier generator 116a, the U-phase comparator 116bU, the V-phase comparator 116bV, and the W-phase comparator 116bW. The carrier generator 116a produces and outputs the carrier signal SigC in the form of a triangle wave signal.

The U-, V-, and W-phase comparators 116bU, 116bV, and 116bW receive the carrier signal SigC outputted by the carrier generator 116a and the U-, V-, and W-phase command voltages produced by the three-phase converter 115. The U-, V-, and W-phase command voltages are produced, for example, in the form of a sine wave and outputted 120 out of electrical phase with each other.

The U-, V-, and W-phase comparators 116bU, 116bV, and 116bW compare the U-, V-, and W-phase command voltages with the carrier signal SigC to produce operation signals for the switches Sp and Sn of the upper and lower arms in the first inverter 101 for the U-, V-, and W-phase windings under PWM (Pulse Width Modulation) control. Specifically, the operation signal generator 116 works to produce operation signals for the switches Sp and Sn of the upper and lower arms for the U-, V-, and W-phase windings under the PWM control based on comparison of levels of signals derived by normalizing the U-, V-, and W-phase command voltages using the power supply voltage with a level of the carrier signal SigC. The driver 117 is responsive to the operation signals outputted by the operation signal generator 116 to turn on or off the switches Sp and Sn in the first inverter 101 for the U-, V-, and W-phase windings.

The controller 110 alters the carrier frequency fc of the carrier signal SigC, i.e., a switching frequency for each of the switches Sp and Sn. The carrier frequency fc is altered to be higher in a low torque range or a high-speed range in the rotating electrical machine 10 and alternatively lower in a high torque range in the rotating electrical machine 10. This altering is achieved in order to minimize a deterioration in ease of control of electrical current flowing through each of the U-, V-, and W-phase windings.

In brief, the core-less structure of the stator 50 serves to reduce the inductance in the stator 50. The reduction in inductance usually results in a decrease in electrical time constant in the rotating electrical machine 10. This leads to a possibility that a ripple of current flowing through each of the phase windings may be increased, thereby resulting in the deterioration in ease of control of the current flowing through the phase winding, which causes control divergence. The adverse effects of the above deterioration on the ease of control usually become higher when the current (e.g., an effective value of the current) flowing through the winding lies in a low current region than when the current lies in a high current range. In order to alleviate such a problem, the controller 110 in this embodiment is designed to alter the carrier frequency fc.

How to alter the carrier frequency fc will be described below with reference to FIG. 32. This operation of the operation signal generator 116 is executed by the controller 110 cyclically at a given interval.

First, in step S10, it is determined whether electrical current flowing through each of the three-phase windings 51a lies in the low current range.

This determination is made to determine whether torque now produced by the rotating electrical machine 10 lies in the low torque range. Such a determination may be achieved according to the first method or the second method, as discussed below.

First Method

The estimated torque value of the rotating electrical machine 10 is calculated using the d-axis current and the q-axis current converted by the d-q converter 112. If the estimated torque value is determined to be lower than a torque threshold value, it is concluded that the current flowing through the winding 51a lies in the low current range. Alternatively, if the estimated torque value is determined to be higher than or equal to the torque threshold value, it is concluded that the current lies in the high current range. The torque threshold value is selected to be half, for example, the degree of starting torque (also called locked rotor torque) in the rotating electrical machine 10.

Second Method

If an angle of rotation of the rotor 40 measured by an angle sensor is determined to be higher than or equal to a speed threshold value, it is determined that the current flowing through the winding 51a lies in the low current range, that is, in the high speed range. The speed threshold value may be selected to be a rotational speed of the rotating electrical machine 10 when a maximum torque produced by the rotating electrical machine 10 is equal to the torque threshold value.

If a NO answer is obtained in step S10, meaning that the current lies in the high current range, then the routine proceeds to step S11 wherein the carrier frequency fc is set to the first frequency fL.

Alternatively, if a YES answer is obtained in step S10, then the routine proceeds to step S12 wherein the carrier frequency fc is set to the second frequency fH that is higher than the first frequency fL.

As apparent from the above discussion, the carrier frequency fc when the current flowing through each of the three-phase windings lies in the low current range is selected to be higher than that when the current lies in the high current range. The switching frequency for the switches Sp and Sn is, therefore, increased in the low current range, thereby minimizing a rise in current ripple to ensure the stability in controlling the current.

When the current flowing through each of the three-phase windings lies in the high current range, the carrier frequency fc is selected to be lower than that when the current lies in the low current range. The current flowing through the winding in the high current range usually has an amplitude larger than that when the current lies in the low current range, so that the rise in current ripple arising from the reduction in inductance has a low impact on the ease of control of the current. It is, therefore, possible to set the carrier frequency fc in the high current range to be lower than that in the low current range, thereby reducing a switching loss in the inverters 101 and 102.

This modification is capable of realizing the following modes.

Figure 32:
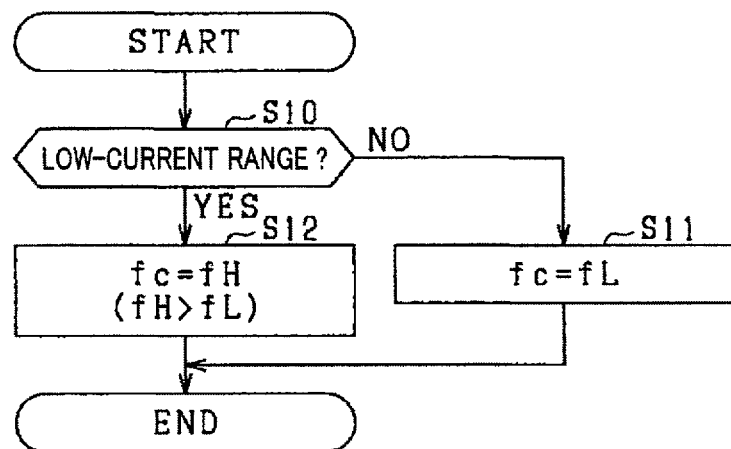
FIG. 32 is a flowchart representing a sequence of steps to execute a carrier frequency altering operation.

If a YES answer is obtained in step S10 in FIG. 32 when the carrier frequency fc is set to the first frequency fL, the carrier frequency fc may be changed gradually from the first frequency fL to the second frequency fH.

Alternatively, if a NO answer is obtained in step S10 when the carrier frequency fc is set to the second frequency fH, the carrier frequency fc may be changed gradually from the second frequency fH to the first frequency fL.

The operation signals for the switches may alternatively be produced using SVM (Space Vector Modulation) instead of the PWM. The above altering of the switching frequency may also be made.

Modification 9

Figures 33A, 33B, 33C:
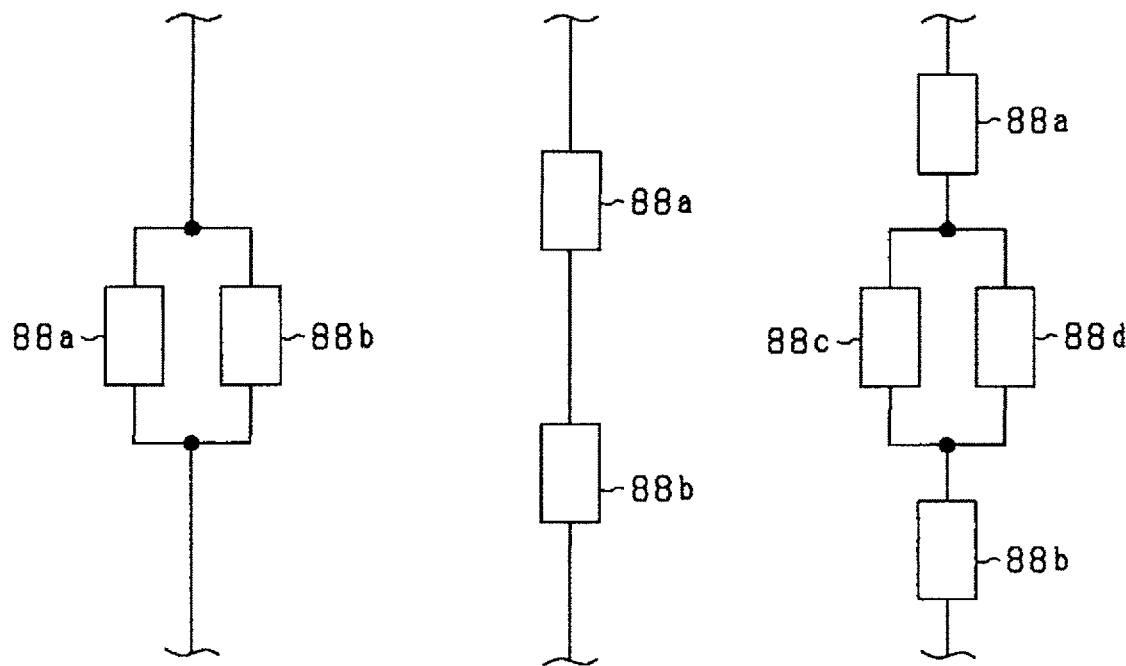
FIG. 33($a$) is a view which illustrates an electrical connection of first and second conductors that are the two pairs of conductors according to a modification 9.

In each of the embodiments, two pairs of conductors making up the conductor groups 81 for each phase are, as illustrated in FIG. 33(a), arranged parallel to each other. FIG. 33(a) is a view which illustrates an electrical connection of the first and second conductors 88a and 88b that are the two pairs of conductors. The first and second conductors 88a and 88b may alternatively be, as illustrated in FIG. 33(b), connected in series with each other instead of the connection in FIG. 33(a).

Figure 34:
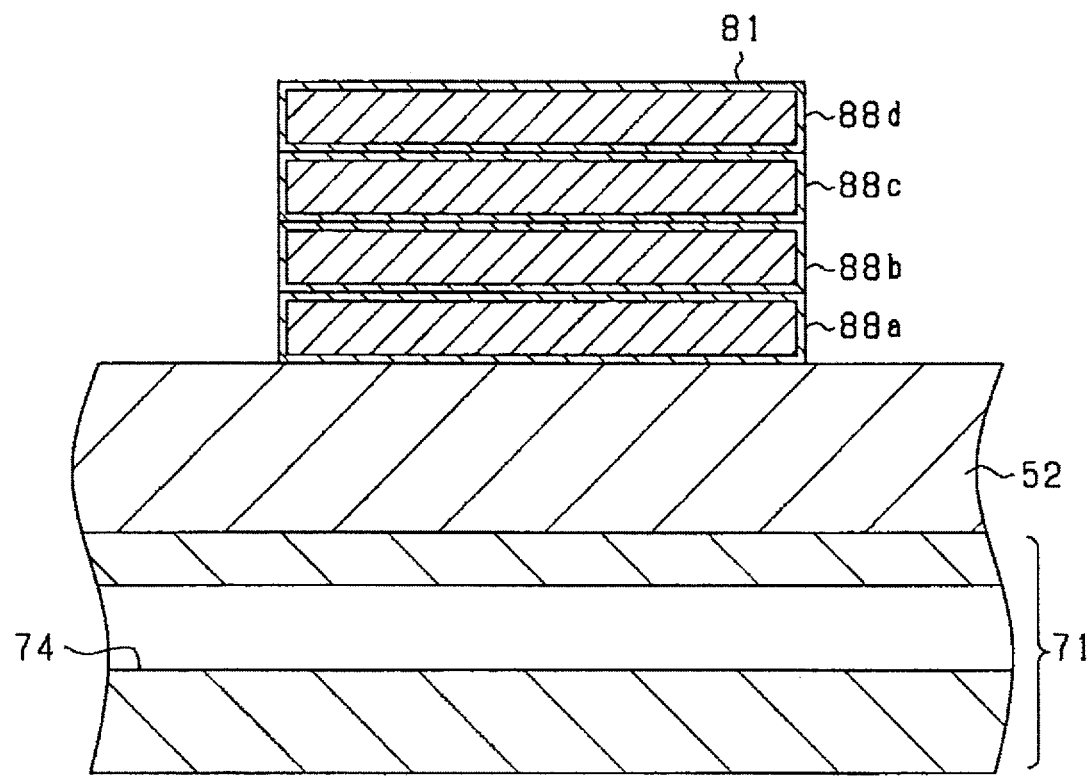
FIG. 34 is a view which illustrates a stack of four pairs of conductors in the modification 9.

Three or more pairs of conductors may be stacked in the form of multiple layers. FIG. 34 illustrates four pairs of conductors: the first to fourth conductors 88a to 88d which are stacked. The first conductor 88a, the second conductor 88b, the third conductor 88c, and the fourth conductor 88d are arranged in this order from the stator core 52 in the radial direction.

The third and fourth conductors 88c and 88d are, as illustrated in FIG. 33(c), connected in parallel to each other. The first conductor 88a is connected to one of joints of the third and fourth conductors 88c and 88d. The second conductor 88b is connected to the other joint of the third and fourth conductors 88c and 88d. The parallel connection of conductors usually results in a decrease in current density of those conductors, thereby minimizing thermal energy produced upon energization of the conductors. Accordingly, in the structure in which a cylindrical stator winding is installed in a housing (i.e., the unit base 61) with the coolant path 74 formed therein, the first and second conductors 88a and 88b which are connected in non-parallel to each other are arranged close to the stator core 52 placed in contact with the unit base 61, while the third and fourth conductors 88c and 88d which are connected in parallel to each other are disposed farther away from the stator core 52. This layout equalizes the cooling ability of the conductors 88a to 88d stacked in the form of multiple layers.

The conductor group 81 including the first to fourth conductors 88a to 88d may have a thickness in the radial direction which is smaller than a circumferential width of the conductor groups 81 for one phase within a region of one pole.

Modification 10

Figure 35:
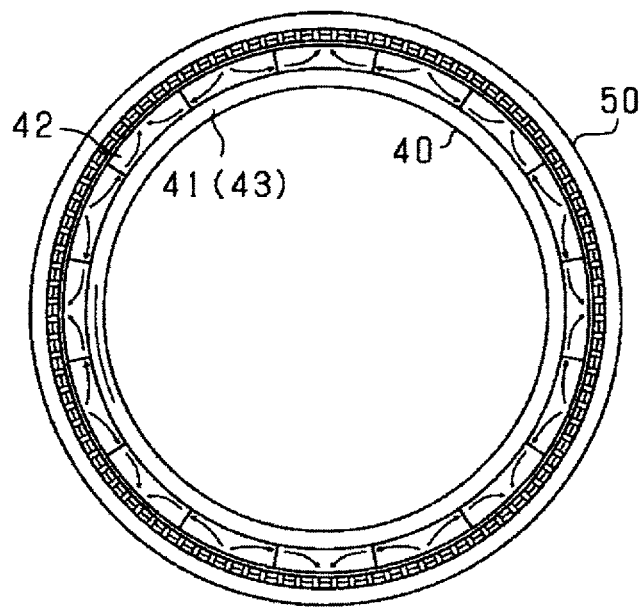
FIG. 35 is a transverse sectional view of an inner rotor type rotor and a stator in a modification 10.
Figure 36:
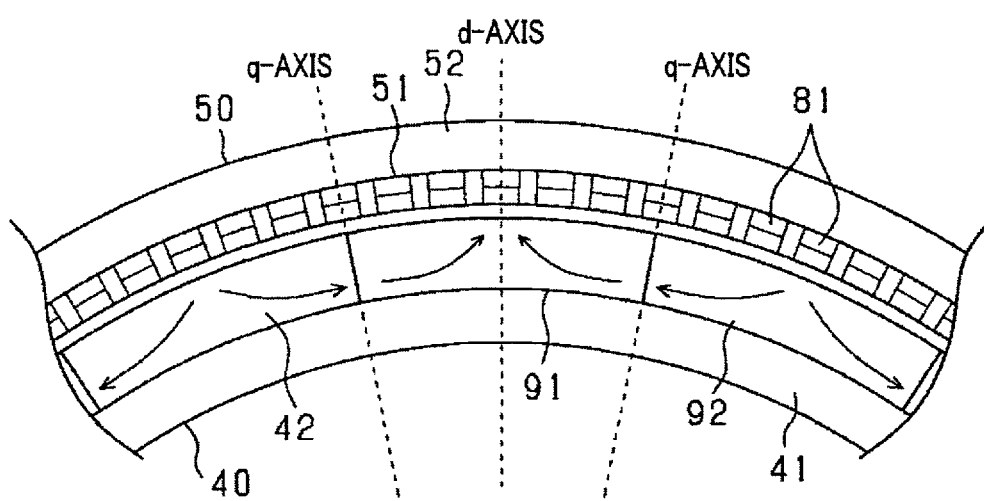
FIG. 36 is a partially enlarged view of part of FIG. 35.

The rotating electrical machine 10 may alternatively be designed to have an inner rotor structure (i.e., an inward rotating structure). In this case, the stator 50 may be mounted, for example, on a radial outside within the housing 30, while the rotor 40 may be disposed on a radial inside within the housing 30. The inverter unit 60 may be mounted one or both axial sides of the stator 50 or the rotor 40. FIG. 35 is a transverse sectional view of the rotor 40 and the stator 50. FIG. 36 is an enlarged view which partially illustrates the rotor 40 and the stator 50 in FIG. 35.

The inner rotor structure in FIGS. 35 and 36 is substantially identical with the outer rotor structure in FIGS. 8 and 9 except for the layout of the rotor 40 and the stator 50 in the radial direction. In brief, the stator 50 is equipped with the stator coil 51 having the flattened conductor structure and the stator core 52 with no teeth. The stator coil 51 is installed radially inside the stator core 52. The stator core 52, like the outer rotor structure, has any of the following structures.

(A) The stator 50 has the conductor-to-conductor members each of which is disposed between the conductor portions in the circumferential direction. As the conductor-to-conductor members, magnetic material is used which meets a relation of Wt×Bs Wm×Br where Wt is a width of the conductor-to-conductor members in the circumferential direction within one magnetic pole, Bs is the saturation magnetic flux density of the conductor-to-conductor members, Wm is a width of the magnet unit equivalent to one magnetic pole in the circumferential direction, and Br is the remanent flux density in the magnet unit.

(B) The stator 50 has the conductor-to-conductor members each of which is disposed between the conductor portions in the circumferential direction. The conductor-to-conductor members are each made of a non-magnetic material.

(C) The stator 50 has no conductor-to-conductor member disposed between the conductor portions in the circumferential direction.

The same is true of the magnets 91 and 92 of the magnet unit 42. Specifically, the magnet unit 42 is made up of the magnets 91 and 92 each of which is magnetically oriented to have the easy axis of magnetization which is directed near the d-axis to be more parallel to the d-axis than that near the q-axis which is defined on the boundary of the magnetic poles. The details of the magnetization direction in each of the magnets 91 and 92 are the same as described above. The magnet unit 42 may be the annular magnet 95 (see FIG. 30).

Figure 37:
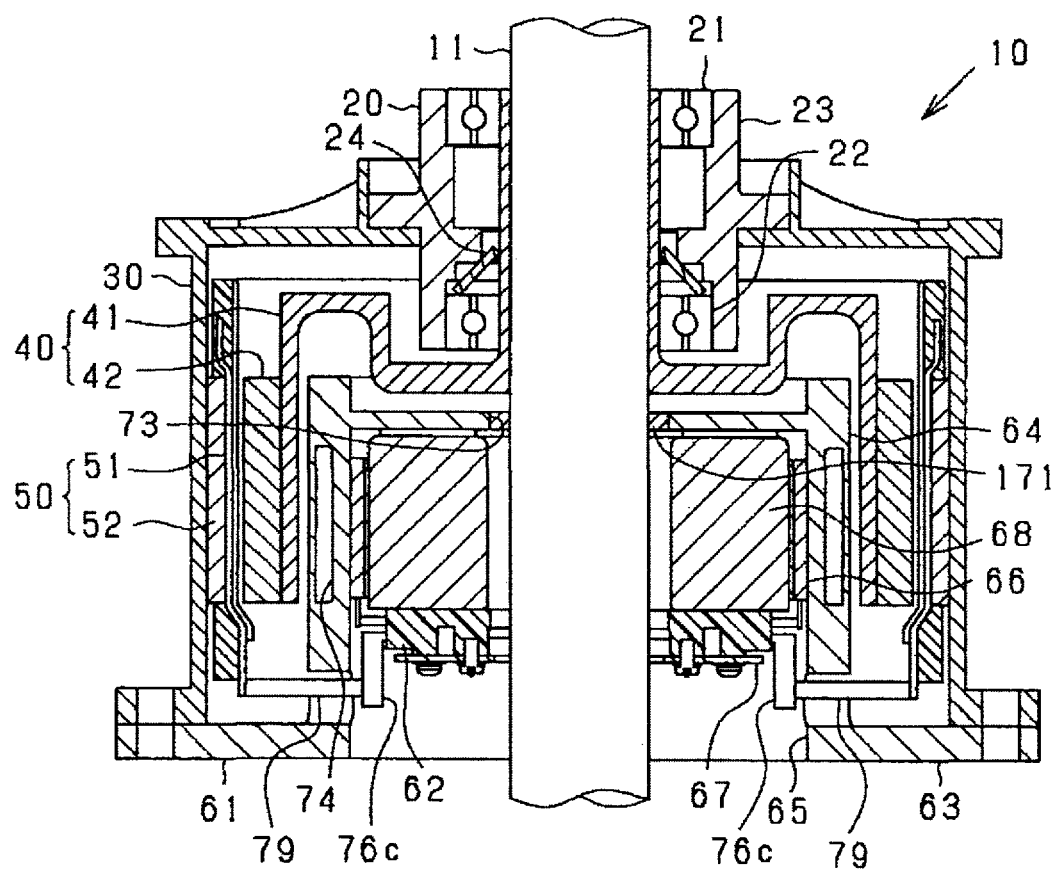
FIG. 37 is a longitudinal sectional view of an inner rotor type rotating electrical machine.

FIG. 37 is a longitudinal sectional view of the rotating electrical machine 10 designed to have the inner rotor structure. FIG. 37 corresponds to FIG. 2. Differences from the structure in FIG. 2 will be described below in brief. In FIG. 37, the annular stator 50 is retained inside the housing 30. The rotor 40 is disposed inside the stator 50 with an air gap therebetween to be rotatable. The bearings 21 and 22 are, like in FIG. 2, offset from the axial center of the rotor 40 in the axial direction of the rotor 40, so that the rotor is retained in the cantilever form. The inverter 60 is mounted inside the magnet holder 41 of the rotor 40.

Figure 38:
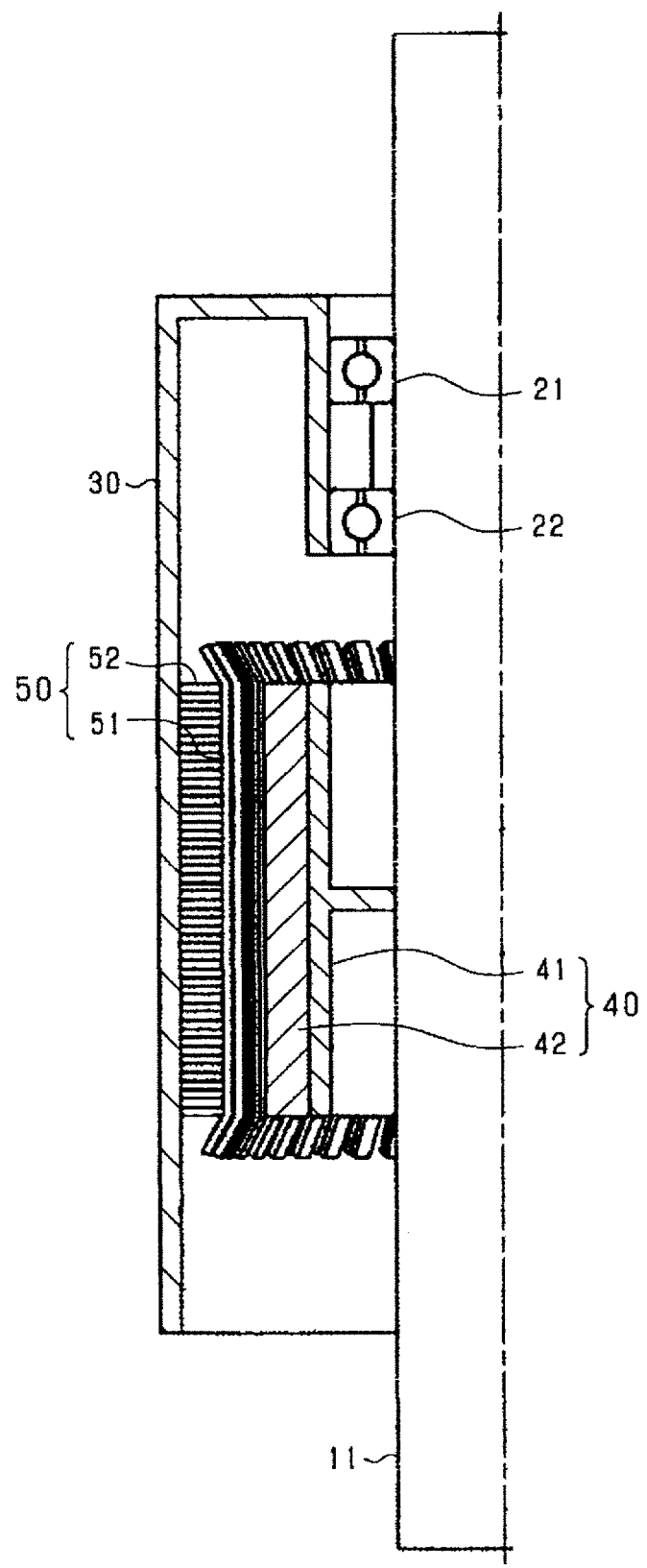
FIG. 38 is a longitudinal sectional view which schematically illustrates a structure of an inner rotor type rotating electrical machine.

FIG. 38 illustrates the inner rotor structure of the rotating electrical machine 10 which is different from that described above. The housing 30 has the rotating shaft 11 retained by the bearings 21 and 22 to be rotatable. The rotor 40 is secured to the rotating shaft 11. Like the structure in FIG. 2, each of the bearings 21 and 22 is offset from the axial center of the rotor in the axial direction of the rotor 40. The rotor 40 is equipped with the magnet holder 41 and the magnet unit 42.

Figure 50:
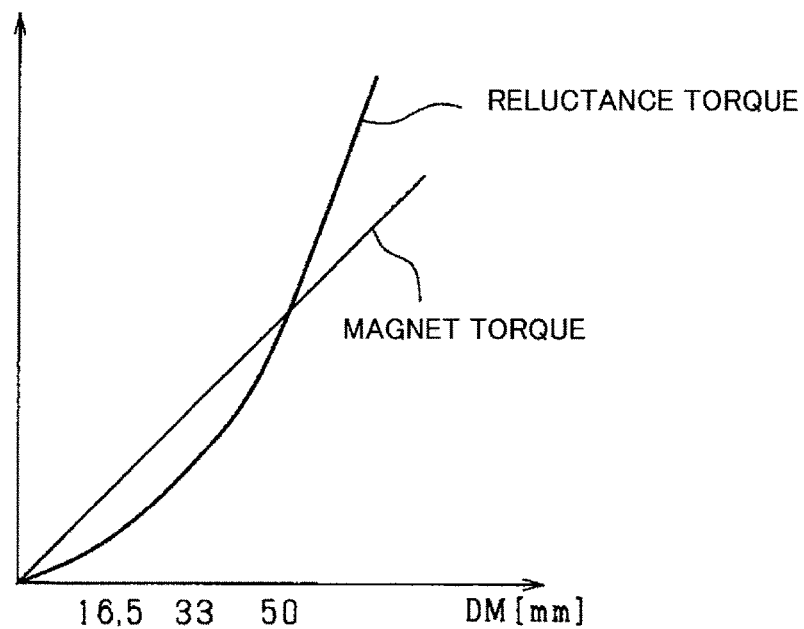
FIG. 50 is a view which illustrates a relation among reluctance torque, magnet torque, and distance DM.
Figure 51:
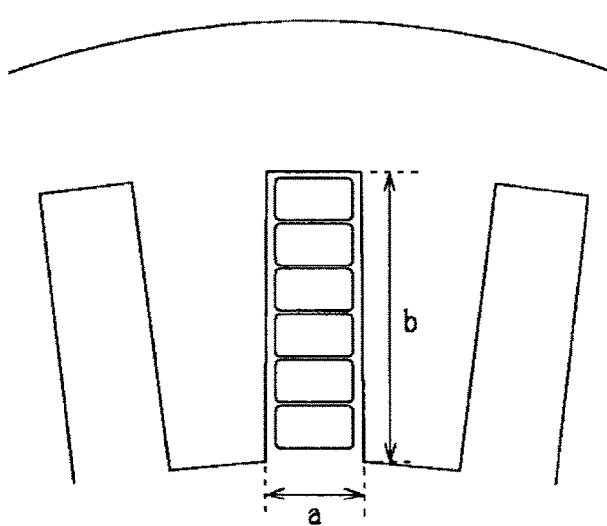
FIG. 51 is a view which illustrates teeth.

The rotating electrical machine 10 in FIG. 51 is different from that in FIG. 50 in that the inverter unit 60 is not located radially inside the rotor 40. The magnet holder 41 is joined to the rotating shaft 11 radially inside the magnet unit 42. The stator 50 is equipped with the stator coil 51 and the stator core 52 and secured to the housing 30. Note that the definitions of parameters, such as Wt, Wn, Wm, and Bs, associated with the stator 50 or parameters, such as θ11, θ12, X1, X2, Wm, and Br, associated with the magnet unit 42 may refer to those in the above described first embodiment or the modification 1.

Modification 11

Figure 39:
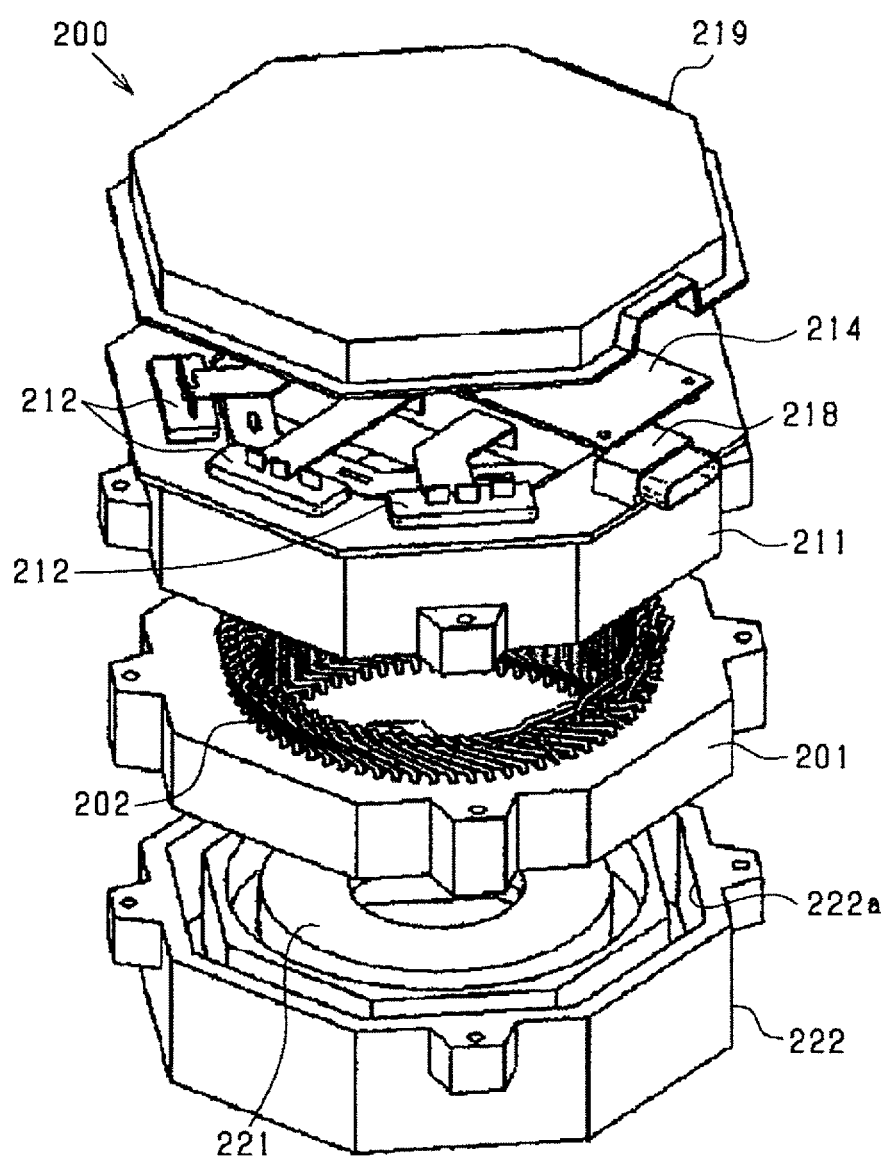
FIG. 39 is a view which illustrates a structure of an inner rotor type rotating electrical machine in a modification 11.

The inner rotor structure of a rotating electrical machine which is different from that described above will be discussed below. FIG. 39 is an exploded view of the rotating electrical machine 200. FIG. 40 is a sectional side view of the rotating electrical machine 200. In the following discussion, a vertical direction is based on the orientation of the rotating electrical machine 200.

The rotating electrical machine 200, as illustrated in FIGS. 39 and 40, includes the stator 203 and the rotor 204. The stator 203 is equipped with the annular stator core 201 and the multi-phase stator winding 202. The rotor 204 is disposed inside the stator core 201 to be rotatable. The stator 203 works as an armature. The rotor 204 works as a field magnet. The stator core 201 is made of a stack of silicon steel plates. The stator winding 202 is installed in the stator core 201.

Although not illustrated, the rotor 204 is equipped with a rotor core and a plurality of permanent magnet arranged in the form of a magnet unit. The rotor core has formed therein a plurality of holes which are arranged at equal intervals away from each other in the circumferential direction of the rotor core. The permanent magnets which are magnetized to have magnetization directions changed alternately in adjacent magnetic poles are disposed in the holes of the rotor core. The permanent magnets of the magnet unit may be designed, like in FIG. 23, to have a Halbach array structure or a similar structure. The permanent magnets of the magnet unit may alternatively be made of anisotropic magnets, as described with reference to FIG. 9 or 30, in which the magnetic orientation (i.e., the magnetization direction) extends in an arc-shape between the d-axis which is defined on the magnetic center and the q-axis which is defined on the boundary of the magnetic poles.

The stator 203 may be made to have one of the following structures.

(A) The stator 203 has the conductor-to-conductor members each of which is disposed between the conductor portions in the circumferential direction. As the conductor-to-conductor members, magnetic material is used which meets a relation of Wt×Bs Wm×Br where Wt is a width of the conductor-to-conductor members in the circumferential direction within one magnetic pole, Bs is the saturation magnetic flux density of the conductor-to-conductor members, Wm is a width of the magnet unit equivalent to one magnetic pole in the circumferential direction, and Br is the remanent flux density in the magnet unit.

(B) The stator 203 has the conductor-to-conductor members each of which is disposed between the conductor portions in the circumferential direction. The conductor-to-conductor members are each made of a non-magnetic material.

(C) The stator 203 has no conductor-to-conductor member disposed between the conductor portions in the circumferential direction.

The rotor 204 has the magnet unit which is made up of a plurality of magnets each of which is magnetically oriented to have the easy axis of magnetization which is directed near the d-axis to be more parallel to the d-axis than that near the q-axis which is defined on the boundary of the magnetic poles.

The annular inverter case 211 is disposed on one end side of an axis of the rotating electrical machine 200. The inverter case 211 has a lower surface placed in contact with an upper surface of the stator core 201. The inverter case 211 has disposed therein a plurality of power modules 212 constituting an inverter circuit, the smoothing capacitors 213 working to reduce a variation in voltage or current (i.e., a ripple) resulting from switching operations of semiconductor switches, the control board 214 equipped with a controller, the current sensor 215 working to measure a phase current, and the resolver stator 216 serving as a rotational speed sensor for the rotor 204. The power modules 212 are equipped with IGBTs serving as semiconductor switches and diodes.

The inverter case 211 has the power connector 217 which is disposed on a circumferential edge thereof for connection with a dc circuit for a battery mounted in a vehicle. The inverter case 211 also has the signal connector 218 which is disposed on the circumferential edge thereof for achieving transmission of signals between the rotating electrical machine 200 and a controller installed in the vehicle. The inverter case 211 is covered with the top cover 219. The dc power produced by the battery installed in the vehicle is inputted into the power connector 217, converted by the switches of the power modules 212 to an alternating current, and then delivered to phase windings of the stator winding 202.

The bearing unit 221 and the annular rear case 222 are disposed on the opposite end side of the axis of the stator core to the inverter case 211. The bearing unit 221 retains a rotation axis of the rotor 204 to be rotatable. The rear case 222 has the bearing unit 221 disposed therein. The bearing unit 221 is equipped with, for example, two bearings and offset from the center of the length of the rotor 204 toward one of the ends of the length of the rotor 204. The bearing unit 221 may alternatively be engineered to have a plurality of bearings disposed on both end sides of the stator core 201 opposed to each other in the axial direction, so that the bearings retain both the ends of the rotation shaft. The rear case 222 is fastened to a gear case or a transmission of the vehicle using bolts, thereby securing the rotating electrical machine 200 to the vehicle.

The inverter case 211 has formed therein the cooling flow path 211a through which cooling medium flows. The cooling flow path 211a is defined by closing an annular recess formed in a lower surface of the inverter case 211 by an upper surface of the stator core 201. The cooling flow path 211a surrounds a coil end of the stator winding 202. The cooling flow path 211a has the module cases 212a of the power modules 212 disposed therein. Similarly, the rear case 222 has formed therein the cooling flow path 222a which surrounds a coil end of the stator winding 202. The cooling flow path 222a is defined by closing an annular recess formed in an upper surface of the rear case 222 by a lower surface of the stator core 201. Note that the definitions of parameters, such as Wt, Wn, Wm, and Bs, associated with the stator 50 or parameters, such as θ11, θ12, X1, X2, Wm, and Br, associated with the magnet unit 42 may refer to those in the above described first embodiment or the modification 1.

Modification 12

Figure 41:
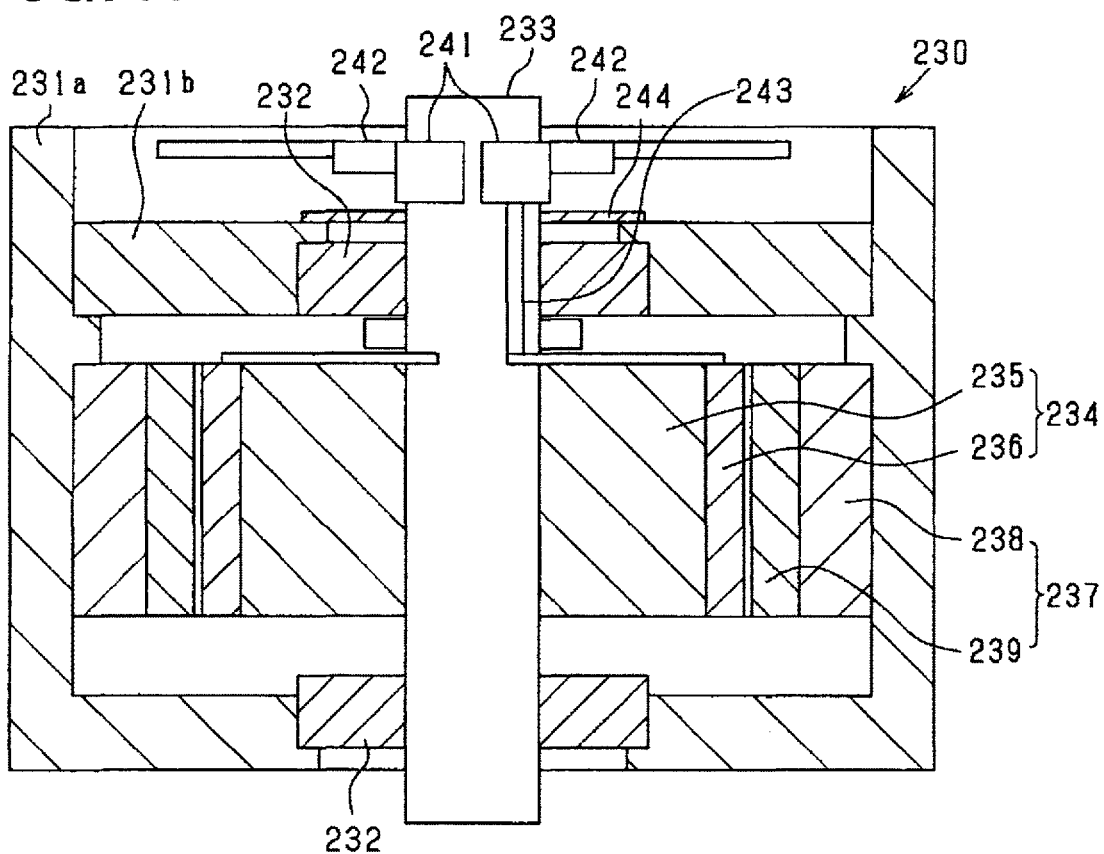
FIG. 41 is a view which illustrates a structure of a revolving armature type of rotating electrical machine in a modification 12.

The above discussion has referred to the revolving-field type of rotating electrical machines, but a revolving armature type of rotating electrical machine may be embodied. FIG. 41 illustrates the revolving armature type of rotating electrical machine 230.

The rotating electrical machine 230 in FIG. 41 has the bearing 232 retained by the housings 231a and 231b. The bearing 232 retains the rotating shaft 233 to be rotatable. The bearing 232 is made of, for example, an oil-impregnated bearing in which a porous metal is impregnated with oil. The rotating shaft 233 has secured thereto the rotor 234 which works as an armature. The rotor 234 includes the rotor core 235 and the multi-phase rotor winding 236 secured to an outer periphery of the rotor core 235. The rotor core 235 of the rotor 234 is designed to have the slot-less structure. The multi-phase rotor winding 236 has the flattened conductor structure as described above. In other words, the multi-phase rotor winding 236 is shaped to have an area for each phase which has a dimension in the circumferential direction which is larger than that in the radial direction.

The stator 237 is disposed radially outside the rotor 234. The stator 237 works as a field magnet. The stator 237 includes the stator core 238 and the magnet unit 239. The stator core 238 is secured to the housing 231a. The magnet unit 239 is attached to an inner periphery of the stator core 238. The magnet unit 239 is made up of a plurality of magnets arranged to have magnetic poles alternately arrayed in the circumferential direction. Like the magnet unit 42 described above, the magnet unit 239 is magnetically oriented to have the easy axis of magnetization which is directed near the d-axis to be more parallel to the d-axis than that near the q-axis that is defined on a boundary between the magnetic poles. The magnet unit 239 is equipped with magnetically oriented sintered neodymium magnets whose intrinsic coercive force is 400 [kA/m] or more and whose remanent flux density is 1.0 [T] or more.

The rotating electrical machine 230 in this embodiment is engineered as a two-pole three-coil brush coreless motor. The multi-phase rotor winding 236 is made of three coils. The magnet unit 239 is designed to have two poles. A ratio of the number of poles and the number of coils in typical brush motors is 2:3, 4:10, or 4:21 depending upon intended use.

The rotating shaft 233 has the commutator 241 secured thereto. A plurality of brushes 242 are arranged radially outside the commutator 241. The commutator 241 is electrically connected to the multi-phase rotor winding 236 through the conductors 234 embedded in the rotating shaft 233. The commutator 241, the brushes 242, and the conductors 243 are used to deliver dc current to the multi-phase rotor winding 236. The commutator 241 is made up of a plurality of sections arrayed in a circumferential direction thereof depending upon the number of phases of the multi-phase rotor winding 236. The brushes 242 may be connected to a dc power supply, such as a storage battery, using electrical wires or using a terminal block.

The rotating shaft 233 has the resinous washer 244 disposed between the bearing 232 and the commutator 241. The resinous washer 244 serves as a sealing member to minimize leakage of oil seeping out of the bearing 232, implemented by an oil-impregnated bearing, to the commutator 241.

Modification 13

Each of the conductors 82 of the stator coil 51 of the rotating electrical machine 10 may be designed to have a stack of a plurality of insulating coatings or layers laid on each other. For instance, each of the conductors 82 may be made by covering a bundle of a plurality of insulating layer-coated conductors (i.e., wires) with an insulating layer, so that the insulating layer (i.e., an inner insulating layer) of each of the conductors 82 is covered with the insulating layer (i.e., an outer insulating layer) of the bundle. The outer insulating layer is preferably designed to have an insulating ability greater than that of the inner insulating layer. Specifically, the thickness of the outer insulating layer is selected to be larger than that of the inner insulating layer. For instance, the outer insulating layer has a thickness of 100 μm, while the inner insulating layer has a thickness of 40 μm. Alternatively, the outer insulating layer may have a permittivity lower than that of the inner insulating layer. Each of the conductors 82 may have any of the above structure. Each wire is preferably made of a collection of conductive members or fibers.

As apparent from the above discussion, the rotating electrical machine 10 becomes useful in a high-voltage system of a vehicle by increasing the insulation ability of the outermost layer of the conductor 82. The above structure enables the rotating electrical machine 10 to be driven in low pressure conditions such as highlands.

Modification 14

Each of the conductors 82 equipped with a stack of a plurality of insulating layers may be designed to have at least one of a linear expansion coefficient and the degree of adhesion strength different between an outer one and an inner one of the insulating layers. The conductors 82 in this modification are illustrated in FIG. 55.

Figure 42:
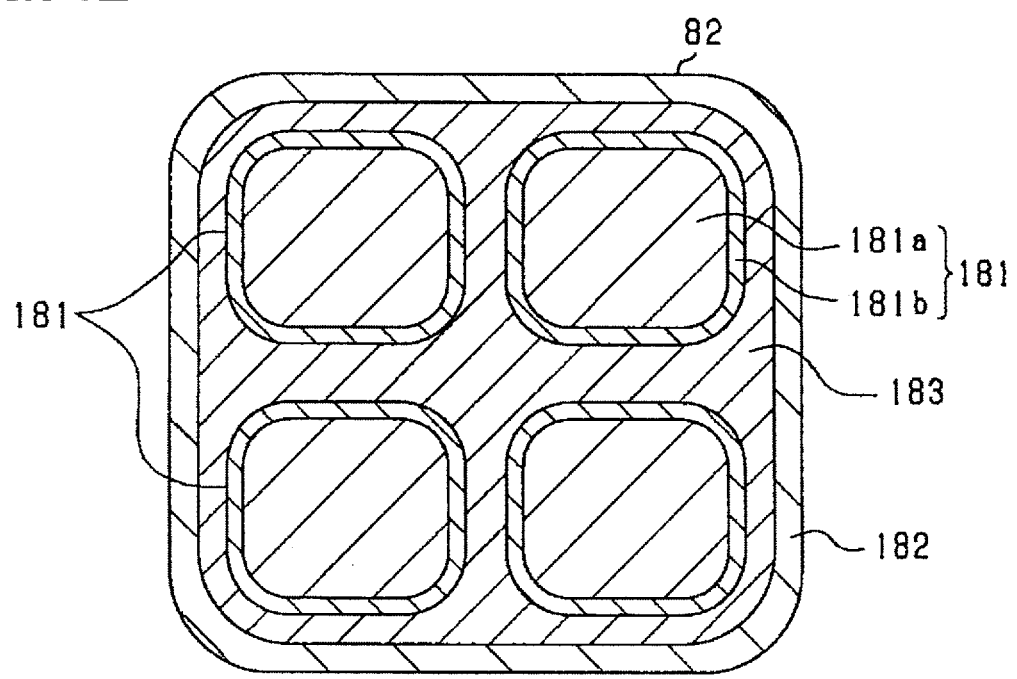
FIG. 42 is a sectional view which illustrates a structure of a conductor in a modification 14.

In FIG. 42, the conductor 82 includes a plurality of (four in the drawing) wires 181, the outer coated layer 182 (i.e., an outer insulating layer) with which the wires 181 are covered and which is made of, for example, resin, and the intermediate layer 183 (i.e., an intermediate insulating layer) which is disposed around each of the wires 181 within the outer coated layer 182. Each of the wires 181 includes the conductive portion 181*a* made of copper material and the conductor-coating layer (i.e., an inner insulating layer) made of electrical insulating material. The outer coated layer 182 serves to electrically insulate between phase-windings of the stator winding. Each of the wires 181 is preferably made of a collection of conductive members or fibers.

The intermediate layer 183 has a linear expansion coefficient higher than that of the coated layer 181*b*, but lower than that of the outer coated layer 182. In other words, the linear expansion coefficient of the conductor 82 is increased from an inner side to an outer side thereof. Typically, the outer coated layer 182 is designed to have a linear expansion coefficient higher than that of the coated layer 181*b*. The intermediate layer 183, as described above, has a linear expansion coefficient intermediate between those of the coated layer 181*b* and the outer coated layer 182 and thus serves as a cushion to eliminate a possibility that the inner and outer layers may be simultaneously broken.

Each of the wires 181 of the conductor 82 has the conductive portion 181*a* and the coated layer 181*b* adhered to the conductive portion 181*a*. The coated layer 181*b* and the intermediate layer 183 are also adhered together. The intermediate layer 183 and the outer coated layer 182 are adhered together. Such joints have a strength of adhesion decreasing toward an outer side of the conductor 82. In other words, the strength of adhesion between the conductive portion 181*a* and the coated layer 181*b* is lower than that between the coated layer 181*b* and the intermediate layer 183 and between the intermediate layer 183 and the outer coated layers 182. The strength of adhesion between the coated layer 181*b* and the intermediate layer 183 may be higher than or identical with that between the intermediate layer 183 and the outer coated layers 182. Usually, the strength of adhesion between, for example, two coated layers may be measured as a function of a tensile strength required to peel the coated layers away from each other. The strength of adhesion of the conductor 82 is selected in the above way to minimize the possibility that the inner and outer layers may be broken together arising from a temperature difference between inside and outside the conductor 82 when heated or cooled.

Usually, the heat generation or temperature change in the rotating electrical machine results in copper losses arising from heat from the conductive portion 181*a* of the wire 181 and from an iron core. These two types of loss result from the heat transmitted from the conductive portion 181*a* in the conductor 82 or from outside the conductor 82. The intermediate layer 183 does not have a heat source. The intermediate layer 183 has the strength of adhesion serving as a cushion for the coated layer 181*b* and the outer coated layer 182, thereby eliminating the possibility that the coated layer 181*b* and the outer coated layer 182 may be simultaneously broken. This enables the rotating electrical machine to be used in conditions, such as in vehicles, wherein a resistance to high pressure is required, or the temperature greatly changes.

In addition, the wire 181 may be made of enamel wire with a layer (i.e., the coated layer 181*b*) coated with resin, such as PA, PI or PAI. Similarly, the outer coated layer 182 outside the wire 181 is preferably made of PA, PI, and PAI and has a large thickness. This minimizes a risk of breakage of the outer coated layer 182 caused by a difference in linear expansion coefficient. Instead of use of PA, PI, PAI to make the outer coated layer 182 having a large thickness, material, such as PPS, PEEK, fluorine, polycarbonate, silicon, epoxy, polyethylene naphthalate, or LCP which has a dielectric permittivity lower than that of PI or PAI is preferably used to increase the conductor density of the rotating electrical machine. The use of such resin enhances the insulating ability of the outer coated layer 182 even when it has a thickness smaller than or equal to that of the coated layer 181*b* and increases the occupancy of the conductive portion. Usually, the above resin has the degree of electric permittivity higher than that of an insulating layer of enamel wire. Of course, there is an example where the state of formation or additive results in a decrease in electric permittivity thereof. Usually, PPS and PEEK is higher in linear expansion coefficient than an enamel-coated layer, but lower than another type of resin and thus is useful only for the outer of the two layers.

The strength of adhesion of the two types of coated layers arranged outside the wire 181 (i.e., the intermediate insulating layer and the outer insulating layer) to the enamel coated layer of the wire 181 is preferably lower than that between the copper wire and the enamel coated layer of the wire 181, thereby minimizing a possibility that the enamel coated layer and the above two types of coated layers are simultaneously broken.

In a case where the stator is equipped with a water cooling mechanism, a liquid cooling mechanism, or an air cooling mechanism, thermal stress or impact stress is thought of as being exerted first on the outer coated layers 182. The thermal stress or the impact stress is decreased by partially bonding the insulating layer of the wire 181 and the above two types of coated layers together even if the insulation layer is made of resin different from those of the above two types of coated layers. In other words, the above described insulating structure may be created by placing a wire (i.e., an enamel wire) and an air gap and also arranging fluorine, polycarbonate, silicon, epoxy, polyethylene naphthalate, or LCP. In this case, adhesive which is made from epoxy, low in electric permittivity, and also low in linear expansion coefficient is preferably used to bond the outer coated layer and the inner coated layer together. This eliminates breakage of the coated layers caused by friction arising from vibration of the conductive portion or breakage of the outer coated layer due to the difference in linear expansion coefficient as well as the mechanical strength.

The outermost layer which serves to ensure the mechanical strength or securement of the conductor 82 having the above structure is preferably made from resin material, such as epoxy, PPS, PEEK, or LCP which is easy to shape and similar in dielectric constant or linear expansion coefficient to the enamel coated layer, typically in a final process for a stator winding.

Typically, the resin potting is made using urethane or silicon. Such resin, however, has a linear expansion coefficient approximately twice that of other types of resin, thus leading to a possibility that thermal stress is generated when the resin is subjected to the resin potting, so that it is sheared. The above resin is, therefore, unsuitable for use where requirements for insulation are severe and 60V or more. The final insulation process to make the outermost layer using injection molding techniques with epoxy, PPS, PEEK, or LCP satisfies the above requirements.

Modification 15

The controller 110 according to this modification is configured to perform a control task that is different from control tasks described in the above embodiments or their modifications.

Figure 43:
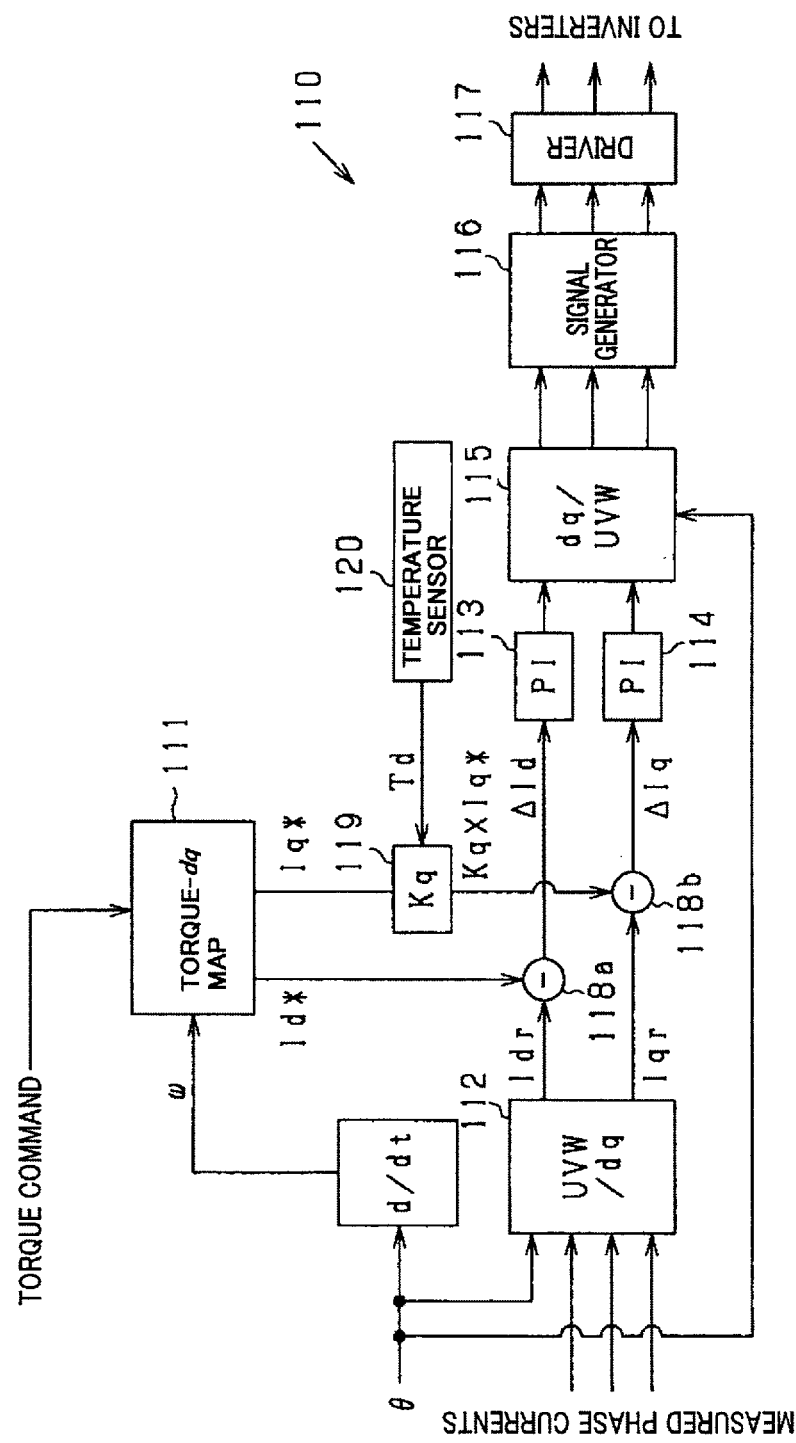
FIG. 43 is a functional block diagram which shows a current feedback control operation of a control device according to a modification 15.

FIG. 43 is a block diagram illustrating a control task carried out by the controller 110 according to this modification. This modification will describe the control task for the U, V, and W phases, but the control task for the X, Y, and Z-phases can be equivalent to the control task for the U, V, and W-phases. The control task carried out by the controller 110 according to this modification is similar to that carried out by the controller illustrated in FIG. 20. To components illustrated in FIG. 43, which are the same as components illustrated in FIG. 20, the same reference characters are assigned for the sake of simplicity.

The current command determiner 111, which serves as a command current determiner, determines values of d- and q-axis command currents Id* and Iq* in accordance with 1. A torque command value in the motor mode of the rotating electrical machine (which will also be referred to as a motor-mode torque command value) or a torque command value in the generator mode of the rotating electrical machine 10 (which will be referred to as a generator-mode torque command value)

2. An electrical angular velocity ω derived by differentiating an electrical angle θ with respect to time 3. The torque-dq map serving as requirement information The torque-dq map is map information including a relationship among values of the d-axis command current Id*, corresponding values of the q-axis command current Iq*, corresponding values of the electrical angular velocity ω, and corresponding torque command values.

The d-q converter 112 works to convert currents (i.e., three phase currents), as measured by the current sensors mounted for the respective phase windings, into a d-axis current Idr and a q-axis current Iqr using the electrical angular velocity ω.

A d-axis current deviation calculator 118a is configured to subtract, from the converted d-axis current Idr, the determined d-axis command current Id* to thereby calculate a d-axis current deviation ΔId.

The d-axis current feedback control device 113 determines a command voltage for the d-axis as a manipulated variable for feedback controlling the d-axis current deviation ΔId to zero.

A corrector 119 is configured to set a correction coefficient Kq. The correction coefficient Kq is a value larger than zero. The corrector 119 works to multiply, by the correction coefficient Kq, the q-axis command current Iq* determined by the current command determiner 111 to thereby correct the q-axis command current Iq*. How the corrector 119 works will be described in detail below.

A q-axis current deviation calculator 118b is configured to calculate the product of the correction coefficient Kq outputted from the corrector 119 and the q-axis command current Iq*, and subtract, from the converted d-axis current Idr, the product of the correction coefficient Kq and the q-axis command current Iq* to thereby calculate a q-axis current deviation Iq.

The q-axis current feedback control device 114 determines a command voltage for the q-axis as a manipulated variable for feedback controlling the q-axis current deviation ΔIq to zero.

The configuration of each of the three-phase converter 115, the operation signal generator 116, and the driver 117 is for example substantially the same as that of the corresponding one of the three-phase converter 115, the operation signal generator 116, and the driver 117 illustrated in FIG. 20. The driver 117 therefore works to perform on-off switching operations of each of the switches in an inverter 600.

The corrector 119 is configured to variably set a value of the correction coefficient Kq as a function of a temperature measured by a temperature sensor 120. The temperature sensor 120 according to this modification is mounted to one of the coil ends 54 and 55 of the stator 50. For example, a thermistor can be used as the temperature sensor 120. A temperature value Td measured by the temperature sensor 120 represents temperature information correlating with the temperature of the magnet unit 42.

Figure 44:
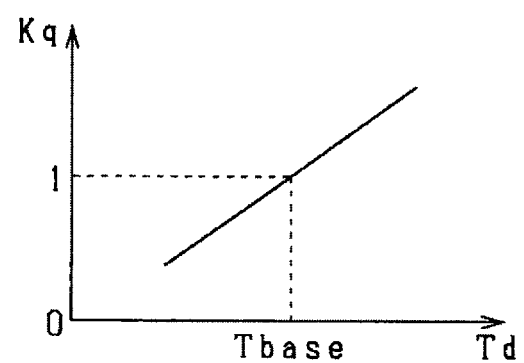
FIG. 44 is a graph illustrating how to set a correction coefficient in the modification 15.

The corrector 119, as illustrated in FIG. 44, is configured to set the correction coefficient Kq to 1 upon the temperature value Td becoming a base temperature Tbase of, for example, 20° C. The base temperature Tbase can be stored in, for example, a memory of the controller 110 during a manufacturing process of the rotating electrical machine.

The corrector 119 is configured to set the correction coefficient Kq to a higher value as the temperature value Td becomes higher upon the temperature value Td being higher than the base temperature Tbase. The corrector 119 is also configured to set the correction coefficient Kq to a lower value as the temperature value Td becomes lower upon the temperature value Td being lower than the base temperature Tbase.

Next, the following describes a reason why the corrector 119 is provided.

The stator 50 of this modification has the slot-less configuration that has been described in accordance with, for example, FIGS. 10 and 25 to 29. This slot-less structure of the stator 50, which has no teeth or has no components serving as teeth, enables the waveform of magnetic flux that actually interlinks to the armature windings to become close to the waveform of magnetic flux generated from the magnet unit 42.

The magnet unit 42 has characteristics of magnetic flux, more specifically magnetic density, which decreases as the temperature of the magnet unit increases. For example, an increase in the temperature of the magnet unit 42 by 1 K results in the magnetic flux from the magnet unit 42 being changed by 0.12%. Because a stator, which is equipped with teeth or components serving as teeth, results in the waveform of magnetic flux being greatly distorted, change in the magnetic flux due to change in the temperature of the magnet unit 42 has small influence on torque of the rotating electrical machine 10.

In contrast, the stator 50, which has a slot-less structure, is configured such that the waveform of magnetic flux has only small distortion. For this reason, change in the magnetic flux due to change in the temperature of the magnet unit 42 has large influence on torque of the rotating electrical machine 10.

This modification is configured to set the q-axis command current Iq* in accordance with the torque-dq map and the torque command value. A change in the magnetic flux of the magnet unit 42 due to temperature change of the magnet unit 42 may cause a value of the q-axis command current Iq*, which is required to match actual output torque with the torque command value, to be deviated from a setting value of the q-axis command current Iq*, which correlates, in the torque-dq map, with the torque command value. This may result in actual value of torque being deviated from the torque command value even if the q-axis current Iqr is adjusted to the value of the q-axis command current Iq*.

From this viewpoint, the corrector 119 is configured to set the correction coefficient Kq to a value that satisfies the correlation illustrated in FIG. 44 to thereby restrict or suppress temperature change in the magnet unit 42 from having an influence on the relationship bet correcting the value of the q-axis command current determined by the command current determiner to thereby restrict temperature change in the magnet unit from having an influence on the relationship between the command values for the controlled variable and the corresponding values of the q-axis command current.

This modification can be implemented by the following configurations.

The requirement information is not limited to the torque-dq map. For example, mathematical formula information can be used as the requirement information; the mathematical formula information represents that values of the q-axis command current Iq* are defined to correlate with corresponding torque command values and corresponding values of the electrical angular velocity co.

The controlled variable is not limited to torque. For example, the rotational speed of the rotor can be used as the controlled variable. For example, in this modification, the torque command can be determined based on a deviation between a command rotational speed as the command value and an actual rotational speed, and the determined torque command value can be used for setting of the q-axis command current Iq*.

Modification 16

The controller 110 according to this modification is configured to perform a control task that is partially different from the control task described in the modification 16.

Figure 45:
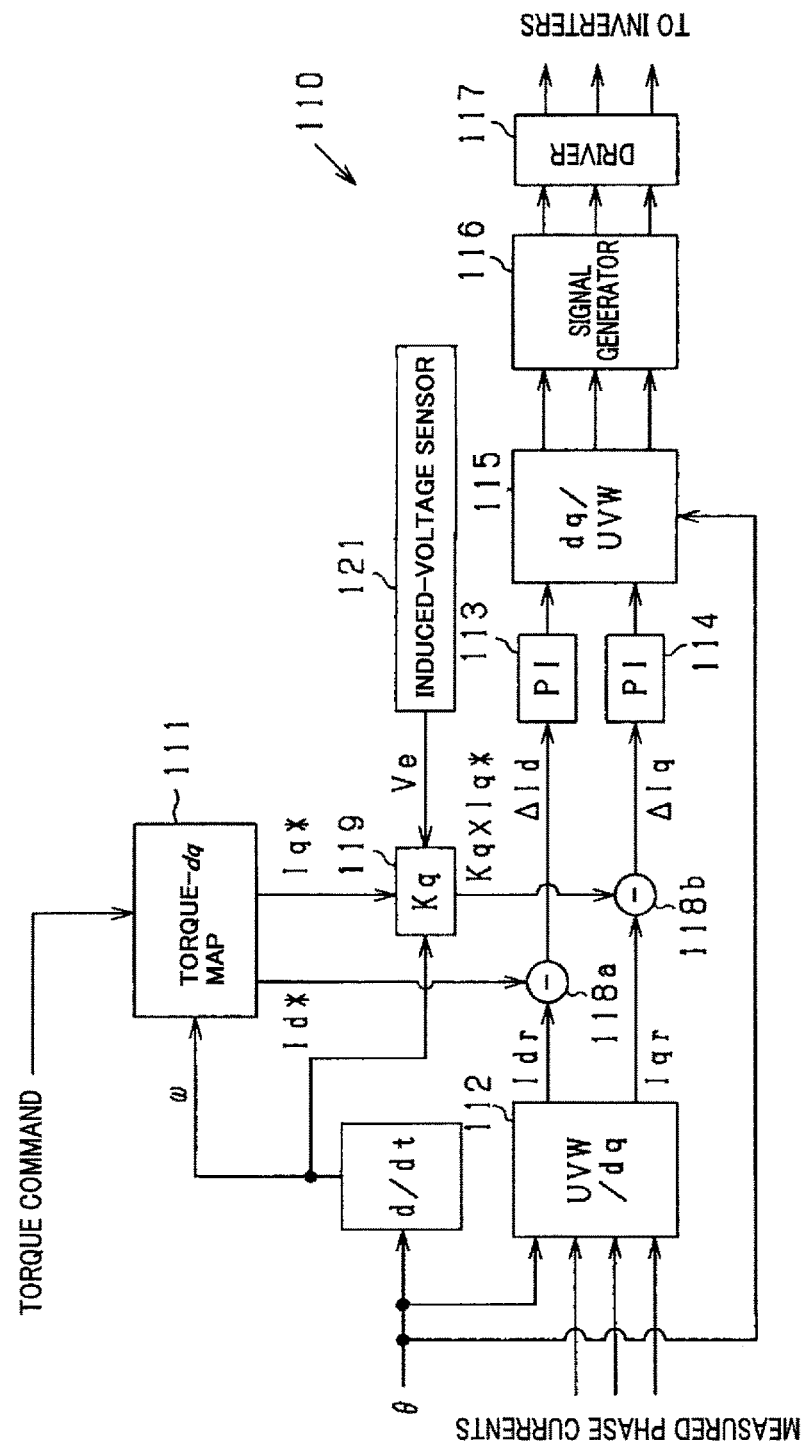
FIG. 45 is a functional block diagram which shows a current feedback control operation of a control device according to a modification 16.

FIG. 45 is a block diagram illustrating a control task carried out by the controller 110 according to this modification. This modification will describe the control task for the U, V, and W phases, but the control task for the X, Y, and Z-phases can be equivalent to the control task for the U, V, and W-phases. The control task carried out by the controller 110 according to this modification is similar to that carried out by the controller illustrated in FIG. 43. To components illustrated in FIG. 45, which are the same as components illustrated in FIG. 43, the same reference characters are assigned for the sake of simplicity.

The corrector 119 is configured to variably set a value of the correction coefficient Kq in accordance with an induced voltage Ve measured by an induced-voltage sensor 121 and the angular velocity ω. The induced-voltage sensor 121 is for example configured to measure a terminal voltage across the stator coil 51 for a period during which no electrical power is supplied to the stator coil 51, thus measuring a voltage induced in at least one phase winding as the induced voltage.

Next, the following describes the reason why the induced voltage Ve and the electrical angular velocity ω can be used in place of the temperature value Td.

A root-mean-square value of the induced voltage Ve can be expressed as a product of a root-mean-square value of the magnetic flux of the magnet unit 42 and the electrical angular velocity ω. The rotating electrical machine can be therefore designed based on a predetermined estimated value of the magnetic flux as the root-mean-square value of the magnetic flux of the magnet unit 42. In this case, a root-mean-square value of the induced voltage corresponding to a value of the electrical angular velocity ω is determined to correlate with the estimated value of the magnetic flux.

A change in the magnetic flux of the magnet unit 42 due to its temperature change may cause a relationship between a root-mean-square value of the induced voltage and a corresponding value of the electrical angular velocity ω for an estimated root-mean-square value of the magnetic flux to be deviated from an estimated relationship therebetween. This deviation will be used as a deviation of the root-mean-square value of the magnetic flux. For this reason, this modification creates map information in which values of the correction coefficient Kq correlating with corresponding values of the induced voltage Ve and corresponding values of the electrical angular velocity ω to thereby reduce an influence of change of the magnetic flux due to temperature change of the magnet unit 42 on torque of the rotating electrical machine 10. This map information is stored in the memory of the controller 110.

The corrector 119 is configured to variably set a value of the correction coefficient Kq in accordance with the root-mean-square value of the induced voltage Ve, a value of the electrical angular velocity ω, and the map information.

As described above, this modification makes it possible to reduce an influence of a change in the magnetic flux due to temperature change of the magnet unit 42 on torque of the rotating electrical machine 10 without using temperature information about the magnet unit 42. This maintains the influence to be smaller even if, for example, there is a gap between the actual temperature of the magnet unit 42 and the temperature value Td measured by the temperature sensor 120.

Modification 17

This modification describes a specific example to which the rotating electrical machine described in each of the modifications 15 and 16.

Figure 46:
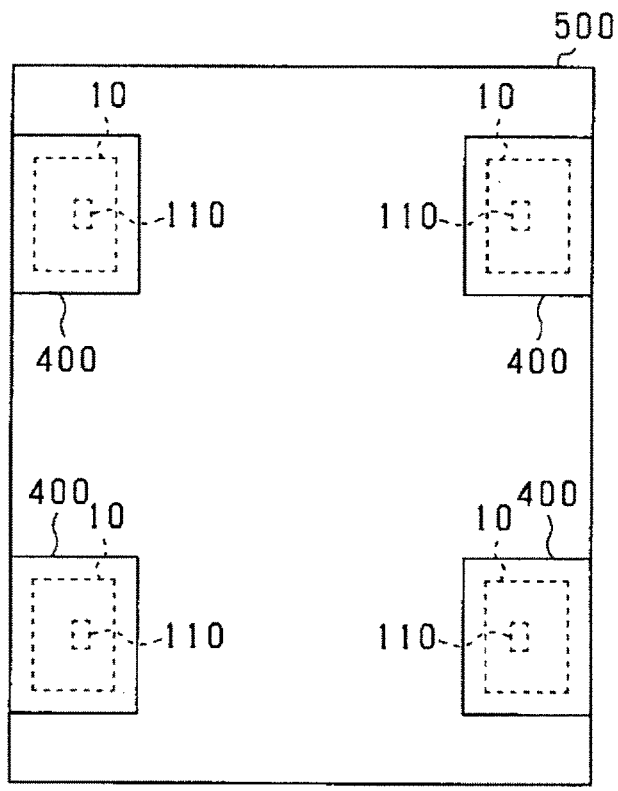
FIG. 46 is a structural view illustrating a vehicle according to a modification 17.

FIG. 46 illustrates an example where the rotating electrical machines are applied to a vehicle 500 equipped with a plurality of driving wheels 400. Each rotating electrical machine 10 serves as a power source for rotating the corresponding one of the driving wheels 400. FIG. 46 specifically illustrates two front wheels and two rear wheels as the driving wheels 400. The rotating electrical machines 10 are individually provided for the respective driving wheels 400. The controllers 110 are individually installed in the respective rotating electrical machines 10.

Values of the temperatures of the magnet units 42 of the respective rotating electrical machines 10 may become different from each other depending on a difference among the operating conditions of the respective rotating electrical machines 10 and/or a difference among the ambient temperatures around the respective rotating electrical machines 10.

Uniformly correcting the q-axis command currents Iq* of the respective rotating electrical machines 10 based on the temperature value Td measured by any one of the temperature sensors 102 of the rotating electrical machines 10 might result in unsuitable correction of the q-axis command current Iq*in at least one of the rotating electrical machines 10.

From this viewpoint, the controllers 110 of this modification are individually provided for the respective rotating electrical machines 10. This enables each controller 110 to appropriately correct the q-axis command current Iq* for the corresponding electrical rotating machine 10 as a control target in accordance with the temperature information about the magnet unit 42 of the corresponding rotating electrical machine 10. This therefore makes it possible to appropriately perform traveling control of the vehicle 500.

This modification can be implemented by the following configurations.

One rotating electrical machine 10 can be used as a common power source for rotating two driving wheels, such as two rear wheels, in the driving wheels 400 illustrated in FIG. 46.

Each rotating electrical machine 10 used in this modification can have not only the slot-less structure, but have teeth or components serving as teeth.

Modification 18

This modification describes a specific example to which the rotating electrical machine described in each of the modifications 16 and 17.

Figure 47:
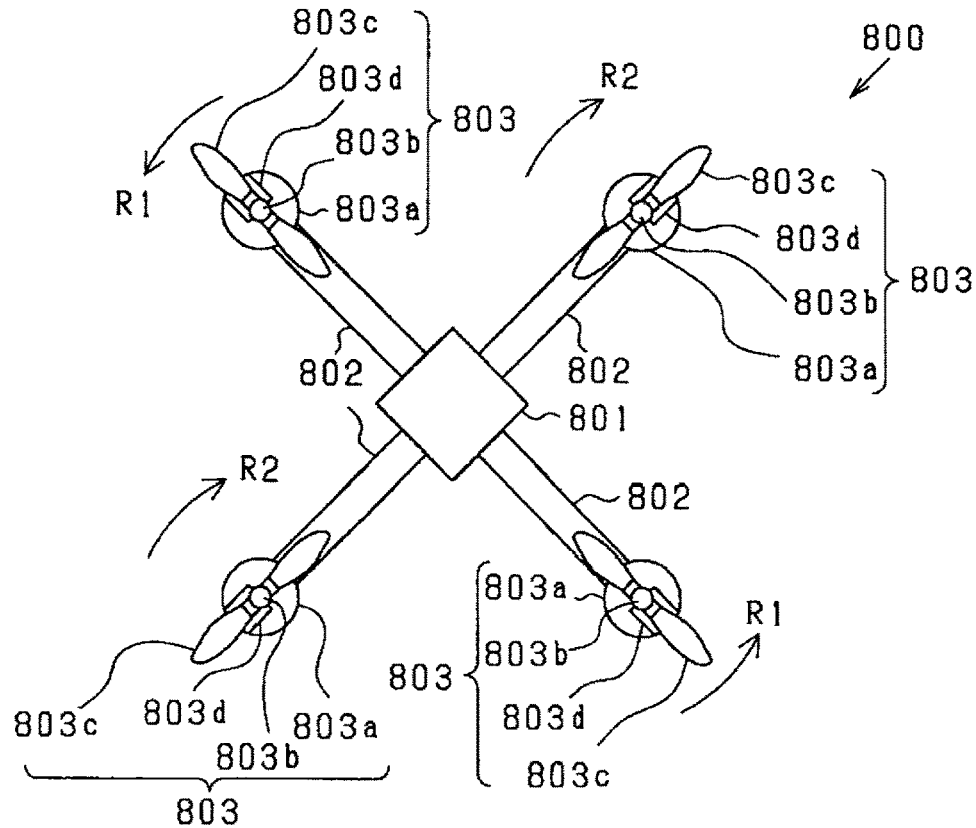
FIG. 47 is a first structural view illustrating an aerial vehicle according to a modification 18.
Figure 48:
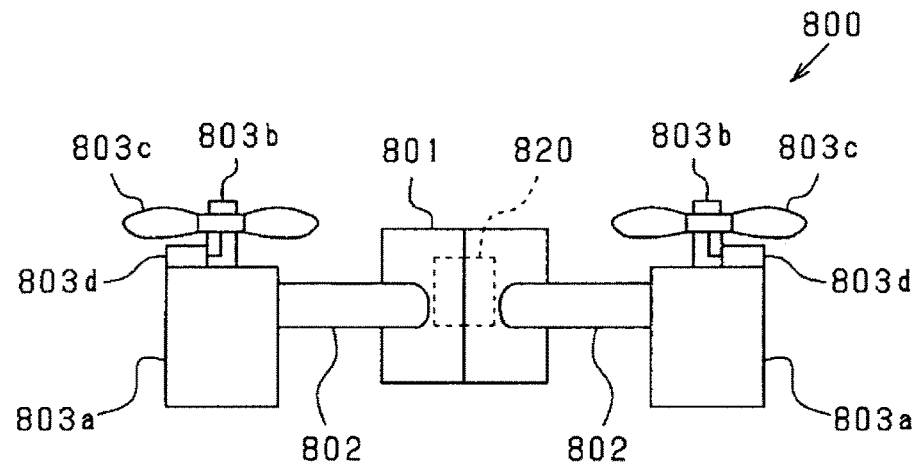
FIG. 48 is a second structural view illustrating an aerial vehicle according to the modification 18.

As illustrated in FIGS. 47 and 48, the rotating electrical machine can be applied to an aerial vehicle 800. The rotating electrical machine serves as a power source for flying the aerial vehicle 800.

The aerial vehicle 800 includes a vehicle body 801, arms 802, and thrusters 803. The vehicle body 801 is located at the center of gravity of the aerial vehicle 800. The arms 802 are configured to extend, from the vehicle body 801, radially and outwardly. The thrusters 803 provided for the respective arms 802 are mounted to respective tip ends of the arms 802. The arms 802, which are four, extend symmetrically from the vehicle body 801. The four arms 802 of this modification are respectively equipped with the four thrusters 803.

Each thruster 803 includes a motor 803a, a drive shaft member 803b, a propeller 803c, and a pitch change mechanism 803d.

The motor 803a of each thruster 803 serves as a rotating electrical machine and as a power source for driving the corresponding propeller 803c.

The drive shaft member 803b of each thruster 803 is configured to transfer rotation of the corresponding motor 803a to the corresponding propeller 803c.

The propeller 803c of each thruster 803 extends in a radially outward direction from the corresponding drive shaft member 803b.

The thrusters 803 include a first pair of thrusters 803 and a second pair of thrusters 803. The thrusters 803 of the first pair are symmetrically disposed to each other across the vehicle body 801, and the thrusters 803 of the second pair are also symmetrically disposed to each other across the vehicle body 801.

The propeller 803c of one of the thrusters 803 of the first pair has a predetermined rotational direction, which will be referred to as a first rotational direction R1, and the propeller 803c of the other of the thrusters 803 of the first pair has the same first rotational direction.

Similarly, the propeller 803c of one of the thrusters 803 of the second pair has a predetermined rotational direction, which will be referred to as a second rotational direction R2, and the propeller 803c of the other of the thrusters 803 of the second pair has the same second rotational direction.

The first rotational direction R1 and the second rotational direction R2 are determined to be opposite to each other.

The propeller 803c of each thruster 803 has a variable angle of pitch, and the pitch change mechanism 803d of each thruster 803 is configured to change the angle of pitch of the propeller 803c between a first angle of pitch and a second angle of pitch inclusive; the first angle of pitch of the propeller 803c causes the propeller 803c to generate upper thrust force, and the second angle of pitch of the propeller 803c causes the propeller 803c to generate lower thrust force.

Figure 49:
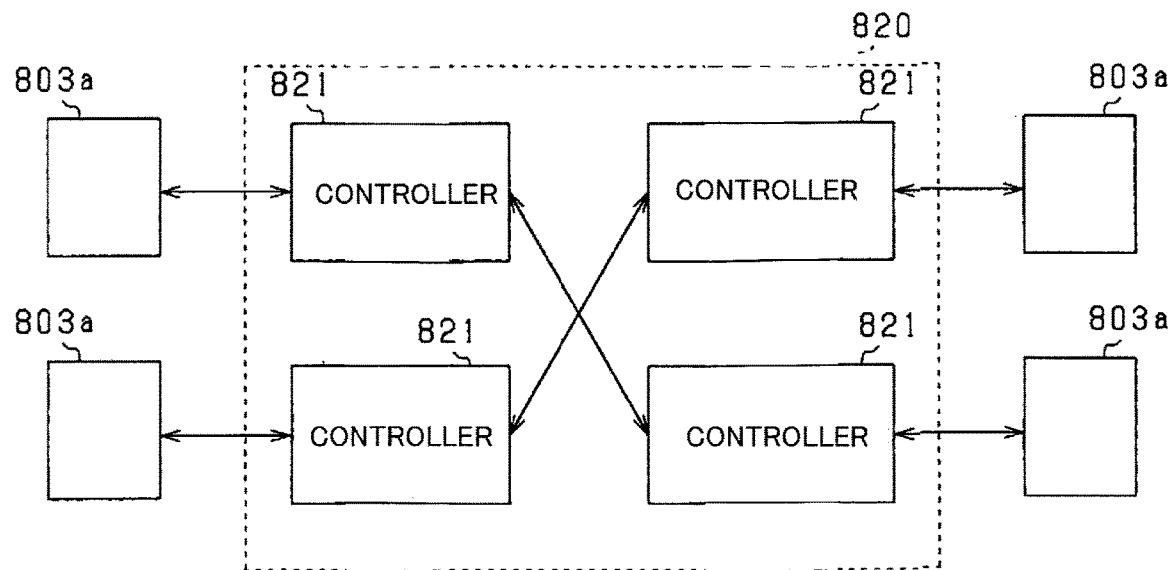
FIG. 49 is a block diagram schematically illustrating how controllers are arranged according to the modification 18.

The aerial vehicle 800 includes a control unit 820. The control unit 820 is installed in the vehicle body 801. The control unit 820, as illustrated in FIG. 49, is comprised of controllers 821 provided for the respective motors 803a. Each controller 821 has the same structure as that of the controller illustrated in FIG. 43 or 45. The controllers 821 are capable of communicating with one another.

Like the modification 17, values of the temperatures of the magnet units of the respective motors 803a may become different from each other depending on a difference among the operating conditions of the respective motors 803a and/or a difference among the ambient temperatures around the respective motors 803a.

Uniformly correcting the q-axis command currents Iq* of the respective motors 803a based on the temperature value Td measured by any one of the temperature sensors of the motors 803a might result in unsuitable correction of the q-axis command current Iq* in at least one of the motors 803a. This might result in the attitude of the aerial vehicle 800 becoming instable. For example, when the absolute torque command values for the respective four motors 803a are set to be equal to one another, this might result in the absolute value of actual torque of one of the motors 803a being different from the absolute value of actual torque of another one of the motors 803a. This might result in the attitude of the aerial vehicle 800 being instable.

From this viewpoint, the controllers 821 of this modification are individually provided for the respective motors 803a. This enables each controller 821 to appropriately correct the q-axis command current Iq* for the corresponding electrical motor 803a as a control target in accordance with the temperature information about the magnet unit of the corresponding motor 803a. This therefore makes it possible to appropriately perform control of the attitude of the aerial vehicle 800.

This modification can be implemented by the following configurations.

Each motor used in this modification can have not only the slot-less structure, but have teeth or components serving as teeth.

Other modifications will be listed below.

The distance DM between a surface of the magnet unit 42 which faces the armature and the axial center of the rotor in the radial direction may be selected to be 50 mm or more. For instance, the distance DM, as illustrated in FIG. 4, between the radial inner surface of the magnet unit 42 (i.e., the first and second magnets 91 and 92) and the center of the axis of the rotor 40 may be selected to be 50 mm or more.

The small-sized slot-less structure of the rotating electrical machine whose output is several tens or hundreds watt is known which is used for models. The disclosers or inventors of this application have not seen examples where the slot-less structure is used with large-sized industrial rotating electrical machines whose output is more than 10 kW. The disclosers or inventors have studied the reason for this.

Modern major rotating electrical machines are categorized into four main types: a brush motor, a squirrel-cage induction motor, a permanent magnet synchronous motor, a reluctance motor.

Brush motors are supplied with exciting current using brushes. Large-sized brush motors, therefore, have an increased size of brushes, thereby resulting in complex maintenance thereof. With the remarkable development of semiconductor technology, brushless motors, such as induction motors, have been used instead. In the field of small-sized motors, a large number of coreless motors have also come on the market in terms of low inertia or economic efficiency.

Squirrel-cage induction motors operate on the principle that a magnetic field produced by a primary stator winding is received by a secondary stator core to deliver induced current to bracket-type conductors, thereby creating magnetic reaction field to generate torque. In terms of small-size and high-efficiency of the motors, it is inadvisable that the stator and the rotor be designed not to have iron cores.

Reluctance motors are motors designed to use a change in reluctance in an iron core. It is, thus, inadvisable that the iron core be omitted in principle.

In recent years, permanent magnet synchronous motors have used an IPM (Interior Permanent Magnet) rotor. Especially, most large-sized motors use an IPM rotor unless there are special circumstances.

IPM motors has properties of producing both magnet torque and reluctance torque. The ratio between the magnet torque and the reluctance torque is timely controlled using an inverter. For these reasons, the IMP motors are thought of as being compact and excellent in ability to be controlled.

According to analysis by the disclosers or inventors, torque on the surface of a rotor producing the magnet torque and the reluctance torque is expressed in FIG. 50 as a function of the distance DM between the surface of the magnet unit which faces the armature and the center of the axis of the rotor, that is, the radius of a stator core of a typical inner rotor indicated on the horizontal axis.

The potential of the magnet torque, as can be seen in the following equation (eq1), depends upon the strength of magnetic field created by a permanent magnet, while the potential of the reluctance torque, as can be seen in the following equation (eq2), depends upon the degree of inductance, especially, on the q-axis.

$$\text{The magnet torque} = k \cdot \Psi \cdot Iq \quad (\text{eq1})$$

$$\text{The reluctance torque} = k \cdot (Lq - Ld) \cdot Iq \cdot Id \quad (\text{eq2})$$

Comparison between the strength of magnetic field produced by the permanent magnet and the degree of inductance of a winding using the distance DM shows that the strength of magnetic field created by the permanent magnet, that is, the amount of magnetic flux ψ is proportional to a total area of a surface of the permanent magnet which faces the stator. In case of a cylindrical stator, such a total area is a cylindrical surface area of the permanent magnet. Technically speaking, the permanent magnet has an N-pole and an S-pole, and the amount of magnetic flux W is proportional to half the cylindrical surface area. The cylindrical surface area is proportional to the radius of the cylindrical surface and the length of the cylindrical surface. When the length of the cylindrical surface is constant, the cylindrical surface area is proportional to the radius of the cylindrical surface.

The inductance Lq of the winding depends upon the shape of the iron core, but its sensitivity is low and rather proportional to the square of the number of turns of the stator winding, so that it is strongly dependent upon the number of the turns. The inductance L is expressed by a relation of $L = \mu \cdot N^2 \times S / \delta$ where μ is permeability of a magnetic circuit, N is the number of turns, S is a sectional area of the magnetic circuit, and δ is an effective length of the magnetic circuit. The number of turns of the winding depends upon the size of space occupied by the winding. In the case of a cylindrical motor, the number of turns, therefore, depends upon the size of space occupied by the winding of the stator, in other words, areas of slots in the stator. The slot is, as demonstrated in FIG. 51, rectangular, so that the area of the slot is proportional to the product of a and b where a is the width of the slot in the circumferential direction, and b is the length of the slot in the radial direction.

The width of the slot in the circumferential direction becomes large with an increase in diameter of the cylinder, so that the width is proportional to the diameter of the cylinder. The length of the slot in the radial direction is proportional to the diameter of the cylinder. The area of the slot is, therefore, proportional to the square of the diameter of the cylinder. It is apparent from the above equation (eq2) that the reluctance torque is proportional to the square of current in the stator. The performance of the rotating electrical machine, therefore, depends upon how much current is enabled to flow in the rotating electrical machine, that is, depends upon the areas of the slots in the stator. The reluctance is, therefore, proportional to the square of the diameter of the cylinder for a cylinder of constant length. Based on this fact, a relation of the magnetic torque and the reluctance torque with the distance DM is shown by plots in FIG. 50.

The magnet torque is, as shown in FIG. 50, increased linearly as a function of the distance DM, while the reluctance torque is increased in the form of a quadratic function as a function of the distance DM. FIG. 50 shows that when the distance DM is small, the magnetic torque is dominant, while the reluctance torque becomes dominant with an increase in diameter of the stator core. The disclosers or inventors of this application have arrived at the conclusion that an intersection of lines expressing the magnetic torque and the reluctance torque in FIG. 50 lies near 50 mm that is the radius of the stator core. It seems that it is difficult for a motor whose output is 10 kW and whose stator core has a radius much larger than 50 mm to omit the stator core because the use of the reluctance torque is now mainstream. This is one of reasons why the slot-less structure is not used in large-sized motors.

The rotating electrical machine using an iron core in the stator always faces a problem associated with the magnetic saturation of the iron core. Particularly, radial gap type rotating electrical machines has a longitudinal section of the rotating shaft which is of a fan shape for each magnetic pole, so that the further inside the rotating electrical machine, the smaller the width of a magnetic circuit, so that inner dimensions of teeth forming slots in the core become a factor of the limit of performance of the rotating electrical machine. Even if a high performance permanent magnet is used, generation of magnetic saturation in the permanent magnet will lead to a difficulty in producing a required degree of performance of the permanent magnet. It is necessary to design the permanent magnet to have an increased inner diameter in order to eliminate a risk of generation of the magnetic saturation, which results in an increase size of the rotating electrical machine.

For instance, a typical rotating electrical machine with a distributed three-phase winding is designed so that three to six teeth serve to produce a flow of magnetic flux for each magnetic pole, but encounters a possibility that the magnetic flux may concentrate on a leading one of the teeth in the circumferential direction, thereby causing the magnetic flux not to flow uniformly in the three to six teeth. For instance, the flow of magnetic flux concentrates on one or two of the teeth, so that the one or two of the teeth in which the magnetic saturation is occurring will move in the circumferential direction with rotation of the rotor, which may lead to a factor causing the slot ripple.

For the above reasons, it is required to omit the teeth in the slot-less structure of the rotating electrical machine whose distance DM is 50 mm or more to eliminate the risk of generation of the magnetic saturation. The omission of the teeth, however, results in an increase in magnetic resistance in magnetic circuits of the rotor and the stator, thereby decreasing torque produced by the rotating electrical machine. The reason for such an increase in magnetic resistance is that there is, for example, a large air gap between the rotor and the stator. The slot-less structure of the rotating electrical machine whose distance DM is 50 mm or more, therefore, has room for improvement for increasing the output torque. There are numerous beneficial advantages to use the above torque-increasing structure in the slot-less structure of rotating electrical machines whose distance DM is 50 mm or more.

Not only the outer rotor type rotating electrical machines, but also the inner rotor type rotating electrical machines are preferably designed to have the distance DM of 50 mm or more between the surface of the magnet unit which faces the armature and the center of the axis of the rotor in the radial direction.

The stator coil 51 of the rotating electrical machine 10 may be designed to have only the single straight section 83 of the conductor 82 arranged in the radial direction. Alternatively, a plurality of straight sections 83, for example, three, four, five, or six straight sections 83 may be stacked on each other in the radial direction.

For example, the structure illustrated in FIG. 2 has the rotating shaft 11 extending outside the ends of length of the rotating electrical machine 10, but however, may alternatively be designed to have the rotating shaft 11 protruding outside only one of the ends of the rotating electrical machine 10. In this case, it is advisable that a portion of the rotating shaft 11 which is retained by the bearing unit 20 in the cantilever form be located on one of the ends of the rotating electrical machine, and that the rotating shaft 11 protrude outside such an end of the rotating electrical machine. This structure has the rotating shaft 11 not protruding inside the inverter unit 60, thus enabling a wide inner space of the inverter unit 60, i.e., the cylinder 71 to be used.

The above structure of the rotating electrical machine 10 uses non-conductive grease in the bearings 21 and 22, but however, may alternatively be designed to have conductive grease in the bearings 21 and 22. For instance, conductive grease containing metallic particles or carbon particles may be used.

A bearing or bearings may be mounted on only one or both axial ends of the rotor 40 for retaining the rotating shaft 11 to be rotatable. For example, the structure of FIG. 1 may have a bearing or bearings mounted on only one side or opposite sides of the inverter unit 60 in the axial direction.

The magnet holder 41 of the rotor 40 of the rotating electrical machine 10 has the intermediate portion 45 equipped with the inner shoulder 49a and the annular outer shoulder 49b, however, the magnet holder 41 may alternatively be designed to have the flat intermediate portion 45 without the shoulders 49a and 49b.

The conductor body 82a of each of the conductors 82 of the stator coil 51 of the rotating electrical machine 10 is made of a collection of the wires 86, however, may alternatively be formed using a square conductor having a rectangular cross section. The conductor 82 may alternatively be made using a circular conductor having a circular cross section or an oval cross section.

The rotating electrical machine 10 has the inverter unit 60 arranged radially inside the stator 50, but however, may alternatively be designed not to have the inverter 60 disposed inside the stator 50. This enables the stator 50 to have a radial inner void space in which parts other than the inverter unit 60 may be mounted.

The rotating electrical machine 10 may be designed not to have the housing 30. In this case, the rotor 40 or the stator 50 may be retained by a wheel or another part of a vehicle.

While illustrative embodiments of the present disclosure have been described herein, the present disclosure is not limited to the embodiments described herein, but includes any and all embodiments having modifications, omissions, combinations (e.g., of aspects across various embodiments), adaptations and/or alternations as would be appreciated by those in the art based on the present disclosure. The limitations in the claims are to be interpreted broadly based on the language employed in the claims and not limited to examples described in the present specification or during the prosecution of the application, which examples are to be construed as non-exclusive.

The invention claimed is:

1. A rotating electrical machine comprising:
   a field generator that includes a magnet unit, the magnet unit having a plurality of magnetic poles whose polarities are alternately arranged in a circumferential direction;
   an armature that includes a multi-phase armature winding member, one of the field generator and the armature serving as a rotor of the rotating electrical machine, the armature winding member including a plurality of conductive members that face the armature and are arrayed at given intervals away from each other in the circumferential direction;
   a power converter electrically connected to the armature winding member; and
   a processor configured to:
   control the power converter to thereby adjust a q-axis current flowing through the armature winding member to a q-axis command current;
   determine a value of the q-axis command current in accordance with requirement information and an input command value for a controlled variable of the rotating electrical machine, the requirement information including a relationship between values of the q-axis command current and corresponding command values for the controlled variable;
   perform a task of correcting the determined value of the q-axis command current to thereby restrict temperature change in the magnet unit from having an influence on the relationship between the command values for the controlled variable and the corresponding values of the q-axis command current; and
   control the power converter to thereby adjust a value of the q-axis current flowing through the armature winding member to the corrected value of the q-axis command current, wherein the armature has any one of a first configuration and a second configuration, the first configuration has conductor-to-conductor members, each of the conductor-to-conductor members being disposed between a corresponding adjacent pair of the conductive members of the armature winding member, the second configuration has no conductor-to-conductor member between each adjacent pair of the conductive members of the armature winding member, each of the conductor-to-conductor members are made of any one of a magnetic material and a non-magnetic material, and the magnetic material satisfies the following relation:

$$Wt \times Bs \leq Wm \times Br$$

where:
Wt represents a total circumferential width of one or more of the conductor-to-conductor members lying within a range of one of the magnetic poles of the magnet unit;
Bs represents a saturation magnetic flux density of the conductor-to-conductor members;
Wm represents a circumferential width of a portion of the magnet unit equivalent to one of the magnetic poles of the magnet unit; and
Br represents the remanent flux density of the magnet unit.

2. A rotating electrical machine system comprising:
a plurality of the rotating electrical machines of claim 1, each of the rotating electrical machines being applied to a vehicle equipped with a plurality of driving wheels, the rotating electrical machines being respectively provided for at least two driving wheels in the plurality of driving wheels, each of the rotating electrical machines serving as a power source for rotating the corresponding one of the at least two driving wheels,
wherein the plurality of the processors are individually provided for the respective rotating electrical machines.

3. The rotating electrical machine system according to claim 2, wherein the plurality of processors are programmed to:
obtain information about a temperature of the corresponding magnet unit; and
perform, as the task of correcting the value of the q-axis command current, a task of correcting the value of the q-axis command current in accordance with the obtained temperature information.

4. The rotating electrical machine system according to claim 2, wherein the plurality of processors are configured to:
obtain an electrical angular velocity of the corresponding one of the rotating electrical machines;
obtain information about a voltage induced in the corresponding armature winding member; and
perform, as the task of correcting the value of the q-axis command current, a task of correcting the value of the q-axis command current in accordance with the obtained electrical angular velocity and the information about the induced voltage.

5. A rotating electrical machine system comprising:
a plurality of rotating electrical machines of claim 1, each of the rotating electrical machines being applied to an aerial vehicle, the rotating electrical machines serving as a power source for flying the aerial vehicle, the aerial vehicle comprising:
a vehicle body; and
a plurality of thrusters mounted to the vehicle body, each of the thrusters including a propeller,
wherein:
the rotating electrical machines are respectively provided for the propellers; and
the plurality of the processors are individually provided for the respective rotating electrical machines.

6. The rotating electrical machine system according to claim 5, wherein the plurality of processors are programmed to:
obtain information about a temperature of the corresponding magnet unit; and
perform, as the task of correcting the value of the q-axis command current, a task of correcting the value of the q-axis command current in accordance with the obtained temperature information.

7. The rotating electrical machine system according to claim 5, wherein the plurality of processors are configured to:
obtain an electrical angular velocity of the corresponding one of the rotating electrical machines;
obtain information about a voltage induced in the corresponding armature winding member; and
perform, as the task of correcting the value of the q-axis command current, a task of correcting the value of the q-axis command current in accordance with the obtained electrical angular velocity and the information about the induced voltage.

8. The rotating electrical machine according to claim 1, wherein the processor is configured to:
obtain information about a temperature of the magnet unit; and
perform, as the task of correcting the value of the q-axis command current, a task of correcting the value of the q-axis command current in accordance with the obtained temperature information.

9. The rotating electrical machine according to claim 8, wherein the processor is configured to:
obtain an electrical angular velocity of the rotating electrical machine;
obtain information about a voltage induced in the armature winding member; and
perform, as the task of correcting the value of the q-axis command current, a task of correcting the value of the q-axis command current in accordance with the obtained electrical angular velocity and the information about the induced voltage.

10. The rotating electrical machine according to claim 1, wherein the processor is configured to:
obtain an electrical angular velocity of the rotating electrical machine;
obtain information about a voltage induced in the armature winding member; and
perform, as the task of correcting the value of the q-axis command current, a task of correcting the value of the q-axis command current in accordance with the obtained electrical angular velocity and the information about the induced voltage.

11. A rotating electrical machine system comprising:
a plurality of rotating electrical machines, each of the rotating electrical machines being applied to a vehicle equipped with a plurality of driving wheels, the rotating electrical machines being respectively provided for at least two driving wheels in the plurality of driving wheels, each of the rotating electrical machines serving as a power source for rotating the corresponding one of the at least two driving wheels, each of the rotating electrical machines comprising:
a field generator that includes a magnet unit, the magnet unit having a plurality of magnetic poles whose polarities are alternately arranged in a circumferential direction;
an armature that includes a multi-phase armature winding member, one of the field generator and the armature serving as a rotor of the rotating electrical machine, the armature including conductor-to-conductor members that are made of any one of a magnetic material and a non-magnetic material; and
a power converter electrically connected to the armature winding member; and
a plurality of processors individually provided for the respective rotating electrical machines, the plurality of processors being each configured to:
control the respective power converter to thereby adjust a q-axis current flowing through the armature winding member to a q-axis command current;
determine a value of the q-axis command current in accordance with requirement information and an input command value for a controlled variable of the corresponding rotating electrical machine, the requirement information including a relationship between values of the q-axis command current and corresponding command values for the controlled variable;
perform a task of correcting the determined value of the q-axis command current to thereby restrict temperature change in the corresponding magnet unit from having an influence on the relationship between the command values for the controlled variable and the corresponding values of the q-axis command current; and
control the corresponding power converter to thereby adjust a value of the q-axis current flowing through the armature winding member to the corrected value of the q-axis command current,
wherein the magnetic material satisfies the following relation:

$$Wt \times Bs \leq Wm \times Br$$

where:
Wt represents a total circumferential width of one or more of the conductor-to-conductor members lying within a range of one of the magnetic poles of the magnet unit;
Bs represents a saturation magnetic flux density of the conductor-to-conductor members;
Wm represents a circumferential width of a portion of the magnet unit equivalent to one of the magnetic poles of the magnet unit; and
Br represents the remanent flux density of the magnet unit.

12. The rotating electrical machine system according to claim 11, wherein the plurality of processors are programmed to:
obtain information about a temperature of the corresponding magnet unit; and
perform, as the task of correcting the value of the q-axis command current, a task of correcting the value of the q-axis command current in accordance with the obtained temperature information.

13. The rotating electrical machine system according to claim 11, wherein the plurality of processors are configured to:
obtain an electrical angular velocity of the corresponding one of the rotating electrical machines;
obtain information about a voltage induced in the corresponding armature winding member; and
perform, as the task of correcting the value of the q-axis command current, a task of correcting the value of the q-axis command current in accordance with the obtained electrical angular velocity and the information about the induced voltage.

14. A rotating electrical machine system comprising:
a plurality of rotating electrical machines, each of the rotating electrical machines being applied to an aerial vehicle, the rotating electrical machines serving as a power source for flying the aerial vehicle, the aerial vehicle comprising: a vehicle body; and a plurality of thrusters mounted to the vehicle body, each of the thrusters including a propeller, the rotating electrical machines being respectively provided for the propellers, each of the rotating electrical machines comprising:
a field generator that includes a magnet unit, the magnet unit having a plurality of magnetic poles whose polarities are alternately arranged in a circumferential direction;
an armature that includes a multi-phase armature winding member, one of the field generator and the armature serving as a rotor of the rotating electrical machine, the armature including conductor-to-conductor members that are made of any one of a magnetic material and a non-magnetic material; and
a power converter electrically connected to the armature winding member; and
a plurality of processors individually provided for the respective rotating electrical machines, the processors being each configured to:
control the power converter to thereby adjust a q-axis current flowing through the armature winding member to a q-axis command current;
determine a value of the q-axis command current in accordance with requirement information and an input command value for a controlled variable of the corresponding rotating electrical machine, the requirement information including a relationship between values of the q-axis command current and corresponding command values for the controlled variable; and
a corrector configured to perform a task of correcting the determined value of the q-axis command current to thereby restrict temperature change in the corresponding magnet unit from having an influence on the relationship between the command values for the controlled variable and the corresponding values of the q-axis command current; and
control the power converter to thereby adjust a value of the q-axis current flowing through the armature winding member to the corrected value of the q-axis command current,
wherein the magnetic material satisfies the following relation:

$$Wt \times Bs \leq Wm \times Br$$

where:
Wt represents a total circumferential width of one or more of the conductor-to-conductor members lying within a range of one of the magnetic poles of the magnet unit;

Bs represents a saturation magnetic flux density of the conductor-to-conductor members;

Wm represents a circumferential width of a portion of the magnet unit equivalent to one of the magnetic poles of the magnet unit; and Br represents the remanent flux density of the magnet unit.

15. The rotating electrical machine system according to claim 14, wherein the plurality of processors are programmed to:

obtain information about a temperature of the corresponding magnet unit; and perform, as the task of correcting the value of the q-axis command current, a task of correcting the value of the q-axis command current in accordance with the obtained temperature information.

16. The rotating electrical machine system according to claim 14, wherein the plurality of processors are configured to:

obtain an electrical angular velocity of the corresponding one of the rotating electrical machines; and obtain information about a voltage induced in the corresponding armature winding member; and perform, as the task of correcting the value of the q-axis command current, a task of correcting the value of the q-axis command current in accordance with the obtained electrical angular velocity and the information about the induced voltage.

* * * * *